USOO5751799A

United States Patent [19]
Mori

[11] Patent Number: 5,751,799
[45] Date of Patent: May 12, 1998

[54] METHOD AND DEVICE FOR CHARGING DURING DATA COMMUNICATION TIME IN A DATA SWITCHING NETWORK

[75] Inventor: Atuko Mori, Kawasaki, Japan

[73] Assignee: Fujitsu Limited, Kanagawa, Japan

[21] Appl. No.: 651,121

[22] Filed: May 21, 1996

Related U.S. Application Data

[63] Continuation of Ser. No. 280,188, Jul. 25, 1994, abandoned.

[30] Foreign Application Priority Data

Feb. 17, 1994 [JP] Japan .................................. 6-020630

[51] Int. Cl.[6] ...................................................... H04M 15/00
[52] U.S. Cl. ............................ 379/114; 379/112; 379/115; 379/134
[58] Field of Search ........................... 379/112, 113, 379/114, 115, 130, 131, 133, 134

[56] References Cited

U.S. PATENT DOCUMENTS

| | | | |
|---|---|---|---|
| 4,756,019 | 7/1988 | Szybicki | 379/112 |
| 4,868,758 | 9/1989 | Kokubu | 379/114 |
| 4,879,742 | 11/1989 | Taniguchi | 379/111 |
| 4,935,956 | 6/1990 | Hellwarth | 379/114 |
| 5,303,297 | 4/1994 | Hillis | 379/133 |
| 5,381,467 | 1/1995 | Rosinski | 379/114 |
| 5,430,794 | 7/1995 | Ayame | 379/114 |

FOREIGN PATENT DOCUMENTS

| | | |
|---|---|---|
| 297147 | 4/1990 | Japan . |
| 2142245 | 5/1990 | Japan . |

Primary Examiner—Steven Saras
Assistant Examiner—Vijay Shankar
Attorney, Agent, or Firm—Helfgott & Karas, P.C.

[57] ABSTRACT

A method and device for performing a charging operation during data communication in a data switching network such as a public packet exchange, a public frame relay switching network, or an ATM switching network. A charge rate is graduated in accordance with a data transmission delay time or an equipment use when an alternate route is formed because of a certain state or an equipment failure in a network. Improved service is provided. When data communication is performed in a data switching network, facility use in a network ranging from an originating node to a receiving node is examined when the occasion demands. When the originating node receives the intra-network facility use information together with transmission completion report information from the receiving node, delay time to transfer data from the originating node to the receiving node, is measured. A different charging index is set in accordance with the delay time or information regarding intra-network facility use to perform a charging operation in the originating node.

37 Claims, 54 Drawing Sheets

FIG. 5

TRANSMISSION COMPLETION FRAME

ORIGINATING
TERMINAL NUMBER: TERMINAL 100A
DATA LINK IDENTIFIER: AAA
TRANSMISSION
FRAME LENGTH: x3
LINK IDENTIFIER: BBB
TRANSMISSION
COMPLETION STATUS: OK

FIG. 6

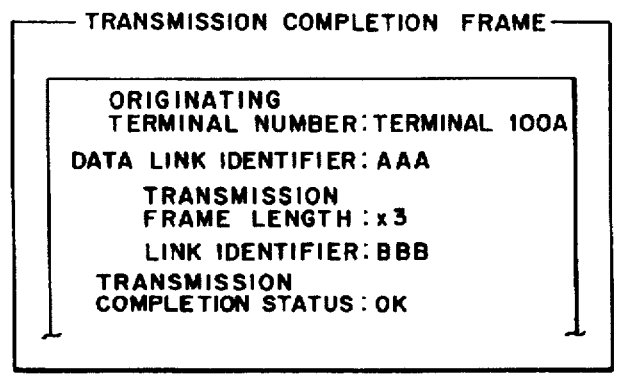

300A: TRANSMISSIN CONFIRMATION AND REGISTRATION LIST

| REGISTRATION STATUS | TERMINAL NUMBER | DATA LINK IDENTIFIER | TRANSMISSION FRAME LENGTH | REGISTRATION NUMBER |
|---|---|---|---|---|
| ON | TERMINAL 100A | AAA | x3 | BBB |

FIG. 7

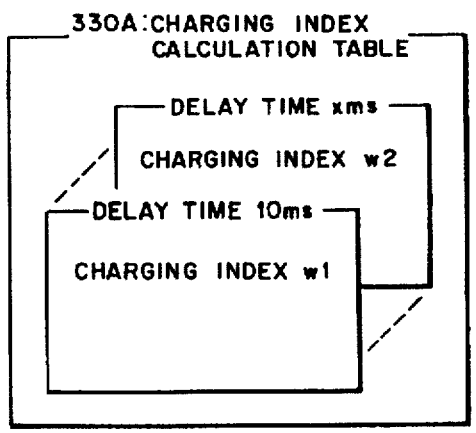

330A: CHARGING INDEX CALCULATION TABLE
— DELAY TIME xms —
CHARGING INDEX w2
— DELAY TIME 10ms —
CHARGING INDEX w1

FIG. 24
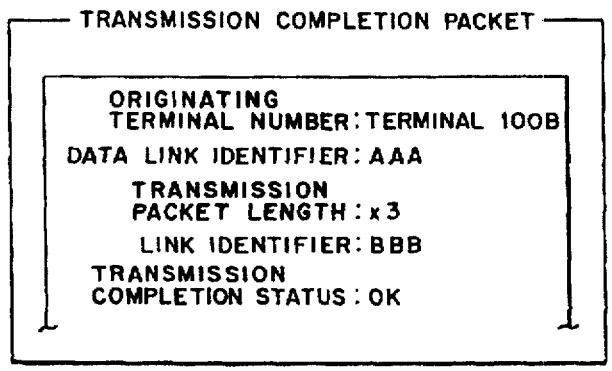
FIG. 25
| 300B: TRANSMISSIN CONFIRMATION AND REGISTRATION LIST | | | | |
|---|---|---|---|---|
| REGISTRATION STATUS | TERMINAL NUMBER | DATA LINK IDENTIFIER | TRANSMISSION PACKET LENGTH | REGISTRATION NUMBER |
| ON | TERMINAL 100B | AAA | x3 | BBB |
FIG. 26
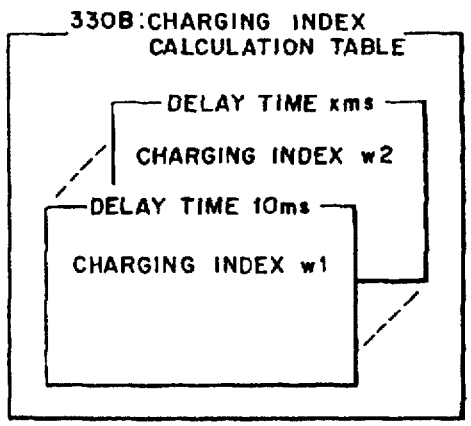

FIG. 32
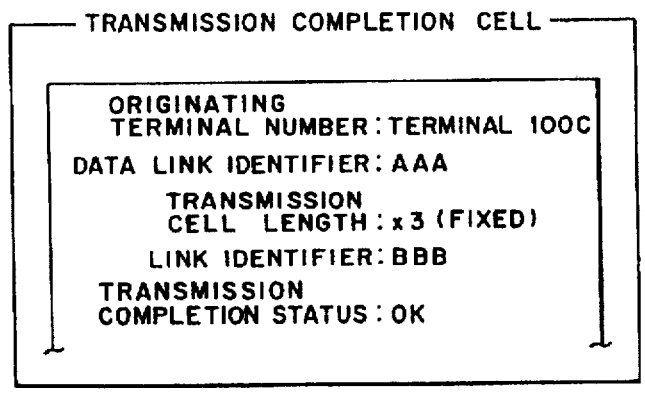
FIG. 33
| 300C: TRANSMISSIN CONFIRMATION AND REGISTRATION LIST | | | | |
|---|---|---|---|---|
| REGISTRATION STATUS | TERMINAL NUMBER | DATA LINK IDENTIFIER | TRANSMISSION CELL LENGTH | REGISTRATION NUMBER |
| ON | TERMINAL 100C | AAA | x3 | BBB |
FIG. 34
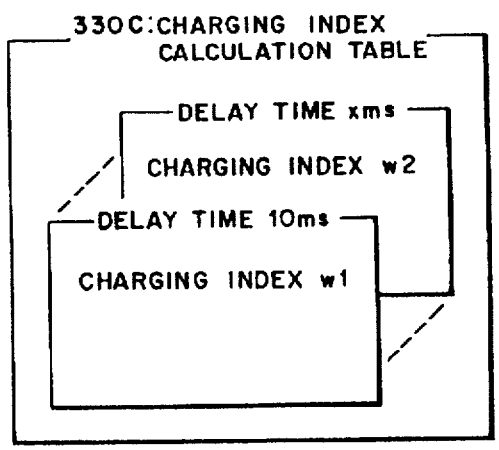

FIG. 38

321A: TRANSMISSION COMPLETION FRAME

| | |
|---|---|
| ORIGINATING TERMINAL NUMBER: TERMINAL 100A | INTRA-NETWORK RESOURCE USE INFORMATION |
| DATA LINK IDENTIFIER: AAA | |
| TRANSMISSION FRAME LENGTH: x3 | USED-BUFFER AMOUNT xx |
| LINK IDENTIFIER: BBB | USED-NODE NUMBER yy |
| TRANSMISSION COMPLETION STATUS: OK | |

FIG. 39

300A: TRANSMISSIN CONFIRMATION AND REGISTRATION LIST

| REGISTRATION STATUS | TERMINAL NUMBER | DATA LINK IDENTIFIER | TRANSMISSION FRAME LENGTH | REGISTRATION NUMBER |
|---|---|---|---|---|
| ON | TERMINAL 100A | AAA | x3 | BBB |

FIG. 40

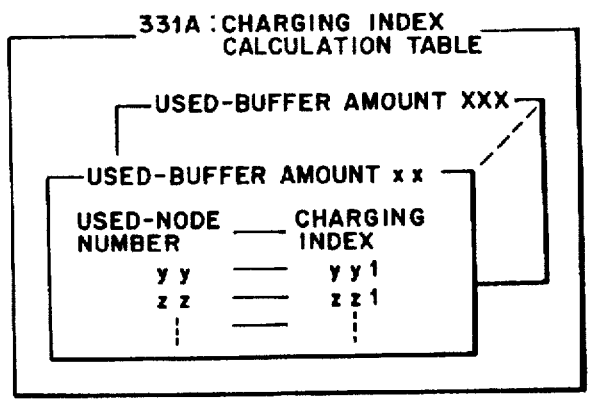

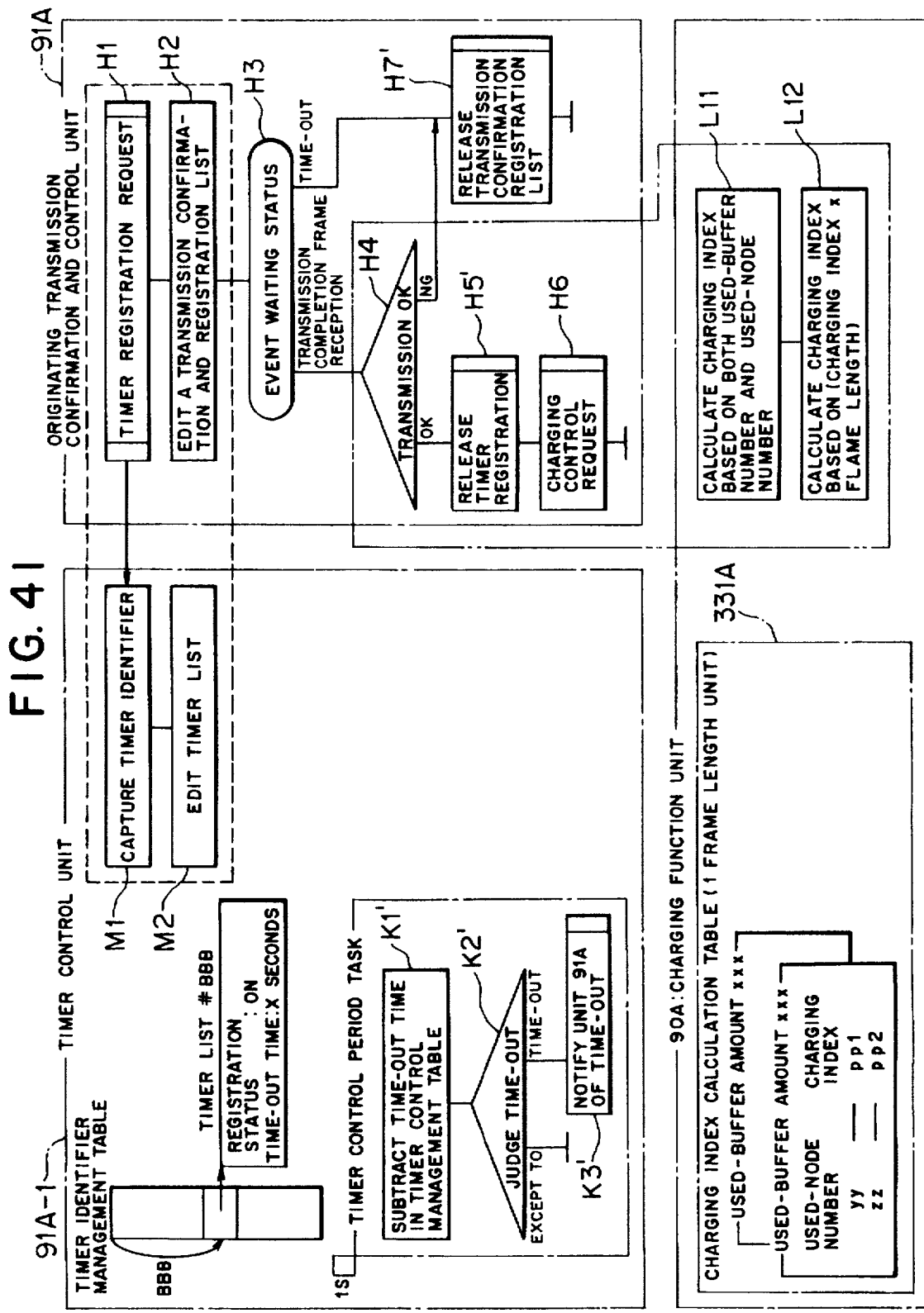

FIG. 52
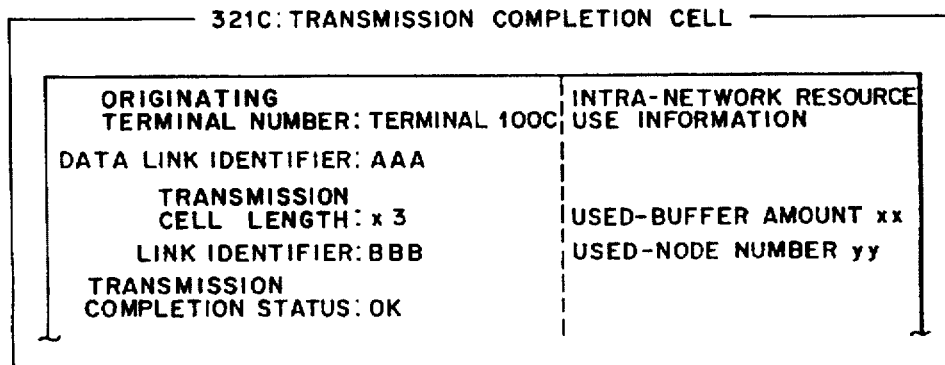
FIG. 53
```
┌──────────── 300C: TRANSMISSIN CONFIRMATION AND REGISTRATION LIST ────────────┐
│ REGISTRATION   TERMINAL      DATA LINK      TRANSMISSION     REGISTRATION    │
│ STATUS         NUMBER        IDENTIFIER     CELL LENGTH      NUMBER          │
│                                                                              │
│    ON          TERMINAL 100C    AAA             x3              BBB          │
│     ┊             ┊              ┊               ┊               ┊           │
│     ┊             ┊              ┊               ┊               ┊           │
└──────────────────────────────────────────────────────────────────────────────┘
```
FIG. 54
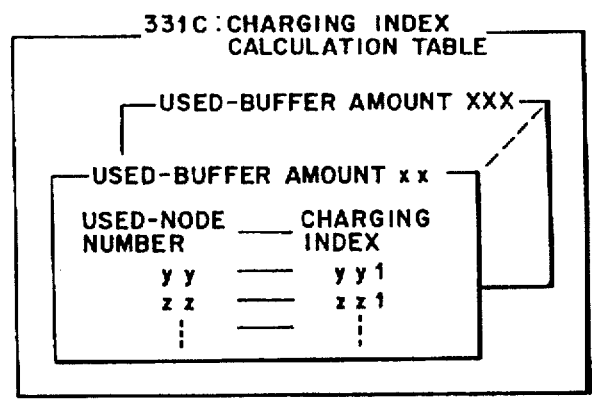

FIG. 58
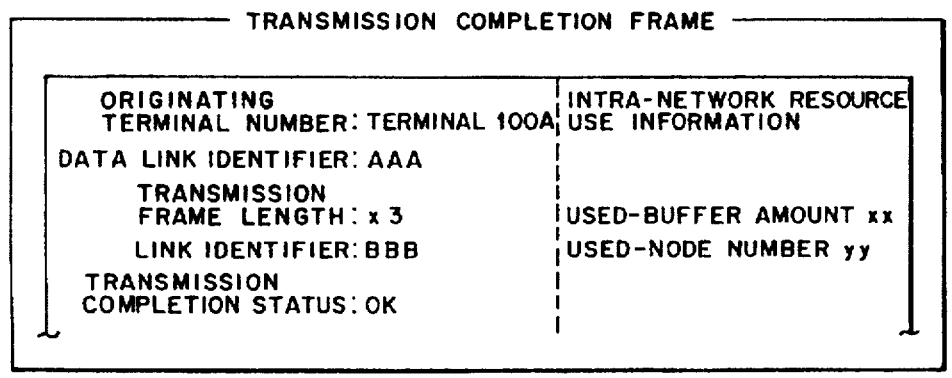
FIG. 59
300A: TRANSMISSIN CONFIRMATION AND REGISTRATION LIST
| REGISTRATION STATUS | TERMINAL NUMBER | DATA LINK IDENTIFIER | TRANSMISSION FRAME LENGTH | REGISTRATION NUMBER |
|---|---|---|---|---|
| ON | TERMINAL 100A | AAA | x3 | BBB |
FIG. 60
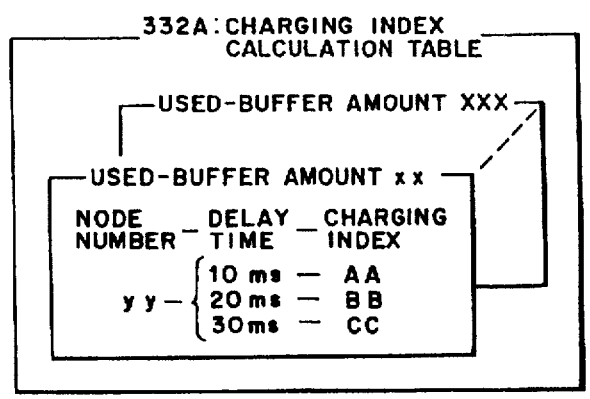

FIG. 65
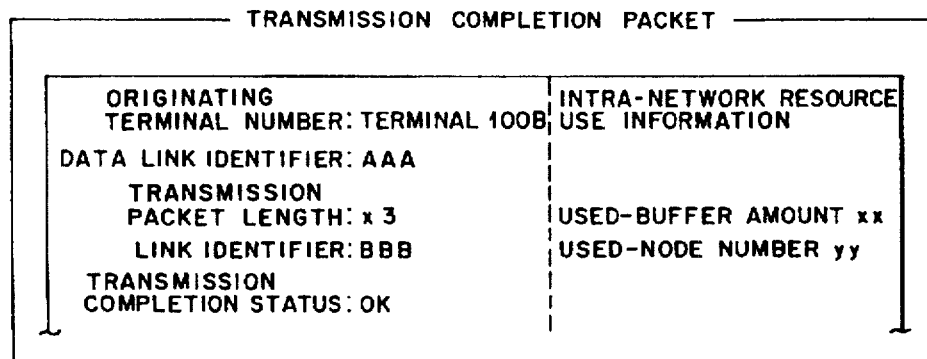
FIG. 66
```
┌──── 300B: TRANSMISSIN CONFIRMATION AND REGISTRATION LIST ────┐
│                                                               │
│  REGISTRATION   TERMINAL    DATA LINK    TRANSMISSION    REGISTRATION │
│  STATUS         NUMBER      IDENTIFIER   PACKET LENGTH   NUMBER       │
│                                                                       │
│     ON          TERMINAL 100B    AAA         x3             BBB       │
│                                                                       │
└───────────────────────────────────────────────────────────────┘
```
FIG. 67
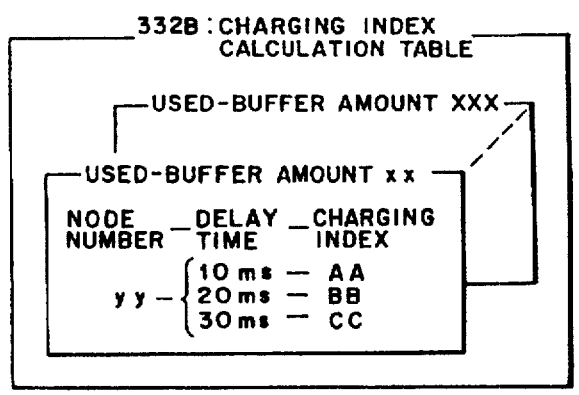

METHOD AND DEVICE FOR CHARGING DURING DATA COMMUNICATION TIME IN A DATA SWITCHING NETWORK

This is a continuation of application Ser. No. 08/280,188, filed Jul. 25, 1994, now abandoned.

BACKGROUND OF THE INVENTION

1) Field of the Invention

The present invention relates to a method and device each of which charges during data communication in a data switching network such as a public packet switching network, a public frame relay switching network, or an ATM (asynchronous transfer mode).

In recent years, subscribers are increasing to transfer a large volume of data in the field of data communications services. With the increasing number of users, there are strong desires for higher-speed data communication services. In order to solve such a problem, a service supplier is required to ensure high speed data communications in a constant quality in the public switching networks (packet exchanges, frame relay exchanges, ATM exchanges, and the like). It is desired that the supplier lowers the service charge in the case of a data transmission with a large delay time.

On the other hand, where user data uses a large amount of resources in a network, the supplier may consider applying a higher charging system because of a large scale of investment made in communication facilities.

2) Description of the Related Art

A general public data switching network employs an information content charging system that charges in accordance with the amount of data transmitted by an user. In this case, this system includes a processing system where a destination node performs a charging calculation when data has been transmitted to a destination user and then a switching node in the charging terminal collects charging indexes from the destination switching node at constant time intervals or a call disconnection time, and a processing system where transmission data information is returned to an originating switching node when a destination switching node has transmitted data to a destination user and then the originating switching node performs a charging calculation.

However, the conventional information content charging system in a public data switching network cannot provide such a charging service that a service charge is graduated with a delay time of data transmitted by a user or the amount of resources in a network used with user data.

SUMMARY OF THE INVENTION

The present invention is made to overcome the above mentioned problems. An object of the present invention is to provide a method for charging during data communication in a data switching network, wherein an improved service is provided by graduating a service charge in accordance with either data transmission delay time because of an alternate route temporarily made at a time of the state of a network and an equipment failure, or the number of equipment in a network used to form an alternate route at a time of the state of a network and an equipment failure.

Another object of the present invention is to provide a device for charging during data communication in a data switching network, wherein an improved service is provided by graduating a service charge in accordance with either data transmission delay time because of an alternate route temporarily made at a time of the state of a network and an equipment failure, or the number of equipment in a network used to form an alternate route at a time of the state of a network and an equipment failure.

In order to achieve the above objects, according to the present invention, the method for charging during data communication in a data switching network, comprising the steps of measuring a delay time at an originating node when the originating node receives a transmission completion report information from a receiving node, the delay time being one delayed to transmit data from the originating node to the receiving node; and setting a different charging index in accordance with the delay time to perform a charging operation at the originating node.

There is an advantage in that improved services can be provided by graduating a charging system in accordance with a delay in user data processing in a data switching network.

In a device for charging during data communication in a data switching network, the data switching network is characterized by an originating node and a receiving node, the receiving node including a destination transmission confirmation and control means for transmitting transmission completion report information to the originating node in response to a signal from the originating node; the originating node including originating transmission confirmation and control means, the originating transmission confirmation and control means including: originating transmission confirmation control means having transmission completion report information receiving means for receiving the transmission completion report information from the destination transmission confirmation and control means in the receiving node, delay time measurement requesting means for delivering a delay time measuring request when data is transferred from the originating node to the receiving node based on a result received by the transmission completion report information receiving means, and charging index setting request means for delivering a charging index setting request when data is transferred from the originating node to the receiving node based on a result received by the transmission completion report information receiving means; delay time measuring means for measuring the delay time when data is transferred from the originating node to the receiving node, in response to a request from said delay time measurement requesting means in said originating transmission confirmation and control means; and charging function means having charging index setting means for setting a different charging index based on a request from the charging index setting request means in the originating transmission confirmation and control means and a delay time measured by the delay time measuring means, and charging means for performing a charging operation in accordance with the charging index set by the charging index setting means.

Thus, there is an advantage in that improved services can be provided by graduating a charging system in accordance with a delay in user data processing in a data switching network.

The method for charging during data communication in a data switching network is characterized by the steps of surveying an intra-network facility use between an originating node and a receiving node; and setting a different index at the originating node in accordance with information regarding the intra-network facility use when the originating node receives the information regarding the intra-network facility use together with transmission completion report information from the receiving node, whereby a charging operation is performed.

There is an advantage in that improved services can be provided by graduating a charging system in accordance with the amount of equipment used for user data in a data switching network (or an intra-network facility use of user data).

A device for charging during data communication in a data switching network is characterized by the data switching network including an originating node including first resource use surveying means and a receiving node including second resource use surveying means, the receiving node including a destination transmission confirmation and control means for transmitting information regarding intra-network facility use between the originating node and the receiving node, the facility use obtained based on information examined by the second resource use surveying means, together with transmission completion report information to the originating node, in response to a signal from said originating node; the originating node including originating transmission confirmation and control means, the originating transmission confirmation and control means including: transmission completion report information receiving means for receiving the transmission completion report information and the intra-network facility use information from the destination transmission confirmation and control means in the receiving node, and charging index setting request means for outputting a charging index setting request based on a result received by the transmission completion report information receiving means; and charging function means having charging index setting means for setting a different charging index based on a request from the charging index setting request means in the originating transmission confirmation and control means and information regarding the intra-network facility use obtained by the originating transmission confirmation and control means, and charging means for performing a charging operation in accordance with the charging index set by the charging index setting means.

Thus, there is an advantage in that improved services can be provided by graduating a charging system in accordance with the amount of equipment used for user data in a data switching network (or an intra-network facility use of user data).

A method for charging during data communication in a data switching network is characterized by the steps of: surveying an intra-network facility use between an originating node and a receiving node; measuring a delay time in the originating node, the delay time being one delayed to transfer from the originating node to the receiving node, when an originating node receives the information regarding the intra-network facility use together with transmission completion report information from the destination node, and setting a different charging index at the originating node in accordance with both the delay time and information regarding the intra-network facility use, whereby a charging operation is performed.

Thus, there is an advantage in that more fine services can be provided by graduating a charging system in accordance with a delay in user data processing in a data switching network and the amount of equipment used for user data in a data switching network (or an intra-network facility use of user data).

A device for charging during data communication in a data switching network is characterized by the data switching network including an originating node including first resource use surveying means and a receiving node including second resource use surveying means, the receiving node comprising a destination transmission confirmation and control means for transmitting intra-network facility use ranging from the originating node to said receiving node, the intra-network facility use obtained based on a use of resources examined by the second resource use surveying means, together with transmission completion report information to the originating node, in response to a signal from the originating node; the originating node comprising originating transmission confirmation and control means, the originating transmission control means including: transmission completion report information receiving means for receiving the transmission completion report information and information regarding the intra-network facility use from the destination transmission confirmation control means in the receiving node, delay time measurement requesting means for delivering a delay time measuring request based on a result received by said transmission completion report information receiving means when data is transferred from the originating node to said receiving node, and charging index setting request means for delivering a charging index setting request based on a result received by the transmission completion report information receiving means when data is transferred from the originating node to the receiving node; delay time measuring means for measuring a delay time delayed to transfer data from the originating node to the receiving node in response to a request from the delay time measurement requesting means in the originating transmission confirmation and control means; and charging function means having charging index setting means for setting a different charging index based on a request from the charging index setting request means in the originating transmission confirmation control means, a delay time measured by the delay time measuring means, and information regarding the intra-network facility use obtained by the originating transmission confirmation and control means, and charging means for performing a charging operation in accordance with the charging index set by the charging index setting means.

There is an advantage in that more fine services can be provided by graduating a charging system in accordance with a delay in user data processing in a data switching network and the amount of equipment used for user data in a data switching network (or an intra-network facility use of user data).

Furthermore, in a device for charging during data communication in a data switching network according to claim 2, or 12, the delay time measuring means is characterized in that originating time memory means for storing a time at which a signal is transferred from the originating node to the receiving node; transmission completion report information receiving time memory means for storing a time at which the originating node receives the transmission completion report information from the receiving node; and time difference operating means for operating a time difference between a time stored in the originating time memory means and a time stored in the transmission completion report information receiving time memory means, and for operating a delay time delayed to transfer data from the originating node to the receiving node.

Thus, a delay time can be obtained easily and certainly by merely measuring both a signal originating time and a receiving time at which information regarding a transmission completion report has been received.

In a device for charging during data communication in a data switching network according to claim 2 or 12, the delay time measuring means is characterized in that a counter which is triggered when a signal is transferred from the originating node to the receiving node, and which halts its operation when the originating node receives the transmission completion report information from the receiving node, and which measures a delay time when data is transferred from the originating node to the receiving node.

In the configuration described above, a delay time can be easily and certainly obtained.

A device for charging during data communication in a data switching network according to claim 2, 8, or 12 is characterized in that the originating transmission confirmation and control means includes signal information memory means which stores information regarding a signal sent from the originating node to the receiving node, whereby a signal collation is performed based on the signal information stored in the signal information memory means when the transmission completion report information is received from the destination transmission confirmation control means in the receiving node.

Thus, an originating signal can be easily and certainly collated with the information regarding a transmission completion report sent due to the originating signal.

A device for charging during data communication in a data switching network according to claim 2 is characterized in that the charging index setting means in the charging function means includes memory means which stores a charging index corresponding to the delay time.

The configuration described above can easily and certainly obtain an charging index.

A device for charging during data communication in a data switching network according to claim 8 is characterized in that the charging index setting means in the charging function means includes memory means which stores a charging index corresponding to the information regarding intra-network facility use.

The configuration described above can easily and certainly obtain an charging index.

A device for charging during data communication in a data switching network according to claim 12 is characterized in that the charging index setting means in the charging function means comprises memory means which stores the delay time and the charging index corresponding to information regarding the intra-network facility use.

The configuration described above can easily and certainly obtain an charging index.

A device for charging during data communication in a data switching network according to claim 12 is characterized by an intermediate node arranged between the originating node and the receiving node, the intermediate node including resource use surveying means, whereby when the destination transmission confirmation and control means in the receiving node receives a signal from the originating node, information regarding an intra-network facility use which is obtained based on resource use examined by the resource use surveying means is transmitted from the originating node to the receiving node by way of the intermediate node, together with transmission completion report information.

Thus, even in a data switching network with a transit node, more fine services can be provided by merely graduating a charging system in accordance with a delay in user data processing in a switching network and the amount of equipment used for user data in a switching network (or an intra-network facility use of user data).

A device for charging during data communication in a data switching network according to claim 12 or 17 is characterized in that the information regarding intra-network facility use is the amount of buffers used.

The configuration described above has an advantage in that the amount of equipment used in a switching network (or an intra-network facility use) can be easily recognized.

A device for charging during data communication in a data switching network according to claim 17 is characterized in that the information regarding intra-network facility use includes the amount of buffers used and the number of alternate nodes.

Thus, there is an advantage in that the amount of equipment used in a switching network (or an intra-network facility use) cab be easily recognized.

BRIEF DESCRIPTION OF THE DRAWINGS

FIG. 5 is a diagram used for explaining a transmission completion frame;

FIG. 6 is a diagram used for explaining a transmission confirmation registration list;

FIG. 7 is a diagram used for explaining a charging index calculation table;

FIG. 24 is a diagram used for explaining a transmission completion packet;

FIG. 25 is a diagram used for explaining a transmission confirmation registration list;

FIG. 26 is a diagram used for explaining a charging index calculation table;

FIG. 32 is a diagram used for explaining a transmission completion cell;

FIG. 33 is a diagram used for explaining a transmission confirmation registration list;

FIG. 34 is a diagram used for explaining a charging index calculation table;

FIG. 38 is a diagram used for explaining a transmission completion frame;

FIG. 39 is a diagram used for explaining a transmission confirmation registration list;

FIG. 40 is a diagram used for explaining a charging index calculation table;

FIG. 41 is a diagram used for explaining an operation each of an originating transmission confirmation control unit, a timer control unit, and a charging function unit;

FIG. 52 is a diagram used for explaining a transmission completion cell;

FIG. 53 is a diagram used for explaining a transmission confirmation registration list;

FIG. 54 is a diagram used for explaining a charging index calculation table;

FIG. 58 is a diagram used for explaining a transmission completion frame;

FIG. 59 is a diagram used for explaining a transmission confirmation registration list;

FIG. 60 is a diagram used for explaining a charging index calculation table;

FIG. 65 is a diagram used for explaining a transmission completion packet;

FIG. 66 is a diagram used for explaining a transmission confirmation registration list;

FIG. 67 is a diagram used for explaining a charging index calculation table;

DESCRIPTION OF THE PREFERRED EMBODIMENTS

Referring to the attached drawings, explanation will be made in detail as for preferred embodiments according to the present invention.

Figure 1:
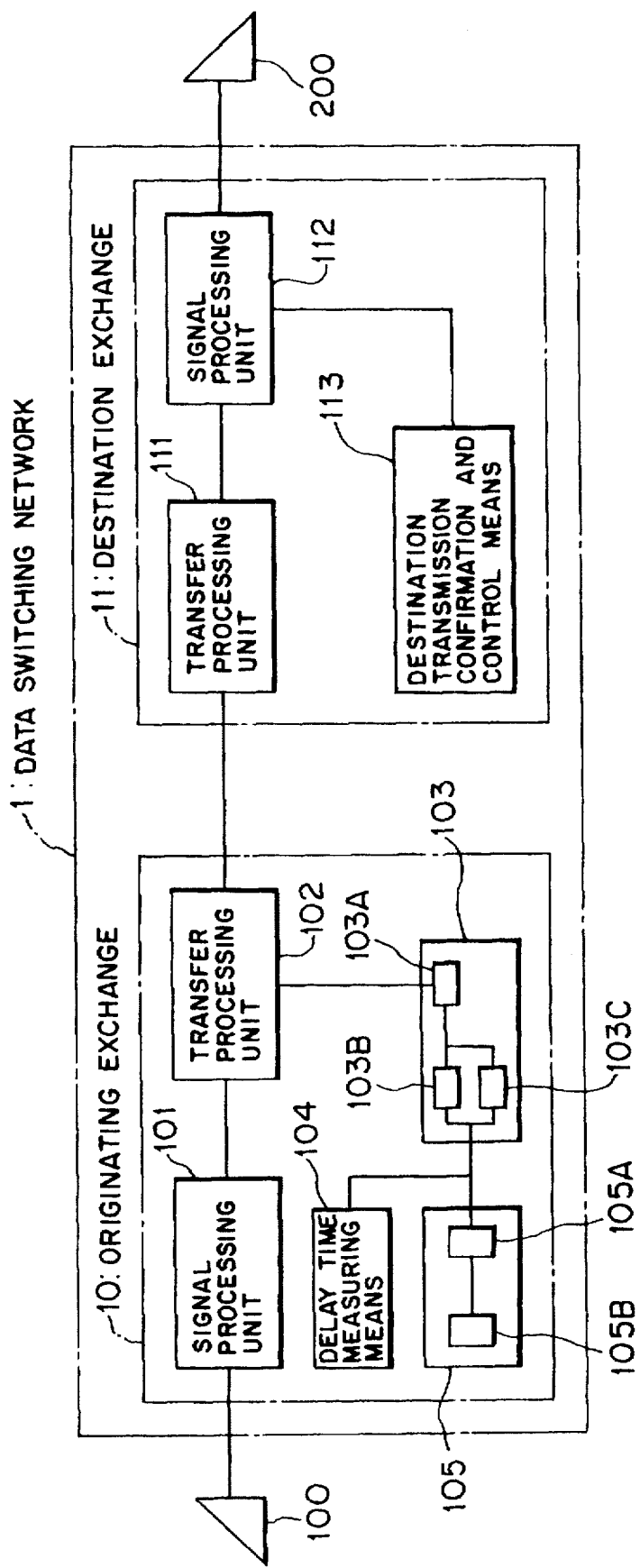
FIG. 1 is a block diagram showing an aspect of the present invention.

(a) The Aspect of the Invention:

FIG. 1 is a block diagram showing an aspect of the present invention. Referring to FIG. 1, a data switching network 1 includes an exchange 10 on an originating side and an exchange 11 on a destination side.

The originating exchange 10 constitutes an originating node together with an originating terminal 100. The destination exchange 11 constitutes a receiving node together with a destination terminal 200.

Numeral 101 represents a signal processing unit, 102 represents a transfer processing unit, 103 represents a transfer confirmation and control means on an originating side, 104 represents delay time measuring means, and 105 represents charging function means. The originating exchange 10 includes the signal processing unit 101, the transfer processing unit 102, the transfer confirmation and control means 103 on an originating side, the delay time measuring means 104, and the charging function means 105.

Numeral 111 is a transfer processing unit, 112 represents a signal processing unit, and 113 represents transfer confirmation and control means on the destination side. The destination exchange 11 includes the transfer processing unit 111, the signal processing unit 112, and the transfer confirmation and control means 113 on the destination side.

The signal processing unit 101 receives a signal from the originating terminal 100 to subject it to a suitable signal process. The transfer processing unit 102 notifies the originating transfer confirmation and control means 103 of a signal origination in response to a signal from the signal processing unit 101 while it transfers a signal to the destination exchange 11.

The originating transfer confirmation and control means 103 includes transmission completion report information receiving means 103A for receiving transmission completion report information from the destination transmission confirmation and control means 113, delay time measurement requesting means 103B for delivering a delay time measuring request in accordance with a result received by the transmission completion report information receiving means 103A when data is transferred from the originating node to the receiving node, and charging index setting request means 103C for delivering a charging index setting request in accordance with a result received by the transmission completion report information receiving means 103A when data is transferred from the originating node to the receiving node.

When receiving a request from the delay time measurement requesting means 103B in the originating transfer confirmation and control means 103, the delay time measuring means 104 measures a delay time delayed to transfer data from the originating node to the receiving node.

The charging function means 105 includes charging index setting means 105A for setting a different charging index based on a request from the charging index setting request means 103C in the originating transfer confirmation and control means 103 and a delay time measured by the delay time measuring means 104, and charging means 105B for performing a charging operation based on a charging index set by the charging index setting means 105A.

The transfer processing unit 111 transfers a signal to the signal processing unit 112 in response to a signal from the originating node. When receiving a signal from the originating node via the transfer processing unit 111, the signal processing 112 notifies the destination transfer confirmation and control means 113 of that a signal has been received and transfers a signal to the destination node 200.

The destination transfer confirmation and control means 113 transmits transmission completion report information to the originating node in response to a signal from the originating node.

Figure 2:
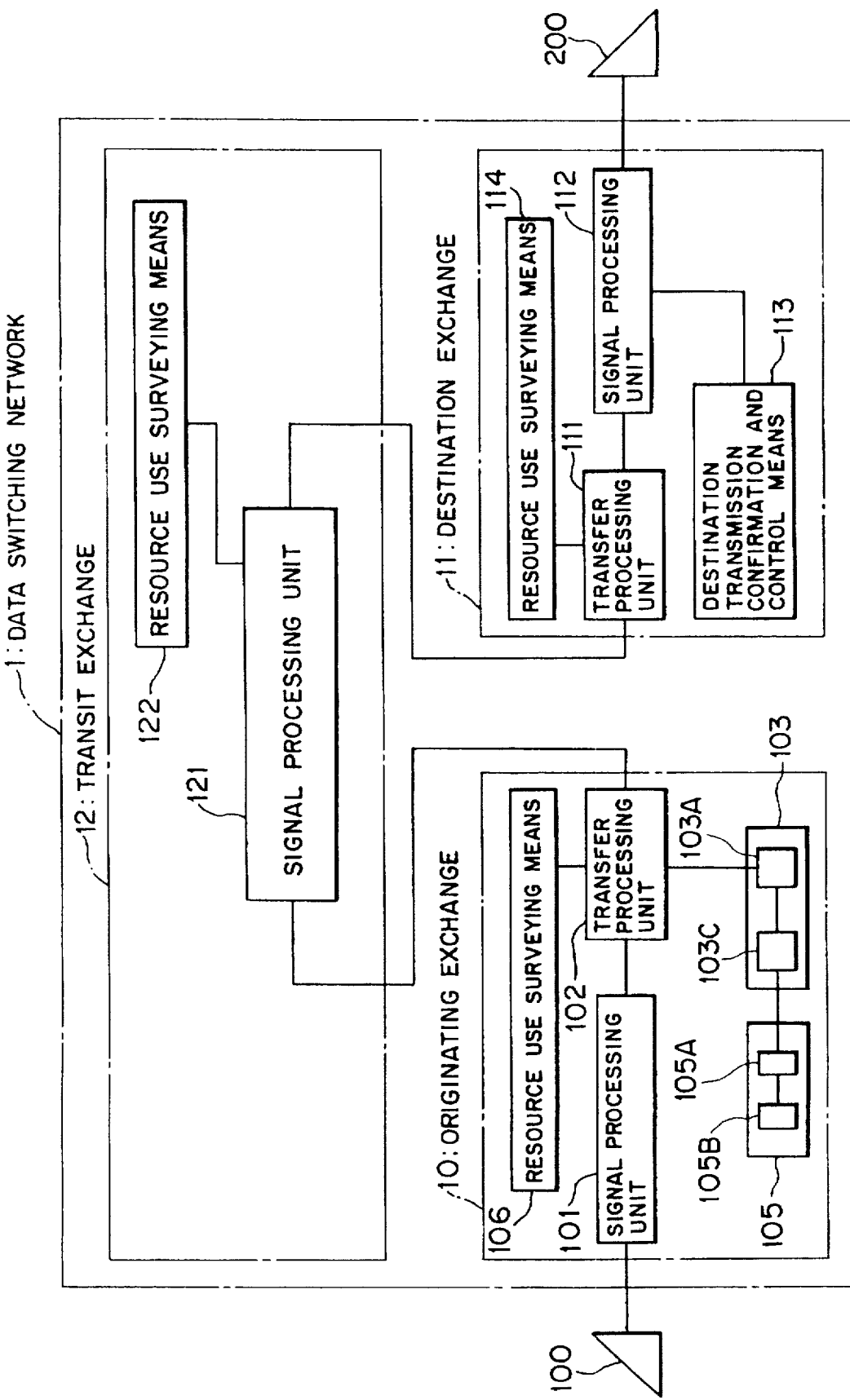
FIG. 2 is a block diagram showing an aspect of the present invention.

FIG. 2 is a block diagram used for explaining another aspect of the present invention. Referring to FIG. 2, a data switching network 1 includes an originating exchange 10, a transit exchange 12, and a destination exchange 11.

The originating exchange 10 constitutes an originating node together with the originating terminal 100. The destination exchange 11 constitutes a destination node together with the destination terminal 200. The transit exchange 12 constitutes an intermediate node between the originating node and the receiving node.

Numeral 101 represents a signal processing unit, 102 represents a transfer processing unit, 103 represents a transfer confirmation and control means on an originating side, 105 represents a charging function means, and 106 represents resource use surveying means. The originating exchange 10 includes the signal processing unit 101, the transfer processing unit 102, the transfer confirmation and control means 103 on an originating side, the charging function means 105, and the resource use surveying means 106.

Numeral 111 is a transfer processing unit, 112 represents a signal processing unit, 113 represents transfer confirmation and control means on the destination side, and 114 represents resource use surveying means. The destination exchange 11 includes the transfer processing unit 111, the signal processing unit 112, and the transfer confirmation and control means 113 on the destination side, and the resource use surveying means 114.

Numeral 121 represents a signal processing unit, and 122 represents resource use surveying means. The transit exchange 12 includes the signal processing unit 121 and the resource use surveying means 122.

The signal processing unit 101 receives a signal from the originating terminal 100 to subject it to a suitable signal process. The transfer processing unit 102 notifies the originating transfer confirmation and control means 103 of a signal origination in response to a signal from the signal processing unit 101 while it transfers a signal to the destination exchange 11 via the transit exchange 12.

The originating transfer confirmation and control means 103 includes transmission completion report information receiving means 103A for receiving transmission completion report information and intra-network facility use information from the destination transmission confirmation and control means 113 in the receiving node, and charging index setting request means 103C for delivering a charging index setting request in accordance with a result received by the transmission completion report information receiving means 103A.

The charging function means 105 includes charging index setting means 105A for setting a different charging index in accordance with a request from the charging index setting request means 103C in the originating transfer confirmation and control means 103 and intra-network facility use information obtained by the originating transmission confirmation and control means 103, and a charging means 105B for performing a charging operation based on a charging index set by the charging index setting means 105A.

The resource use surveying means 106 examines the amount of resources used in the originating exchange 10.

When receiving a signal from the originating node via the intermediate node, the transfer processing unit 111 transfers it to the signal processing unit 112. When receiving the signal from the intermediate node via the transfer processing unit 111, the signal processing unit 112 notifies the destination transfer confirmation and control means 113 that the signal has been received and outputs simultaneously it to the destination terminal 200.

When receiving the signal from the originating node via the intermediate node, the destination transmission confirmation and control means 113 transmits information regarding the amount of equipment used between the originating node and the receiving node in the network (or an intra-network facility use), the information being obtained based on the amount in use of resources examined by the resource use surveying means 106, 122, and 114, to the originating node, together with transmission completion report information. The resource use surveying means 114 examines the amount of resources used in the destination exchange 11.

The signal processing unit 121 executes a signal interchange between nodes as well as a desired signal process. The resource use surveying means 122 examines the amount of resources used in the transit exchange 12.

Figure 3:
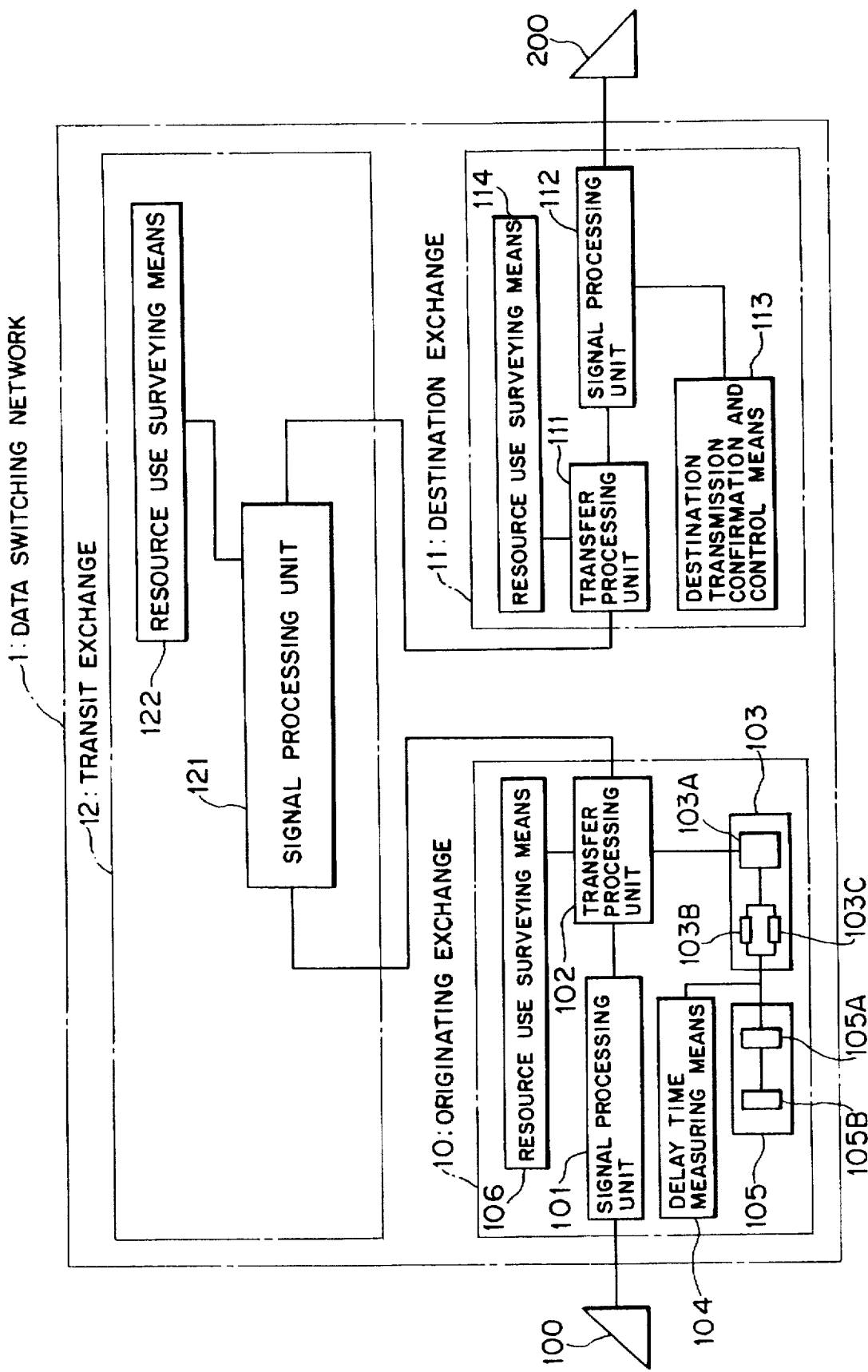
FIG. 3 is a block diagram showing an aspect of the present invention.

FIG. 3 is a block diagram used for explaining another aspect of the present invention. Referring to FIG. 3, the data switching network 1 includes an originating exchange 10, a transit exchange 12, and a destination exchange 11.

The originating exchange 10 forms an originating node together with the originating terminal 100. The destination exchange 11 forms a destination node together with the destination terminal 200. The transit exchange 12 forms an intermediate node arranged between the originating node and the receiving node.

Numeral 101 represents a signal processing unit, 102 represents a transfer processing unit, 103 represents originating transfer confirmation and control means, 104 represents delay time measuring means, 105 represents charging function means, and 106 represents resource use surveying means. The originating exchange 10 includes the signal processing unit 101, the transfer processing unit 102, the originating transfer confirmation and control means 103, the delay time measuring means 104, the charging function means 105, and the resource use surveying means 106.

Numeral 111 represents a transfer processing unit, 112 represents a signal processing unit, 113 represents destination transfer confirmation and control means, and 114 represents resource use surveying means. The destination exchange 11 includes the transfer processing unit 111, the signal processing unit 112, the destination transfer confirmation and control means 113, and the resource use surveying means 114.

Numeral 121 represents a signal processing unit, and 122 represents resource use surveying means. The transit exchange 12 includes the signal processing unit 121 and the resource use surveying means 122.

The signal processing unit 101 receives a signal from the originating terminal 100 to execute a suitable signal process. When receiving a signal from the signal processing unit 101, the transfer processing unit 102 notifies the originating transfer confirmation and control means 103 that the signal has been originated, and transmits it to the destination exchange 11 via the transit exchange 12.

The originating transfer confirmation and control means 103 includes transmission completion report information receiving means 103A for receiving both transmission completion report information and intra-network facility use information from the destination transfer confirmation and control means 113 in the destination node, delay time measurement requesting means 103B for delivering a delay time measuring request when data is transferred from the originating node to the receiving node in accordance with a result received by the transmission completion report information receiving means 103A, and charging index setting request means 103C for delivering a charging index setting request when data is transferred from the originating node to the receiving node in accordance with a result received by the transmission completion report information receiving means 103A.

The delay time measuring means 104 measures a delay time delayed to transfer data from the originating node to the receiving node in response to a request from the delay time measurement requesting means 103A in the originating transmission confirmation and control means 103.

The charging function means 105 includes charging index setting means 105A for setting a different charging index based on a request from the charging index setting request means 103C in the originating transfer confirmation and control means 103, a delay time measured by the delay time measuring means 104, and intra-network facility use information obtained by the originating transfer confirmation and control means 103, and charging means 105B for performing a charging operation based on a charging index set by the charging index setting means 105A.

The resource use surveying means 106 examines the amount of resources used in the originating exchange 10.

In response to a signal from the originating node via the intermediate node, a transfer processing unit 111 transfers it to the signal processing unit 112. When receiving a signal from the originating node via both the transfer processing unit 111 and the intermediate node, the signal processing unit 112 notifies the destination transfer confirmation and control means 113 that a signal has been received and then outputs a signal from the destination terminal 200.

When receiving a signal from the originating node via the intermediate node, the destination transfer confirmation and control means 113 transmits information regarding the amount in use of equipment in the network ranging from the originating node and the receiving node, the information being obtained based on the amount in use of resource checked in the resource use surveying means 106, 122, and 114, to the originating node, together with transfer completion report information.

The resource use surveying means 114 examines the amount of resources used in the destination exchange 11.

The signal processing unit 121 performs both a signal interchange between the nodes and a predetermined signal process. The resource use surveying means 122 examines the amount of resources used in the transit exchange 12.

The delay time measuring means 104 includes originating time memory means for storing a time when a signal has been originated from the originating node to the receiving node, transmission completion report information receiving time memory means for storing a time when transmission completion report information has been received from the originating node to the receiving node, and time difference operating means for operating a time difference between the time stored in the originating time memory means and the time stored in the transmission completion report information receiving time memory means and for operating a delay time delayed to transfer data from the originating node to the receiving node.

The delay time measuring means 104 is constituted of a counter which is triggered when the originating node outputs a signal to the receiving node, halts its operation when the originating node receives transmission completion report information from the receiving node, and measures a delay time when data is transferred from the originating node to the receiving node based on the result measured at the halt time.

The originating transmission confirmation and control means 103 may include signal information memory means which stores information regarding a signal received from the originating node to the receiving node. Then, when transmission completion report information is received from the destination transfer confirmation and control means 113 in the receiving node, a signal is collated based on signal information stored in the signal information memory means.

With the charging index setting means 105A in the charging function means 105 may be arranged memory means for storing a charging index corresponding to a delay time, memory means for storing a charging index corresponding to information regarding the amount of equipment used in the network (or intra-network facility use), or memory means for storing a charging index corresponding to a delay time and intra-network equipment use information (or intra-network facility use).

Either the amount of buffers used or both the amount of buffers used and the number of alternate nodes is used as information regarding the intra-network equipment use.

FIGS. 2 and 3 show an intermediate node arranged between an originating node and a receiving node, respectively. However, referring to FIGS. 2 and 3, the intermediate node may be eliminated.

Hence according to the present invention shown in FIG. 1, in order to perform a charging operation during a data communication in the data switching network 1, the originating node measures a delay time delayed to transfer data from the originating node to the receiving node when transmission completion report information has been received from the originating node to the receiving node and the originating node sets a different charging index in accordance with the delay time.

In other words, in order to perform data communications in the data switching network 1, the signal processing unit 101 in the originating exchange 10 performs a suitable signal process in response to a signal from the originating terminal 100, and the transfer processing unit 102 notifies the originating transfer confirmation and control means 103 of a signal origination in response to a signal from the signal processing unit 101 while it transfers the signal to the destination exchange 11.

Thereafter, when receiving a signal from the originating node to the receiving node, the transfer processing unit 111 in the destination exchange 11 transfers it to the signal processing unit 112. When receiving a signal from the originating node, the signal processing unit 112 notifies the destination transfer confirmation and control means 113 that the signal has been received via the transfer processing unit 111, and then outputs it to the destination terminal 200. The destination transfer confirmation and control means 113 transmits transmission completion report information to the originating node in response to the signal from the originating node.

Thereafter, in the originating transfer confirmation and control means 103 in the originating exchange 10, the transmission completion report information receiving means 103A receives transmission completion report information from the destination transfer confirmation and control means 113. Based on a result received by the transmission completion report information receiving means 103A, the delay time measurement requesting means 103B delivers a delay time measuring request when data is transferred data from the originating node to the receiving node and the charging index setting request means 103C delivers a charging index setting request when data is transferred from the originating node to the receiving node.

The delay time measuring means 104 receives a request from the delay time measurement requesting means 103B in the originating transfer confirmation and control means 103 to measure a delay time delayed to transfer data from the originating node to the receiving node.

In the charging function means 105, the charging index setting means 105A sets a different charging index based on a request from the charging index setting request means 103C in the originating transfer confirmation and control means 103 and a delay time measured by the delay time measuring means 104, and the charging means 105B performs a charging operation based on a charging index set by the charging index setting means 105A.

According to the present invention shown in FIG. 2, in order to perform a charging operation during data communications in the data switching network 1, the originating node examines the amount of equipment used between the originating node and the receiving node in the network (or intra-network facility use) and then sets a different charging index in accordance with the information of equipment used in the network when it receives the intra-network facility use information together with transmission completion report information from the destination node, whereby a charging operation is performed.

Namely, when data communication is performed in the data switching network 1, the signal processing unit 101 in the originating exchange 10 receives a signal from the originating terminal 100 to execute a suitable signal process. Then, the transfer processing unit 102 notifies the originating transfer confirmation and control means 103 of a signal origination in response to the signal from the signal processing unit 101 while it transfers the same to the destination exchange 11 via the transit exchange 12.

Thereafter, in the destination exchange 11, when receiving a signal from the originating node via the intermediate node, the transfer processing unit 111 transfers the signal to the signal processing unit 112. The signal processing unit 112 notifies the destination transfer confirmation and control means 113 of a signal reception in response to the signal from the originating node via the transfer processing unit 111 and the intermediate node, while it sends the same to the destination terminal 200. In response to a signal from the originating node via the intermediate node, the destination transfer confirmation and control means 113 transmits information to the originating node together with transmission completion report information, the information regarding the amount of equipment used between the originating node and the receiving node in the network and obtained based on the amount of resources used, examined in each of the resource usage surveying means 106, 122, and 114.

Thereafter, in the originating transfer confirmation control means 103 in the originating exchange 10, the transmission completion information receiving means 103A receives both transmission completion report information and the intra-network facility use information from the destination transfer confirmation and control means 113 in the destination node. The charging index setting request means 103 C outputs charging index setting request in accordance with a result received by the transmission completion report information receiving means 103A.

In the charging function means 105, the charging index setting means 105A sets a different charging index based on both a request from the charging index setting request means 103C in the originating transfer confirmation control means 103 and intra-network facility use information obtained by the originating transfer confirmation and control means 103. The charging means 105B performs a charging operation in accordance with a charging index set by the charging index setting means 105A.

Moreover, according to the present invention shown in FIG. 3, in order to perform data communications in the data switching network 1, intra-network facility use between the originating node and the receiving node is examined. When receiving the intra-network facility use information together with transmission completion report information from the destination node, the originating node measures a delay time delayed to transfer data from the originating node to the receiving node. The originating node also sets a different charging index in accordance with the delay time and the intra-network facility use information to perform a charging operation.

In other words, in order to perform data communications in the data switching network 1, the signal processing unit 101 in the originating exchange 10 receives a signal from the originating terminal 100 to perform a suitable signal process. Then the transfer processing unit 102 notifies the originating transfer confirmation and control means 103 of a signal origination in response to the signal from the signal processing unit 101, while it transfers the same to the destination exchange 11 via the transit exchange 12.

Thereafter, the transfer processing unit 111 in the destination exchange 11 transfers a signal from the signal processing unit 112 to the signal processing unit 112 in response to the signal from the originating node via the intermediate node. When receiving the signal from the originating node via both the intermediate node and the transfer processing unit 111, the signal processing unit 112 notifies the destination transfer confirmation and control means 113 of the signal origination while it outputs the signal to the destination terminal 200. In response to the signal from the originating node via the intermediate node, the destination transfer confirmation and control means 113 transmits information to the originating node, together with transmission completion report information, the former information regarding the intra-network facility use ranging from the originating node to the receiving node and being obtained based on the amount of resources used, examined by each of the resource use surveying means 106, 122, and 114.

Thereafter, in the originating transfer confirmation and control means 103 in the originating exchange 10, the transmission completion report information receiving means 103A receives transmission completion report information and intra-network facility use information from the destination transfer confirmation and control means 113 in the receiving node. The delay time measurement requesting means 103B delivers a delay time measuring request when data is transferred from the originating node to the destination node. The charging index setting and requesting means 103C delivers a charging index setting request when data is transferred from the originating node to the destination node.

The delay time measuring means 104 receives a request from the delay time measurement requesting means 103A in the originating transfer confirmation and control means 103 to measure a delay time when data is transferred from the originating node to the receiving node.

In the charging function means 105, the charging index setting means 105A sets a different index based on a request from the charging index setting and requesting means 103C in the originating transfer confirmation and control means 103, a delay time measured by the delay time measuring means 104, and an intra-network facility use information obtained by the originating transfer confirmation and control means 103. The charging means 105B executes a charging operation based on a charging index set by the charging index setting means 105A.

The delay time measuring means 104 is constituted of originating time memory means, transmission completion report information receiving time memory means, and time difference operating means. The time difference operating means operates a time difference between the time stored by the originating time memory means and the time stored by the transmission completion report information receiving time memory means to calculate a delay time delayed to transfer data from the originating node to the receiving node.

The delay time measuring means 104 is constituted of a counter. The counter is triggered in response to a signal sent from the originating node to the receiving node. When the originating node receives transmission completion report information from the receiving node, the counter ceases its counting operation. The delay time taken to transfer data from originating node to the receiving node is measured based on the counting result at the halt time.

The originating transfer confirmation and control means 103 includes signal information memory means to store information regarding the signal transferred from the originating node to the receiving node. When receiving transmission completion report information from the destination transfer confirmation and control means 113 in the receiving node, a signal collation is performed in accordance with signal information stored in the signal information memory means.

The charging index setting means 105A in the charging function means 105 may include memory means to store a delay time and/or a charging index corresponding to an intra-network facility use information.

As information regarding the amount of equipment used in a network (or intra-network facility use) can be used the amount of buffers used or both the amount of buffers used and the amount of alternate nodes.

According to the present invention, there are the following effects and advantages:

(1) Improved services can be provided by graduating service rates in accordance with a delay with which user data are processed in a data switching network.

(2) Improved services can be provided by graduating service rates in accordance with the number of equipment used in a data switching network.

(3) Careful services can be performed by graduating service rates in accordance with a delay with which user data are processed in a data switching network as well as the number of equipment used in a data switching network.

(4) Delay time can be easily and certainly obtained by merely measuring a signal originating time and a transmission completion report information receiving time.

(5) Delay time can be easily and certainly obtained by means of a simple configuration.

(6) An originating signal can be easily and certainly collated with transmission completion report information returned due to it.

(7) A charging index can be quickly and certainly obtained.

(8) In a data switching network having an intermediate node, careful service can be provided by graduating the service charge system in accordance with a delay in process of user data in a network and the number of equipment used with user data in a network.

(9) An intra-network facility use can be easily recognized.

(b) Explanation of First Embodiment:

An embodiment according to the present invention will be explained with reference to FIG. 4.

Figure 4:
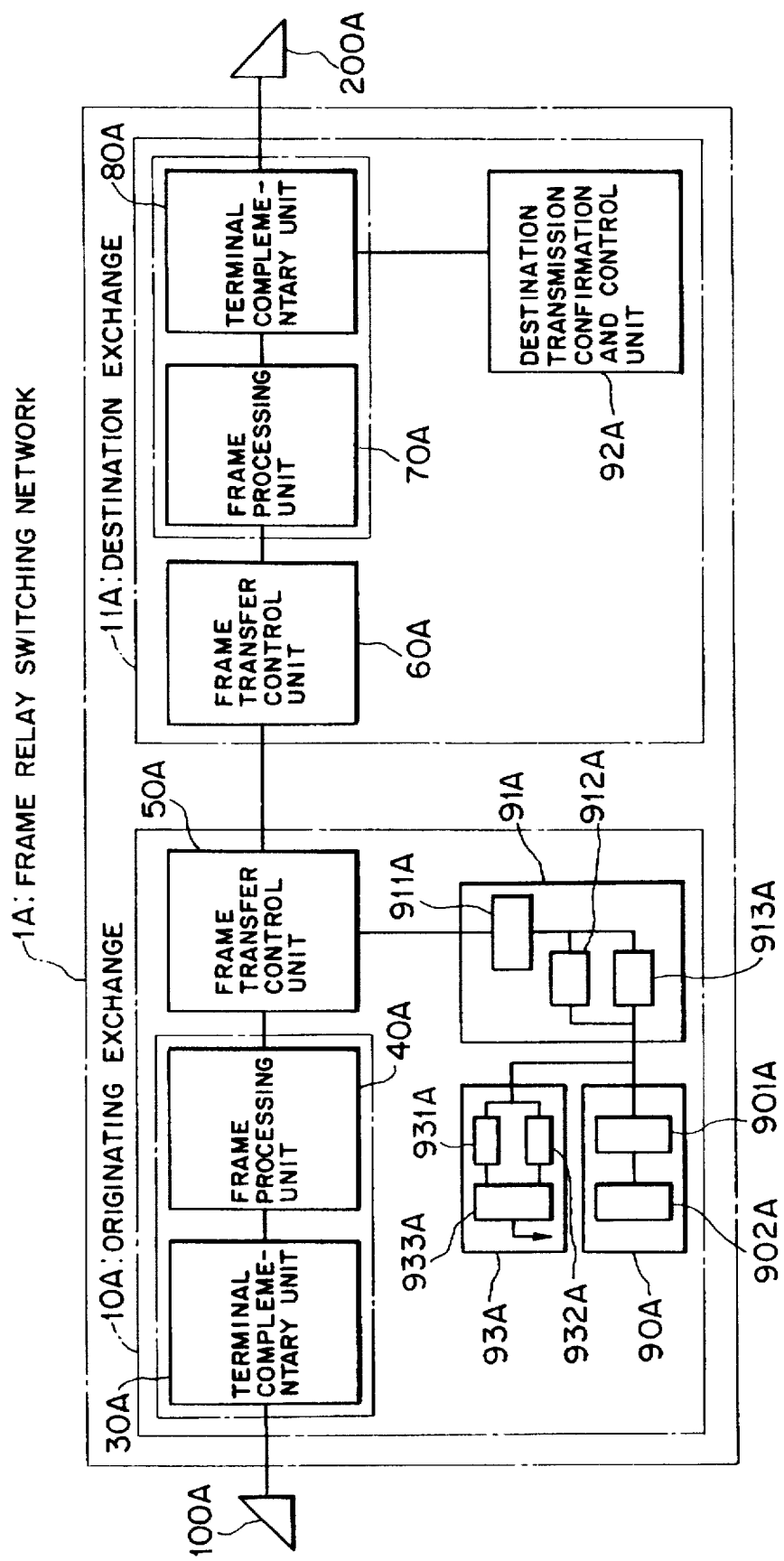
FIG. 4 is a block diagram showing a first embodiment according to the present invention.

FIG. 4 is a block diagram showing the first embodiment of the present invention. Referring to FIG. 4, a frame relay switching network 1A acting as a data switching network includes an exchange 10A on an originating side and an exchange 11A on a destination side. The frame relay exchange 1A is a network that executes communications in accordance with a variable length frame including logic channel information.

The originating exchange 10A constitutes an originating node together with an originating terminal (frame relay terminal) 100A. The destination exchange 11A constitutes a receiving node together with a destination terminal (frame relay terminal) 200A.

The originating exchange 10A includes a terminal complementary unit (signal processing unit) 30A, a frame processing unit (signal processing unit) 40A, a frame transfer control unit (transfer processing unit) 50A, an originating transfer confirmation and control unit (originating transfer confirmation and control means) 91A, a delay time control unit (delay time measuring means) 93A, and a charging function unit (charging function means) 90A.

The destination exchange 11A includes a frame transfer control unit (transfer processing unit) 60A, a frame processing unit (signal processing unit) 70A, a terminal complementary unit (signal processing unit) 80A, and a destination transfer confirmation and control unit (destination transfer confirmation and control means) 92A.

In the originating exchange 10A, the terminal complementary unit 30A receives an user frame signal from the originating terminal 100A. The frame processing unit 40A receives a signal from the originating terminal received by the terminal complementary unit 30A to perform suitably a signal process. Both the terminal complementary unit 30A and the frame processing unit 40A form a signal processing unit which receives a signal from the originating terminal 100A to subject it to a suitable signal process.

Further explanation will be made below as for an operation of each of the terminal complementary unit 30A and the frame processing unit 40A.

Figure 8:
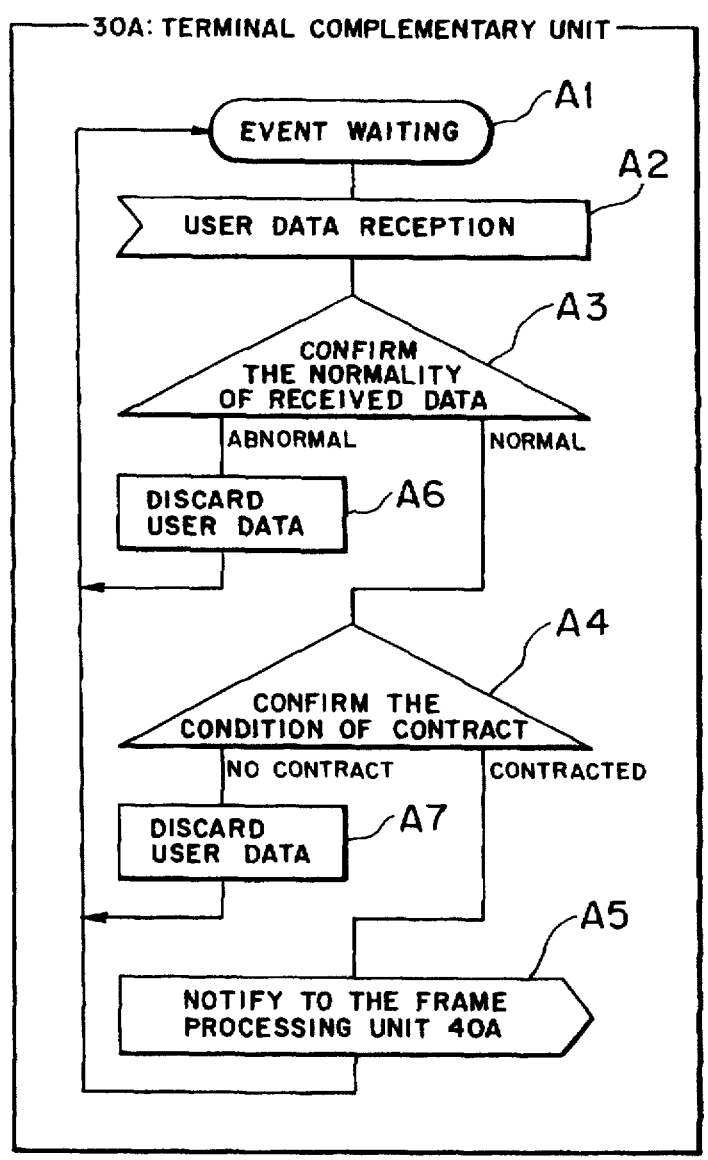
FIG. 8 is a diagram used for explaining an operation of a terminal complementary unit.

When the terminal complementary unit 30A, as shown in FIG. 8, receives user data from the terminal 100A (step A2) after an event waiting status (step A1), it confirms whether the user data is normal in step A3. If the user data is normal, the condition of a contract is confirmed in step A4. If the contract is valid, the fact that the user data has been received is notified to the frame processing unit 40A (step A5). If the step A3 judges that receive data is abnormal or the step A4 judges that the contract is invalid, user data is discarded in steps A6 and A7.

Figure 9:
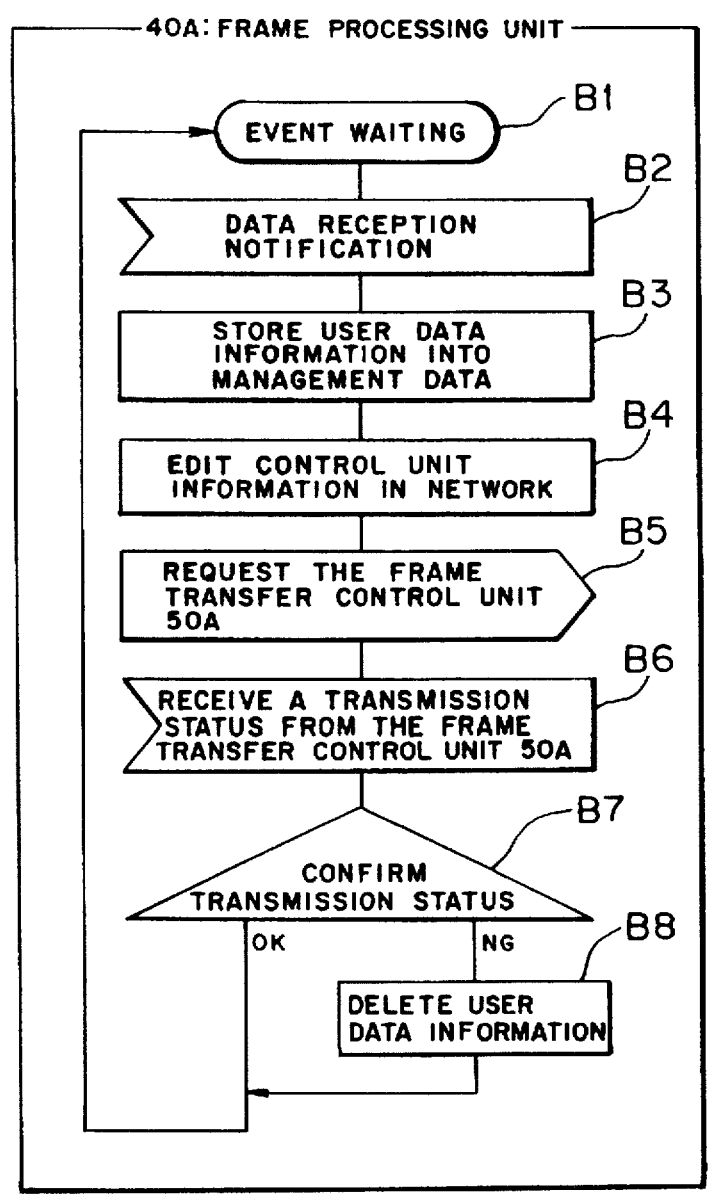
FIG. 9 is a diagram used for explaining an operation of a frame processing unit.

The frame processing unit 40A, as shown in FIG. 9, receives a data reception notification from the terminal complementary unit 30A (step B2) after an event waiting status (step B1), it stores user data information as management data, and edits information regarding the control unit in a network (steps B3 and B4). Thereafter, in steps B5 and B6, the frame processing unit 40A delivers a request to the frame transfer control unit 50A, and then receives a transfer state from the frame transfer control unit 50A. In step B7, the transfer state is confirmed. If OK, the flow goes to an event status. If NG, the user data information is deleted (step B8).

Figure 10:
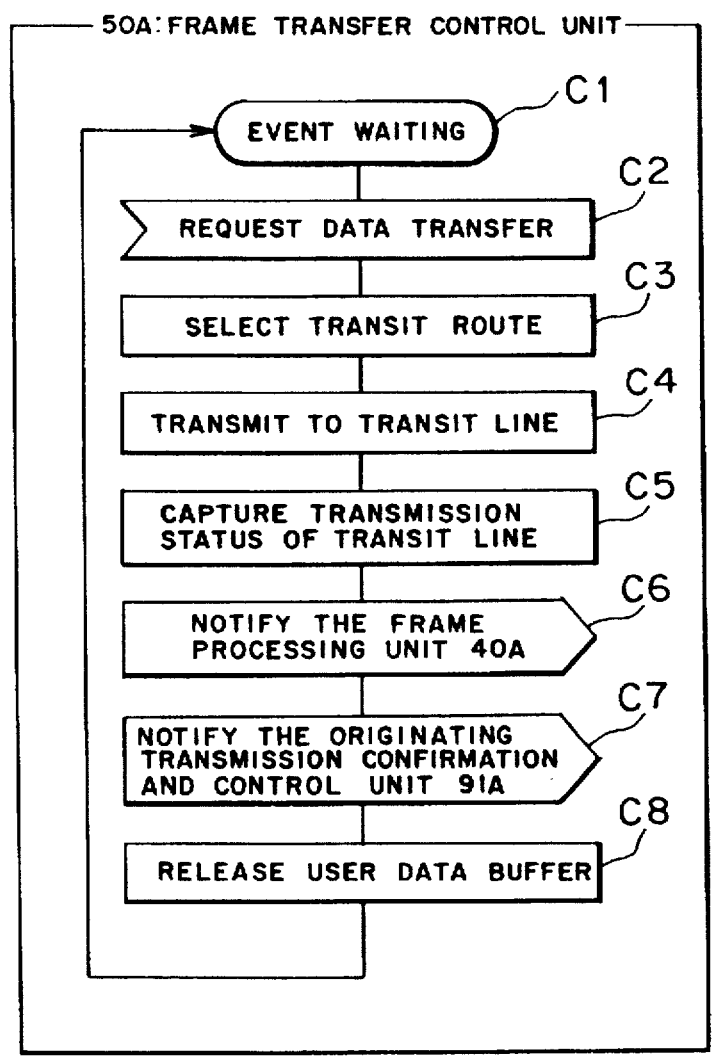
FIG. 10 is a diagram used for explaining an operation of a frame transfer control unit.

When the frame transfer control unit 50A receives a signal from the frame processing unit 40A, a signal origination is notified to the originating transfer confirmation and control unit 91A while an user frame signal is transferred to the destination exchange 11A. The frame transfer function is explained as follows: When the frame transfer control unit 50A, as shown in FIG. 10, receives a data transfer request (step C2) from the frame processing unit 40A after an event waiting status (step C1), it selects a transit route so that the data transfer request is transmitted to a selected transmit trunk line to ensure the transmission status of the transit trunk line (steps C3 to C5). Then, the ensuring operation is notified to the frame processing unit 40A. The signal origination is notified to the originating transfer confirmation and control unit 91A to release the user data buffer (steps C6 to C8).

Figure 11:
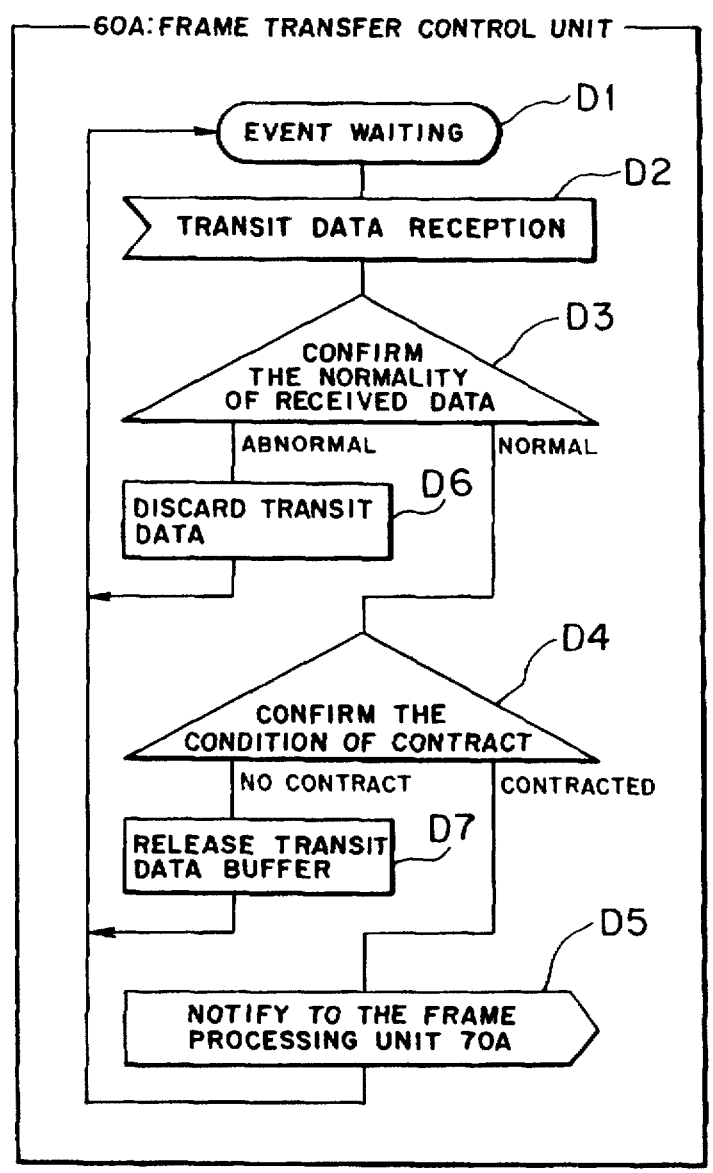
FIG. 11 is a diagram used for explaining an operation of a frame transfer control unit.

When the frame transfer processing unit 60A in the destination exchange 11A receives an user frame signal from the originating exchange 10A, it transfers a signal to the frame processing unit 70A. In the operation, when the frame transfer control unit 60A, as shown in FIG. 11, receives transit data (step D2) after an event waiting status (step D1), the normality of the received data is confirmed in the step D3. If normal, the condition of the contract is confirmed in the step D4. If the contract is valid, the fact that data has been received is notified to the frame processing unit 70A (step D5). If it is judged that the received data is abnormal in the step D3, the transit data received is discarded in the step D6. If the contract is invalid in the step D4, the transit data buffer is released in the step D7.

The frame processing unit 70A subjects a transit data signal received by the frame transfer processing unit 60A to a suitable signal process. The terminal complementary unit 80A notifies the destination transfer confirmation and control means 92A of a signal reception while it outputs a signal to the destination terminal 200A. Both the frame processing unit 70A and the terminal complementary unit 80A constitute a signal processing unit that notifies the destination transfer confirmation and control means 92A of a signal reception when it receives the signal from the originating node via the frame transfer processing unit 60A while it outputs a signal to the destination terminal 200A.

Figure 12:
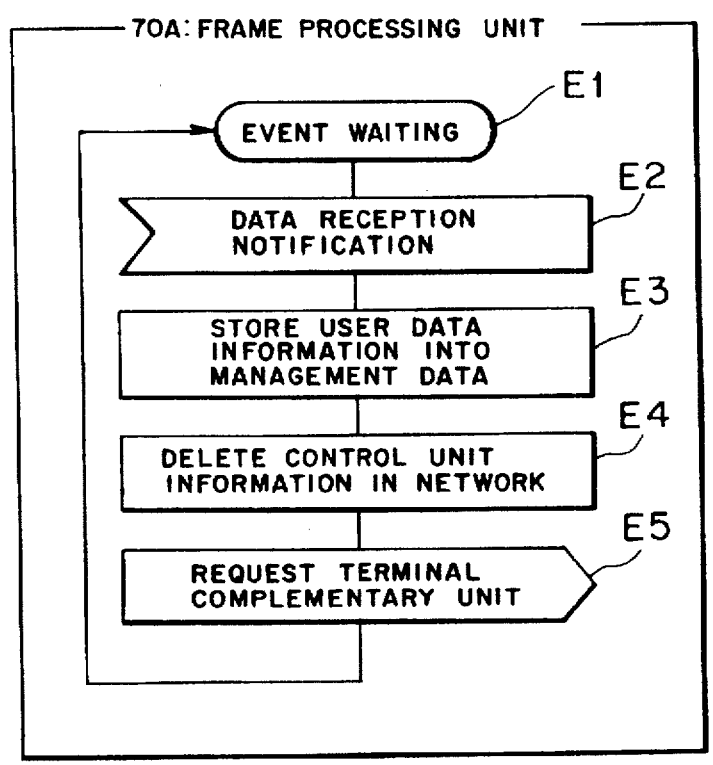
FIG. 12 is a diagram used for explaining an operation of a frame processing unit.

The operation of each of the frame processing unit 70A and the terminal complementary unit 80A will be described below in more detail. When the frame processing unit 70A, as shown in FIG. 12, receives a data reception notification from the frame transfer processing unit 60A (step E2) after an event waiting status (step E1), it stores user data information into management data and edits information regarding the control unit in the network (steps E3 and E4). Then the frame processing unit 70A delivers a signal to the terminal complementary unit 80A.

Figure 13:
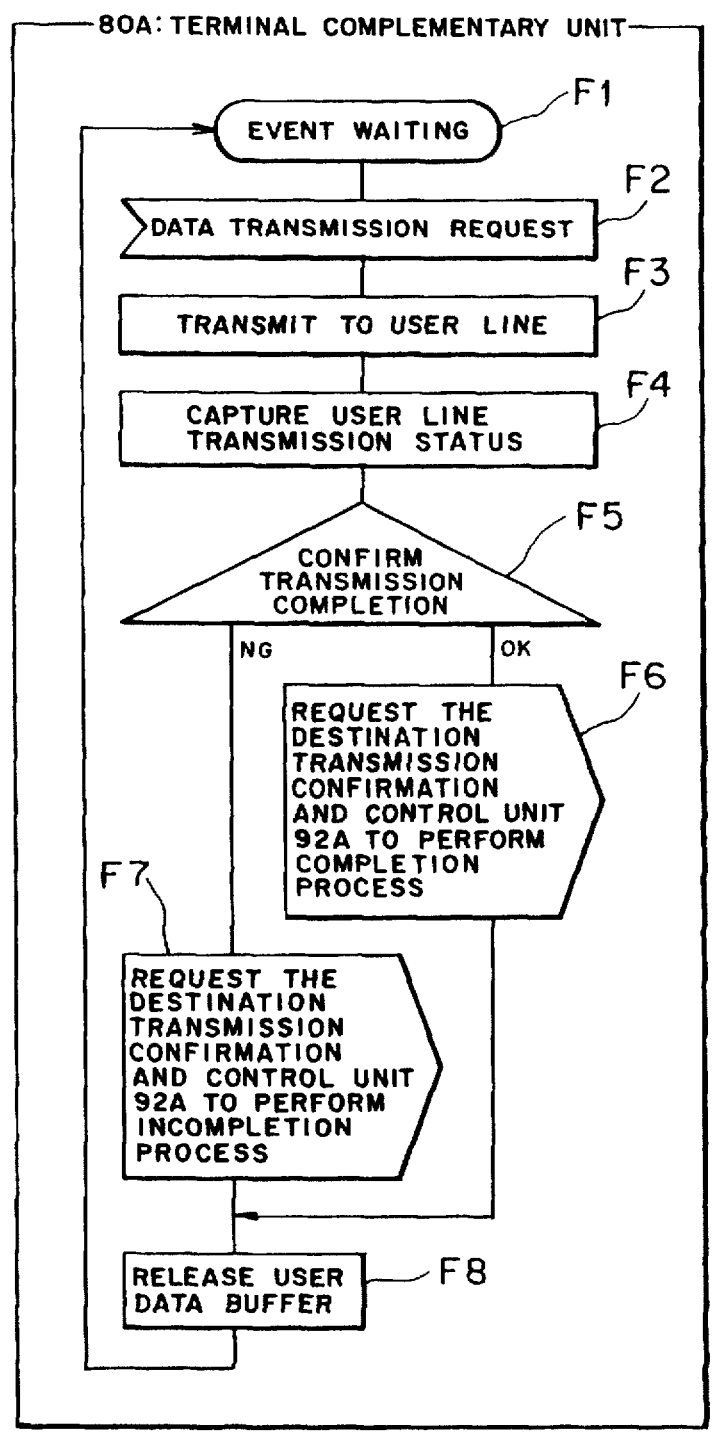
FIG. 13 is a diagram used for explaining an operation of a terminal complementary unit.

The terminal complementary unit 80A, as shown in FIG. 13, receives a data transmission request from the frame processing unit 70A (step F2) after an event waiting status (step F1), it transmits the same to the user line to secure a transit trunk transmission status (steps F3 and F4). Thereafter, a transmission completion is confirmed in the step F5. If OK, a completion process is requested to the destination transfer confirmation and control unit 92A. If NG, an incompletion process is requested to the destination transfer confirmation and control unit 92A (steps F6 and F7). In either case, an user data buffer is released in the step F8.

Figure 14:
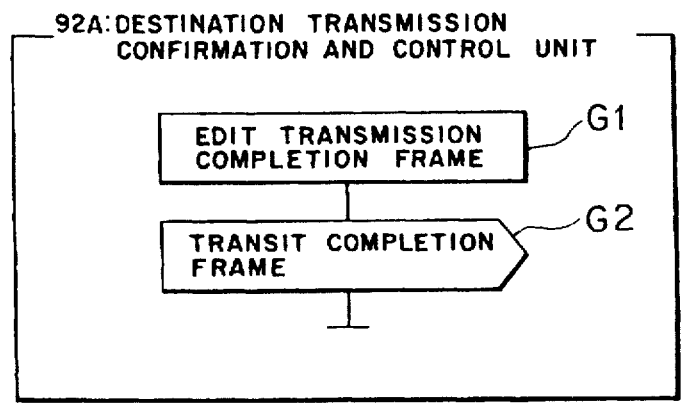
FIG. 14 is a diagram used for explaining an operation of a destination transmission confirmation control unit.
Figure 19:
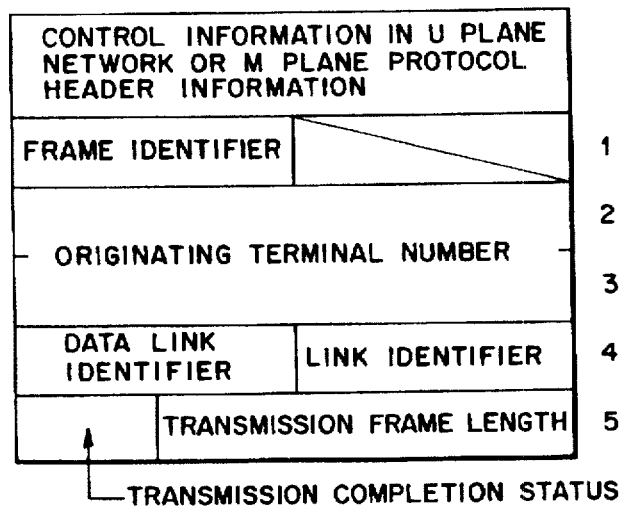
FIG. 19 is a diagram used for explaining a transmission completion frame.

Furthermore, when the destination transfer confirmation and control unit 92A receives a signal from the originating exchange 10A, it transmits transmission completion report information as a transmission completion frame to the originating exchange 10A. As shown in FIG. 14, when the destination transfer confirmation and control unit 92A receives a completion process request from the terminal complementary unit 80A, it edits a transmission completion frame, and then transmits a transmission completion frame (steps G1 and G2). In this case, the transmission completion frame, as shown in FIGS. 5 and 19, includes information regarding an originating terminal number, a data link identifier, a transmission frame length, and a link identifier, in addition to the transmission completion status. U plane intra-network control information or M plane protocol header information is inserted into the transmission completion frame in accordance with a communication line (refer to FIG. 19).

The originating transfer confirmation and control unit 91A in the originating exchange 10A receives a transmission completion frame including transmission completion report information from the destination transfer confirmation and control unit 92A. In accordance with a result received, the originating transfer confirmation and control means 91A also delivers a delay time measuring request to transfer data from the originating exchange 10A to the destination exchange 11A and a charging index setting request. For that reason, the originating transfer confirmation and control means 91A functions as both the transmission completion report information receiving means 911A for receiving a transmission completion frame, the delay time measurement requesting means 912A for delivering a measuring request for a delay time to transfer data from the originating node to the receiving node based on a result received by the transmission completion report information receiving means 911A, and charging index setting and requesting means 913A for delivering a charging index setting request based on a result received by the transmission completion report information receiving means 911A.

The originating transfer confirmation and control unit 91A includes a transfer confirmation and registration list 300A (refer to FIG. 6) acting as signal information memory means for storing information (registration status, terminal number, data link identifier, transmission frame length, registration number) regarding a signal originated from the originating exchange 10A to the destination exchange 11A. When a transmission completion frame is received from the destination transfer confirmation and control unit 92A in the destination exchange 11A, the originating transfer confirmation and control unit 91A executes a signal collation in accordance with signal information (registration status, terminal number, data link identifier, transmission frame length, registration number) stored in the transmission confirmation and registration list 300A. As described above, since the originating transfer confirmation and control unit 91A includes a transmission confirmation and registration list 300A to perform a signal collation, an originating signal can be easily and securely collated with a transmission completion frame returned due to the originating signal.

In response to a request from the delay time measurement requesting means 911A in the originating transfer confirmation and control unit 91A, the delay time control unit 93A measures a delay time taken to transfer data from the originating exchange 10A to the destination exchange 11A.

In this case, the delay time control unit 93A functions as the originating time memory means 931A for storing a time at which an user frame signal is originated from the originating exchange 10A to the destination exchange 11A, the transmission completion report information receiving time memory means 932A for storing a time at which the originating exchange 10A receives a transmission completion frame from the destination exchange 11A, and the time difference operating unit 933A for operating a time difference between a time stored in the originating time memory means 931A and a time stored in the transmission completion report information receiving time memory means 932A and for operating a delay time taken to transfer data from the originating exchange 10A to the destination exchange 11A. The delay time control unit 93A can measure easily and securely a delay time by measuring a signal originating time and a transmission completion frame receiving time.

The charging function unit 90A functions as a combination of the charging index setting means 901A for setting a different index based on a request from the charging index setting request means 913A in the originating transfer confirmation control unit 91A and a delay time measured by the delay time measuring means 93A, and the charging means 902A for performing a charging operation based on a charging index set by the charging index setting means 901A.

The charging index setting means 901A in the charging function unit 90A includes a charging index calculation table 330A acting as memory means for storing a charging index in accordance with a delay time (refer to FIG. 7). The charging index calculation table 330A has a table including a different index every delay time. The charging index can be obtained easily and securely by arranging a charging index calculation table 330A in the charging index setting means 901A.

Next, detail explanation will be made below as for the processing operation of each of the originating transfer confirmation and control unit 91A, the delay time control unit 93A, and the charging function unit 90A.

Figure 15:
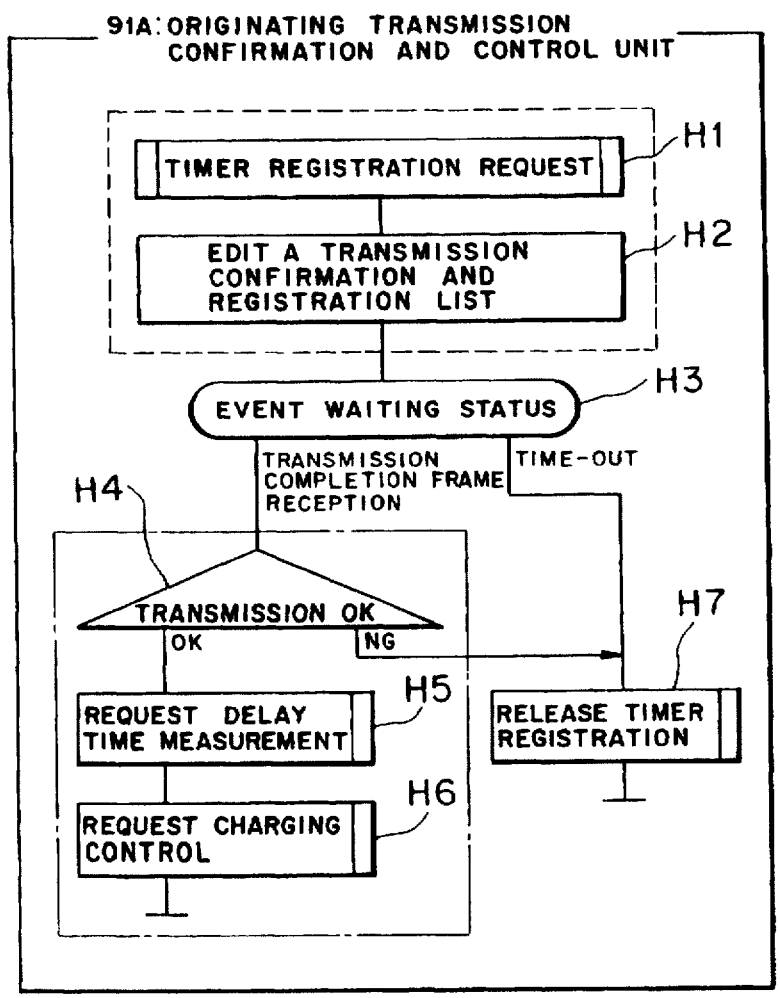
FIG. 15 is a diagram used for explaining an operation of an originating transmission confirmation control unit.

The originating transfer confirmation and control unit 91A, as shown in FIG. 15, executes a timer registration request to edit the transfer confirmation and registration list 300A (steps H1 and H2). Thereafter, the originating transfer confirmation and control unit 93A waits for receiving a transmission completion frame (an event waiting status) from the destination exchange 11A (step H3). In a reception of a transmission completion frame, it is judged whether the transmission is OK in the step H4. If OK, the originating transfer confirmation and control unit 91A outputs a delay time measuring request to the delay time control unit 93A while it outputs a charging control request to the charging function unit 90A (steps H5 and H6).

When a predetermined period of time passes in the transmission completion frame reception waiting status, or gets time-out, the timer registration is released (step H7). If the transmission is NG, the timer registration is released (step H7).

Figure 16:
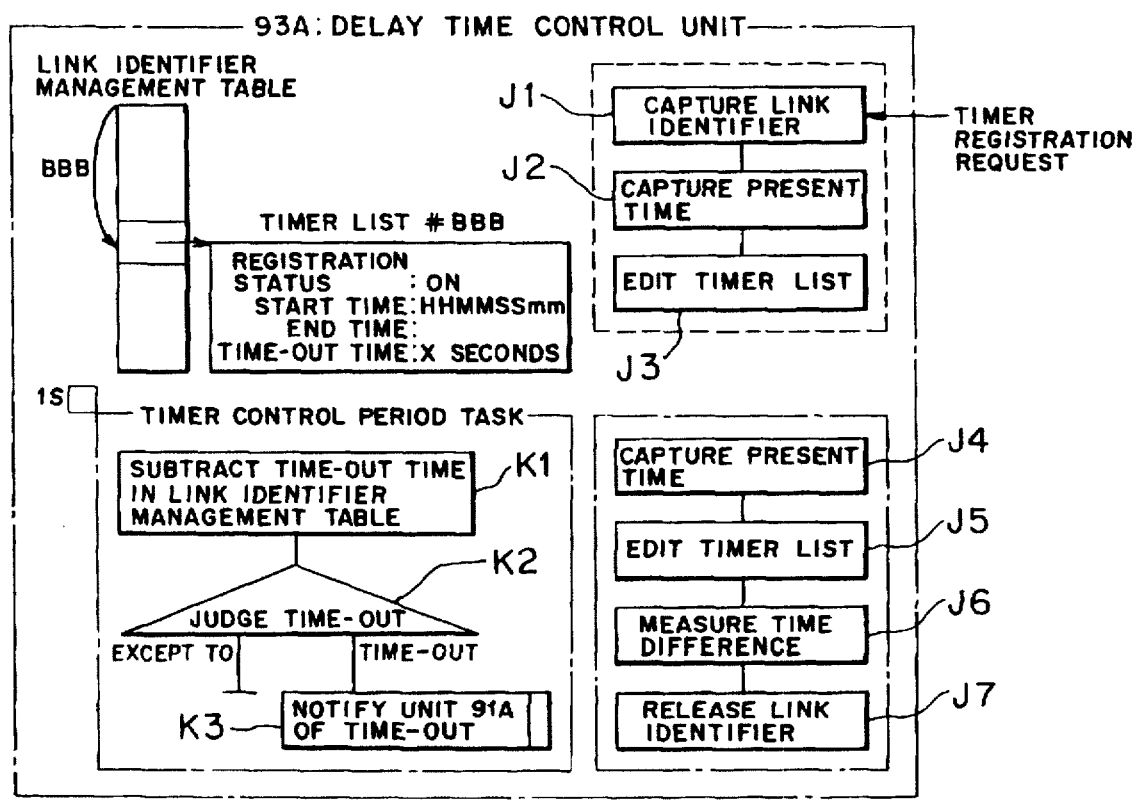
FIG. 16 is a diagram used for explaining an operation of a delay time control unit.

When the originating transfer confirmation and control unit 91A delivers a timer registration request, the delay time control means 93A, as shown in FIG. 16, captures a link identifier. When a present time (a time at which the originating exchange 10A originates a signal to the destination exchange 11A) is obtained, the delay time control unit 93A edits so as to write the originating time into the timer list (steps J1 to J3).

When the originating exchange 10A receives a transmission completion frame from the destination exchange 11A, it captures its receiving time. The receiving time is edited to write down on a timer list (steps J4 and J5).

The current signal originating time (starting time) and the transmission completion frame receiving time (end time) are written on a timer list corresponding to the address BBB, or a registration number of an originating signal being an address in a link identifier management table. Then, a difference time between an originating time and a receiving time is measured (step J6) to release the link identifier (step J7).

The timer list in the link identifier management table includes time-out time information. It is judged whether a time-out time has come in a transmission completion frame reception waiting status by subtracting a time-out time from the link identifier management table in accordance with the timer control period task operating in an event waiting status (steps K1 and K2). At a time-out status, a time-out is notified to the originating transfer confirmation and control unit 91A (step K3). Thus, the originating transfer confirmation and control unit 91A releases a timer registration.

Figure 17:
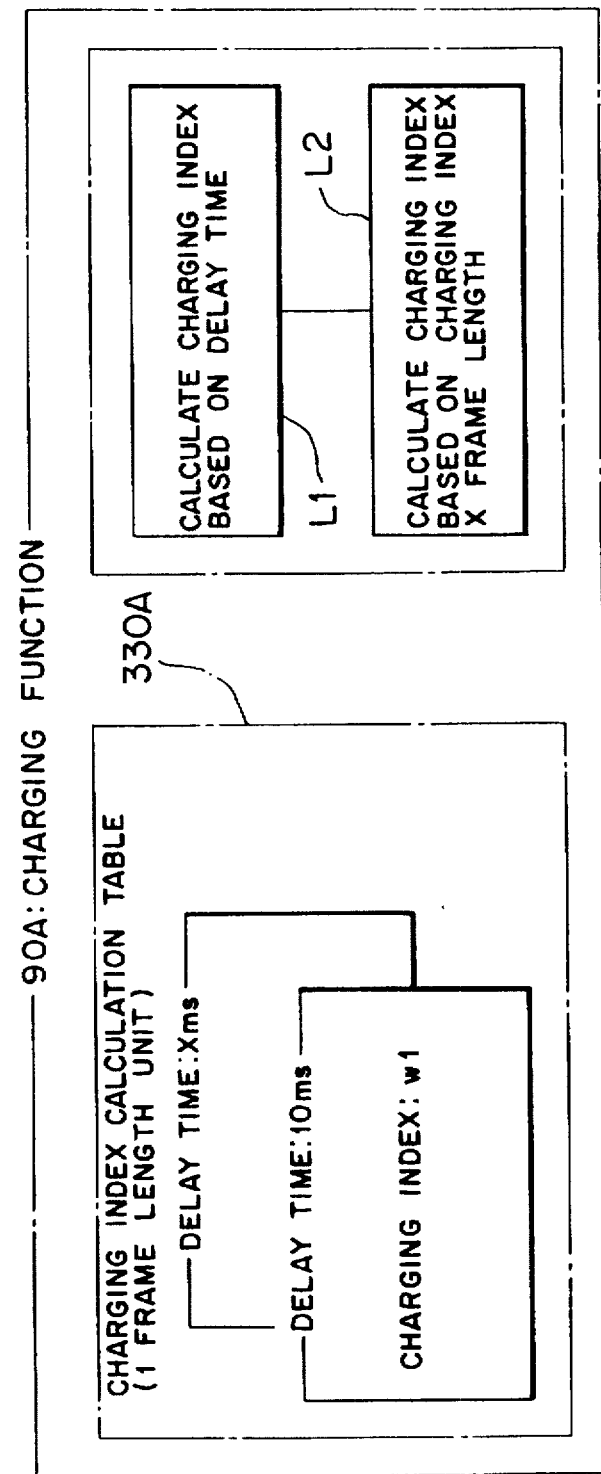
FIG. 17 is a diagram used for explaining an operation of a charging function unit.

As shown in FIG. 17, the charging function means 90A calculates a charging index corresponding to the delay time from the table 330A to obtain a charging index in accordance with (charging index×frame length) (steps L1 and L2).

At the data originating time (user frame originating time) of the originating exchange 10A, the process described above includes a timer registration request in the originating transfer confirmation and control unit 91A, an editing (steps H1 and H2) of the transfer confirmation registration list 300A and a link identifier capture, a present time capture, and a timer list editing (steps J1 to J3). At a transmission completion frame receiving time of the originating exchange 10A, the process described above includes a transmission judgment, a delay time measuring request, a charging control request (steps H4 to H6), a receiving time capture, a timer list editing, a difference time measuring, obtaining a charging index in accordance with a link identifier releasing (steps J4 to J7) and a delay time, and a charging index calculating (steps L1 and L2).

Figure 18:
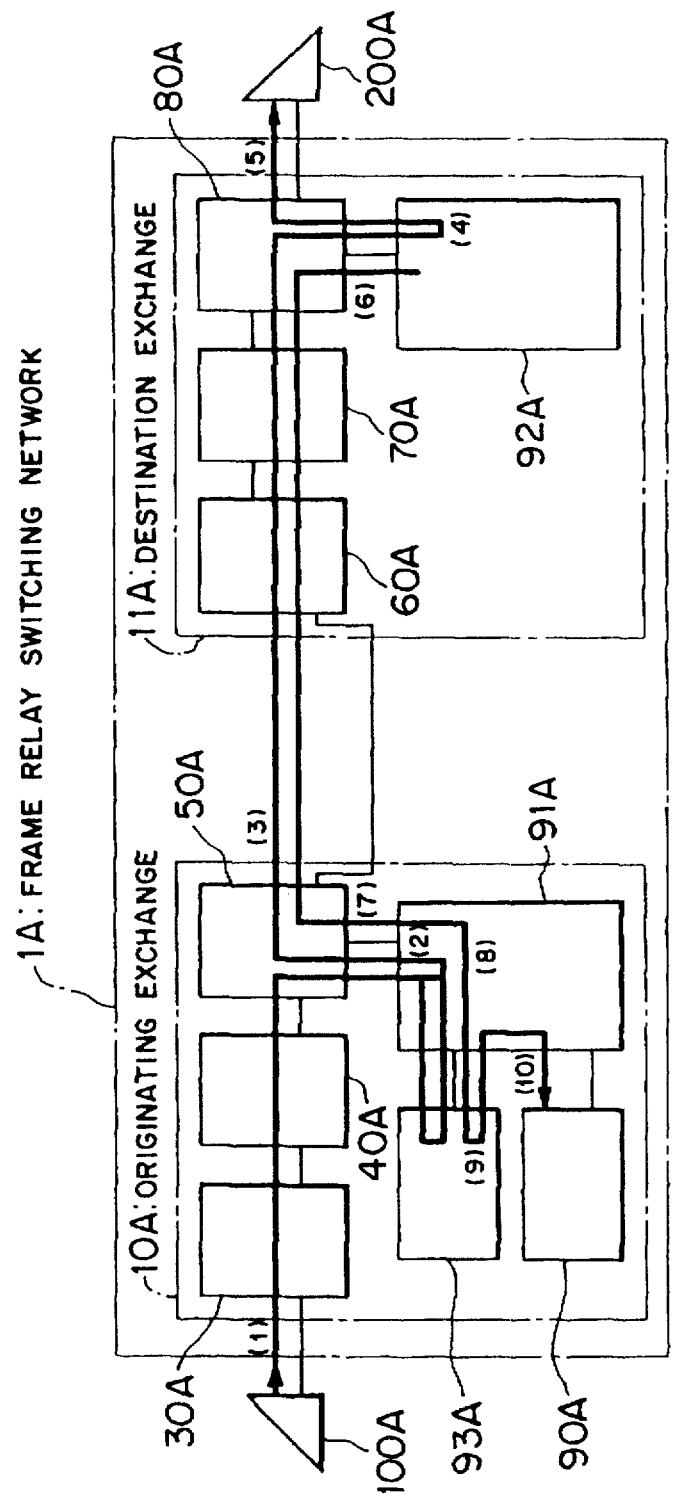
FIG. 18 is a diagram used for explaining an operation of the first embodiment according to the present invention.

In the configuration described above, when the terminal 100A transmits an user frame UD, the terminal complementary unit 30A in the frame relay exchange 10A receives an user frame UD (refer to FIG. 18(1)). Thereafter, after the frame processing unit 40A performs a necessary process, the frame transfer control unit 50A succeeds the process. After the frame transfer control unit 50A requests the originating transfer confirmation and control unit 91A to perform a transmission confirmation and registration, it transmits the user frame UD from one station to another station (refer to FIG. 18(3)).

The originating transfer confirmation and control means 91A captures the registration number BBB to write necessary information onto the transfer confirmation and registration list 300A, and then requests the delay time control unit 93A to start a delay time measurement to the registration number BBB. The delay time control unit 93A starts a timer corresponding to the registration number BBB (Refer to FIG. 18(2)).

The frame transfer control unit 60A in the destination exchange 11A receives an user frame inter-transmitted between stations. After the frame processing unit 70A executes a necessary process of the user frame, the outcome is sent to the terminal complementary unit 80A. The terminal complementary unit 80A transmits the user frame information to the destination transfer confirmation and control unit 92A (refer to FIG. 18(4)) and then transmits the user frame UD to the terminal 200A (refer to FIG. (5)).

The destination transfer confirmation and control unit 92A edits a transmission completion frame and then returns the outcome to the originating transfer confirmation and control unit 91A in the originating exchange 10A (refer to FIG. 18(6)). In response to the transmission completion frame (refer to FIG. 18(7)), the originating transfer confirmation and control unit 91A confirms that the process is in a transfer confirmation and registration status, in reference to the contents of the transmission completion frame and the content of the transmission confirmation and registration list 300A. In the case where the process is in a transmission confirmation and registration operation, the delay time control unit 93 is requested to measure a delay time of the registration number BBB (refer to FIG. 18(8)).

The delay time control unit 93A halts the timer corresponding to the registration number BBB to calculate a delay time (refer to FIG. 18(9)). The originating transfer confirmation and control means 91A having a delay time captured requests the charging function means 90A to execute a charging process (refer to FIG. 18(10)). The charging function unit 90A selects a calculation table corresponding to a delay time specified by the charging index calculation table 330A to calculate a charging index.

Figure 20:
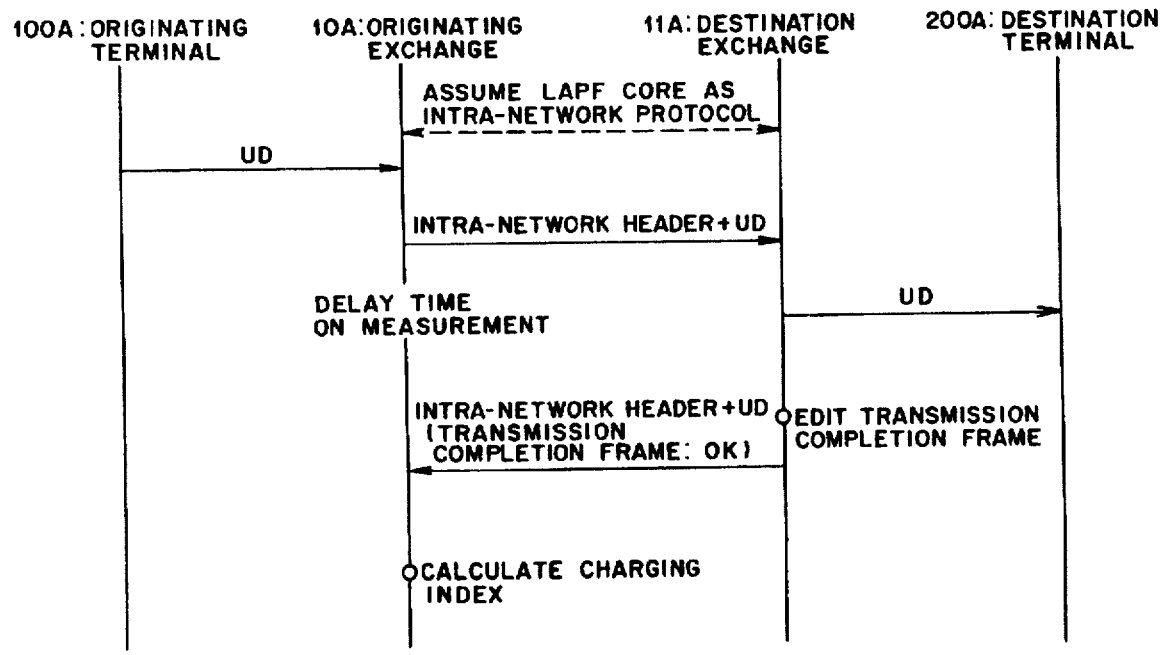
FIG. 20 is a signal sequence diagram used for explaining the first embodiment according to the present invention.

The process described above is shown with the signal sequence diagram in FIG. 20. That is, the originating terminal 100A transmits an user frame UD, the originating exchange 10A transmits both an intra-network header and an user frame UD to the destination exchange 11A. At this time, it is assumed that the intra-network protocol is, for example, an LAPF core. When the frame relay exchange 10A receives an user frame UD, it sends the user frame information to the destination transfer confirmation and control unit 92A, and then transmits it to the destination terminal 200A. Thus, the destination transfer confirmation and control unit 92A edits a transmission completion frame. The destination exchange 11A transmits an user frame UD to the originating exchange 10A, the user frame UD having information regarding an intra-network header and a transmission completion frame OK. When the originating exchange 10A receives the transmission completion frame 320A, it measures a delay time taken from an origination to a transmission completion frame reception. A charging index is calculated in consideration to the delay time.

Figure 21:
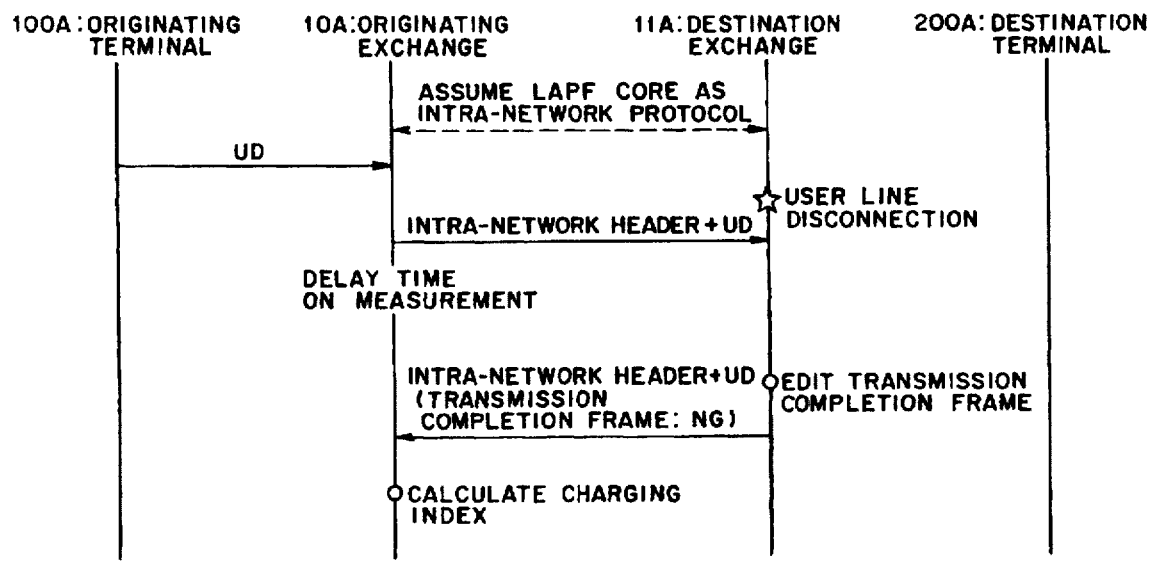
FIG. 21 is a signal sequence diagram used for explaining the first embodiment according to the present invention.

As shown in FIG. 21, a user trunk line is cut before the originating terminal 100A transmits a user frame UD and the destination exchange 11A receives (intra-network header+user frame UD) from the originating exchange 10A. In this case, the destination exchange 11A transmits a user frame UD having information regarding an intra-network header and a transmission completion frame NG to the originating exchange 10A. When the originating exchange 10A receives a transmission completion frame returned, it measures a delay time taken from an origination to the transmission completion frame reception. A charging index is calculated in consideration of the delay time.

Figure 22:
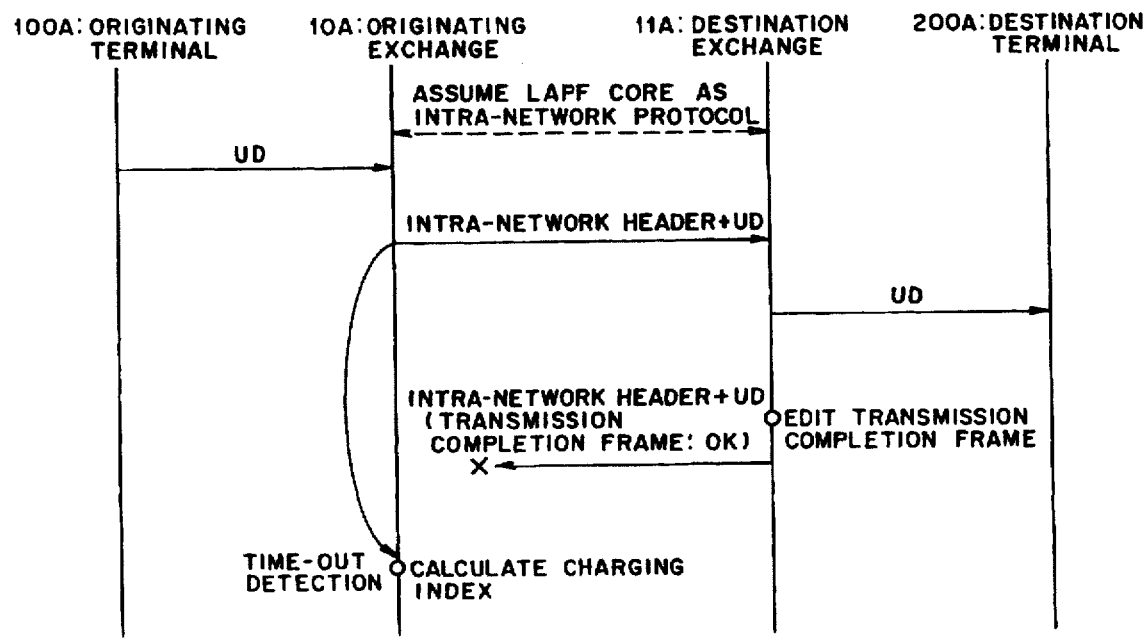
FIG. 22 is a signal sequence diagram used for explaining the first embodiment according to the present invention.

As shown in FIG. 22, even if the originating terminal 100A transmits a user frame UD and the destination exchange 11A receives (an intra-network header+a user frame UD) from the originating exchange 10A, something may not allow the originating exchange 10A to receive the user frame UD having (an intra-network header+transmission completion frame information) from the destination exchange 11A. In this case, the originating exchange 10A detects a time-out, and then calculates suitably a charging index.

As described above, according of the present invention, the charging system can be graduated in accordance with a delay (data transfer delay) in process in a user data network in the frame relay switching network 1A. Hence, services on the charging index can be improved.

(b1) Explanation of First Modification of the First Embodiment:

The first embodiment relates to a frame relay switching network. The first embodiment is applicable to packet switching networks.

Figure 23:
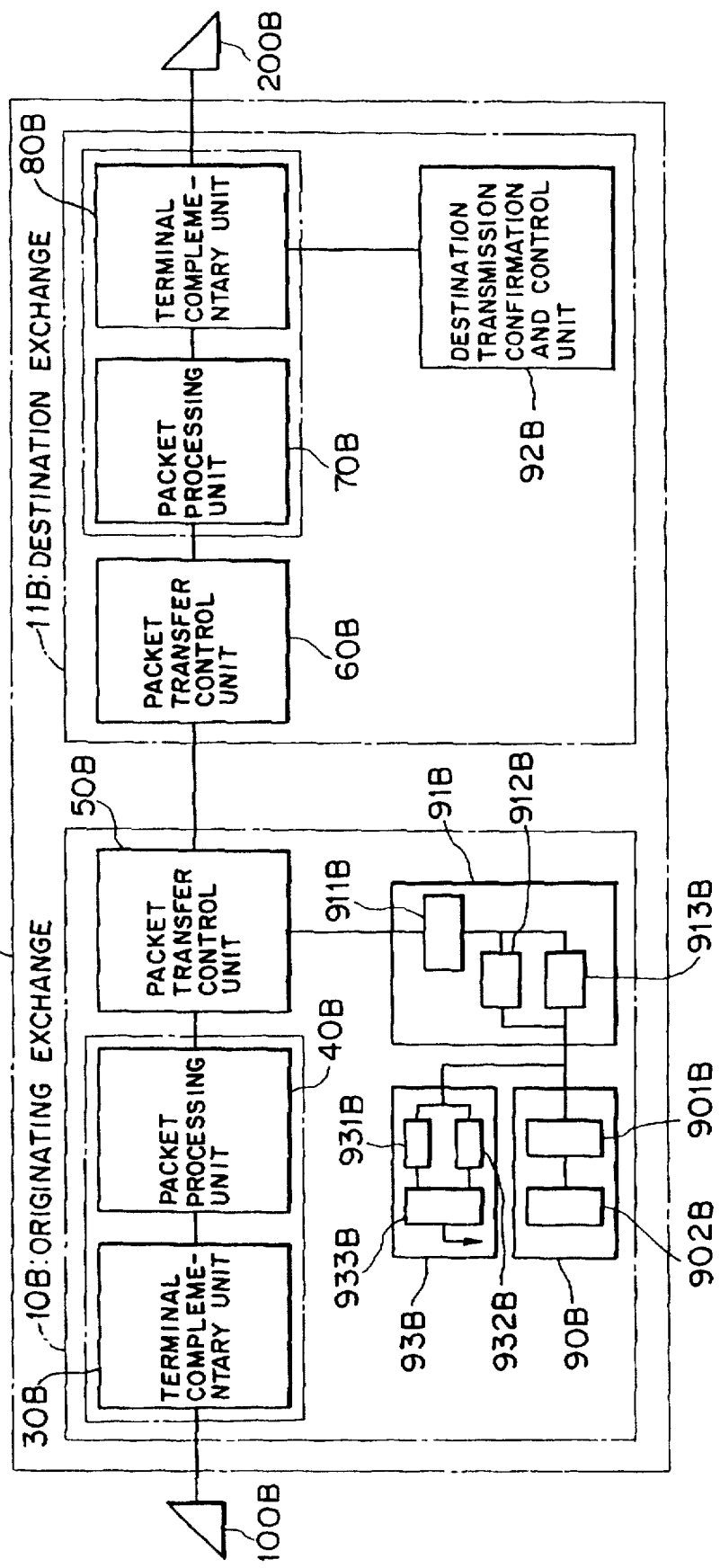
FIG. 23 is a block diagram showing a modification of the first embodiment according to the present invention.

FIG. 23 is a block diagram showing the first embodiment applied to a packet switching network. Referring to FIG. 23, the packet switching network 1B includes an originating exchange 10B and a destination exchange 11B. The packet switching network 1B is a network that enables communications with variable length packet including logical channel information.

The originating exchange 10B constitutes an originating node together with an originating terminal (packet terminal) 100B. The destination exchange 11B constitutes a receiving node together with a destination terminal (packet terminal) 200B.

The originating exchange 10B includes a terminal complementary unit (signal processing unit) 30B, a packet processing unit (signal processing unit) 40B, a packet transfer control unit (transfer processing unit) 50B, an originating transfer confirmation and control unit (originating transfer confirmation and control means) 91B, a delay time control unit (delay time measuring means) 93B, and a charging function unit (charging function means) 90B.

The destination exchange 11B includes a packet transfer control unit (transfer processing unit) 60B, a packet processing unit (signal processing unit) 70B, a terminal complementary unit (signal processing unit) 80B, and a destination transfer confirmation and control unit (destination transfer confirmation and control means) 92B.

The terminal complementary unit 30B in the originating exchange 10B receives a signal from the originating terminal 100B. The packet processing unit 40B subjects a data packet signal to a suitable signal process, the data packet signal being sent from the originating terminal 100B received by the terminal complementary unit 30B. A signal processing unit is formed of the terminal complementary unit 30B and the packet processing unit 40B and receives a signal from the originating terminal 100B to subject it to a suitable signal process.

The operation of each of the terminal complementary unit 30B and the packet processing unit 40B is similar to those shown in FIGS. 8 and 9 (described in the first embodiment). In this case, the process in the step A5 represents "notify the packet processing unit 40B". The process of the steps B5 represents "request to the packet transfer control unit 50B". The process of the step B6 represents "receive a transmission status from the packet transfer control unit 50B".

When the packet transfer control unit 50B receives a signal from the packet processing unit 40B, it notifies the originating transfer confirmation and control unit 91B of the signal origination while it transfers a data packet signal to the destination exchange 11B. The operation regarding the packet transmission corresponds to that shown in FIG. 10 (described above). In this case, the step C6 corresponds to "notify the packet transfer processing unit 40B". The step C7 corresponds to "notify the originating transfer confirmation and control unit 91B".

When receiving a data packet signal from the originating exchange 10B, the packet transfer processing unit 60B in the destination exchange 11B transfers a signal to the packet processing unit 70B. The operation is similar to that in the first embodiment shown in FIG. 11. In this case, the step D5 represents "notify the packet processing unit 70B".

The packet processing unit 70B subjects a signal received by the packet transfer processing unit 60B to a suitable signal process. The terminal complementary unit 80B notifies the destination transfer confirmation and control means 92B of a signal reception and outputs a signal to the destination terminal 200B. Both the packet processing unit 70B and the terminal complementary unit 80B constitute a signal processing unit. The signal processing unit notifies the destination transfer confirmation and control means 92B of a signal reception and outputs a signal to the destination terminal 200B when it receives a signal from the originating node via the packet transfer processing unit 60B.

The operation of each of the packet processing unit 70B and the terminal complementary unit 80B is similar to that of the first embodiment shown in FIGS. 12 and 13. In this case, the step F6 represents "request the destination transfer confirmation and control unit 92B to execute a completion process". The step F7 represents "request the destination transfer confirmation and control unit 92B to execute an incompletion process".

In response to a signal from the originating exchange 10B, the destination transfer confirmation and control unit 92B transfers transfer completion report information as a transmission completion packet to the originating exchange 10B. The process in the destination transfer confirmation and control unit 92B is similar to that in the first embodiment shown in FIG. 14. In this case, the step G1 represents "a transmission completion packet editing". The step G1 represents "a transmission completion packet transmission". The transmission completion packet, as shown in FIG. 24, has information including an originating terminal number, a data link identifier, a transmission packet length and a link identifier, in addition to the transmission completion status. Like the transmission completion frame, control information in an U plane network or the transmission completion packet or M plane protocol header information is inserted into a transmission completion packet in accordance with a communication line on which the transmission completion packet is transmitted.

The originating transfer confirmation and control unit 91B in the originating exchange 10B receives a transmission completion packet including transmission completion report information from the destination transfer confirmation and control unit 92B. The originating transfer confirmation and control unit 91B in the originating exchange 10B also delivers a delay time measuring request and a charging index setting request when data is transferred from the originating exchange 10B to the destination exchange 11B. Hence, the originating transfer confirmation and control unit 91B functions as the transmission completion report information receiving means 911B for receiving a transmission completion packet, the delay time measurement requesting means 912B for delivering a delay time measurement request when data is transferred from the originating node to the receiving node based on a result received by the transmission completion report information receiving means 911B, and the charging index setting and requesting means 913B for delivering a charging index setting request when data is transferred from the originating node to the receiving node based on a result received by the transmission completion report information receiving means 911B.

The originating transfer confirmation and control unit 91B includes a transmission confirmation and registration list 300B (refer to FIG. 25) acting as signal information memory means to store information (registration status, terminal number, data link identifier, transmission packet length, registration number) regarding a signal transmitted from the originating exchange 10B to the destination exchange 11B. When the originating transmission confirmation and control unit 91B receives a transmission completion packet from the destination transfer confirmation and control unit 92B in the destination exchange 11B, it collates a signal based on signal information (registration status, terminal number, data link identifier, transmission packet length, registration number)

stored in the transmission confirmation registration list 300B. As described above, since the originating transfer confirmation and control means 91B includes a transmission confirmation and registration list 300B to perform a collating operation, it is easy and certain to collate an originating signal with a transmission completion packet returned due to the originating signal.

In response to a request from the delay time measurement requesting means 911B in the originating transfer confirmation and control unit 91B, the delay control unit 93B measures a delay time taken to transfer data from the originating exchange 10B to the destination exchange 11B.

In this case, the delay time control unit 93B includes originating time memory means 931B for storing a time at which a data packet signal is outputted from the originating exchange 10B to the destination exchange 11B, transmission completion report information receiving time memory means 932B for storing a time at which the originating exchange 10B receives a transmission completion packet from the destination exchange 11B, and time difference operating means 933B for operating a time difference between a time stored in the originating time memory means 931B and a time stored in the transmission completion report information receiving time memory means 932B and for operating a delay time taken to transfer data from the originating exchange 10B to the destination exchange 11B. Hence the delay time control unit 93B can obtain easily and securely a delay time by merely measuring a signal originating time and a transmission completion packet receiving time.

The charging function unit 90B includes charging index setting means 901B for setting a different index based on a request from the charging index setting request means 913B in the originating transfer confirmation and control unit 91B and a delay time measured by the delay time measuring means 93B, and charging means 902B for performing a charging operation based on a charging index set by the charging index setting means 901B.

The charging index setting means 901B in the charging function means 90B includes a charging index calculation table (refer to FIG. 26) 330B acting as memory means for storing a charging index in accordance with a delay time. The charging index calculation table 330B has a table including different charging indexes set every delay time. As described above, a charging index can be obtained quickly and securely by arranging the charging index calculation table 330B in the charging index setting means 901B.

The processing operation of the originating transfer confirmation and control means 91B is similar to that in the first embodiment shown in FIG. 15. However, in this case, a transmission completion packet is waited in the step H3.

The processing operation of the delay time control unit 93B is similar to that in the first embodiment shown in FIG. 16. In this case, the process in the step K3 is "notify the originating transfer confirmation and control unit 91B of time-out".

The operation of the charging function unit 90B is similar to that in the first embodiment shown in FIG. 17. In this case, one packet length unit is used for the charging index calculation table.

In this case, the originating transfer confirmation and control unit 91B performs a timer registration request, an editing of the transfer confirmation and registration list 300B, a link identifier capture, a present time capture, and a timer list editing are performed at a data origination time (data packet origination) from the originating exchange 10B. When the originating exchange 10B receives a transmission completion packet, various processes including a transmission judgment, a delay time measuring request, a charging control request, a reception time capture, a timer list editing, a difference time measuring, a link identifier releasing, a charging index calculating based on a delay time, and a charging index calculating are performed.

Figure 27:
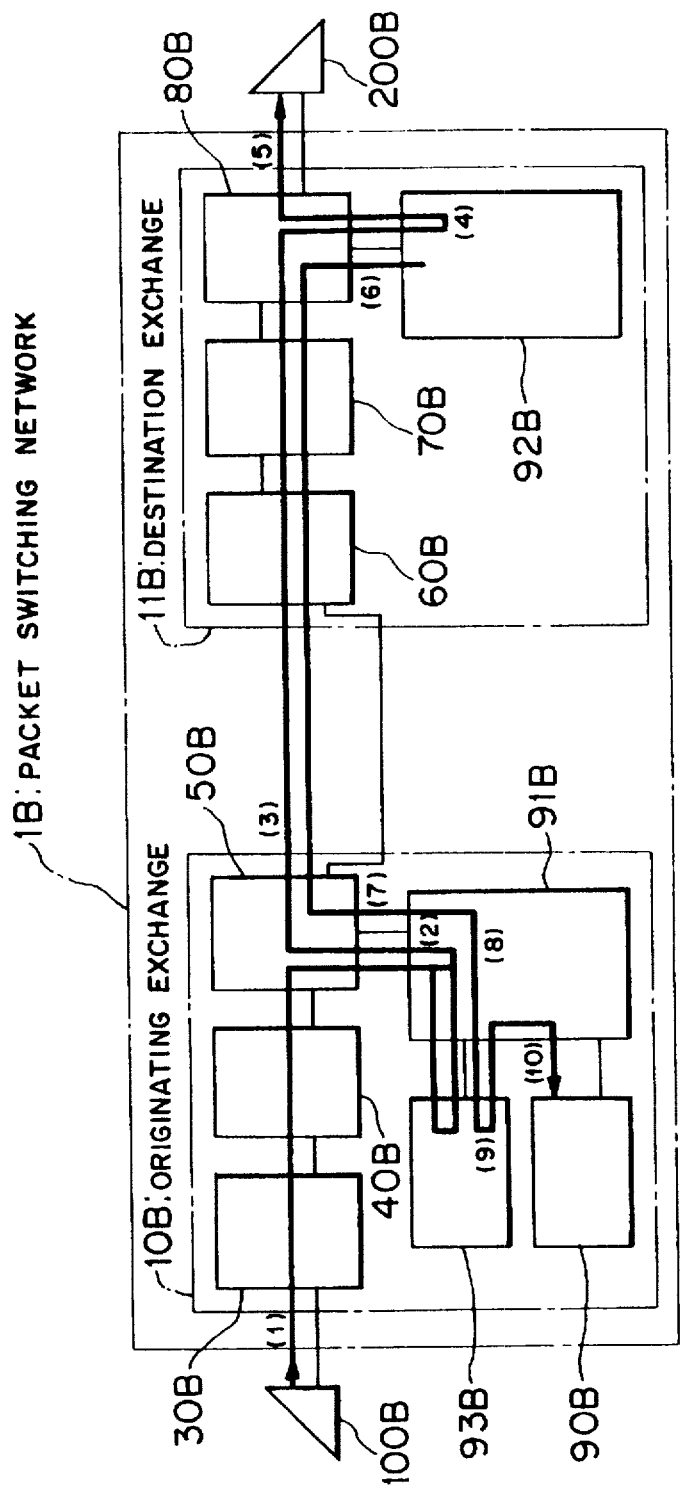
FIG. 27 is a block diagram used for explaining an operation of the first modification of the first embodiment according to the present invention.

When the terminal 100B transmits a data packet DT, the terminal complementary 30B in the packet exchange 10B receives it (refer to FIG. 27(1)). Then, after the packet processing unit 40B executes a necessary process, the packet transfer control unit 50B takes over the process flow. After the packet transfer control unit 50B requests the originating transfer confirmation and control unit 91B to execute a transfer confirmation and registration, it transmits the data packet DT from a station to a station (refer to FIG. 27(3)).

The originating transfer confirmation and control means 91B captures a registration number BBB to write necessary information onto a transfer confirmation and registration list 300B and to request the delay time control unit 93B to start a delay time measurement of a corresponding registration number BBB. The delay time control unit 93B starts activating a timer corresponding to the registration number BBB (refer to FIG. 27(2)).

The packet transfer control unit 60B in the destination exchange 11B receives a data packet inter-transmitted between stations. After the packet processing unit 70B subjects a necessary process to the data packet, the outcome is taken over to the terminal complementary unit 80B. After the terminal complementary unit 80B sends the data packet information to the destination transfer confirmation and control unit 92B (refer to FIG. 27(4)), it transfers the data packet DT to the terminal 200B (refer to FIG. 27(5)).

The destination transfer confirmation and control unit 92B edits a transmission completion packet and returns the outcome to the originating transfer confirmation and control unit 91B in the originating exchange 10B (refer to FIG. 27(6)). When the originating transfer confirmation and control unit 91B receives a transmission completion packet (refer to FIG. 27(7)), it confirms that transmission is under confirmation and registration, in reference to both the content of the transmission completion packet and the content of the transmission confirmation and registration list 300B. While the transmission is under confirmation and registration, the destination transfer confirmation and control unit 92B requests the delay time control unit 93B to measure a delay time of a registration number BBB (refer to FIG. 27(8)).

The delay time control unit 93B halts the timer corresponding to the registration number BBB to calculate a delay time (refer to FIG. 27(9)). The originating transfer confirmation and control unit 91B, which has captured the delay time, requests the charging function unit 90B to perform a charging operation (refer to FIG. 27(10)). The charging function unit 90B selects a calculation table corresponding to a delay time specified by the charging index calculation table 330B to calculate a charging index.

Figure 28:
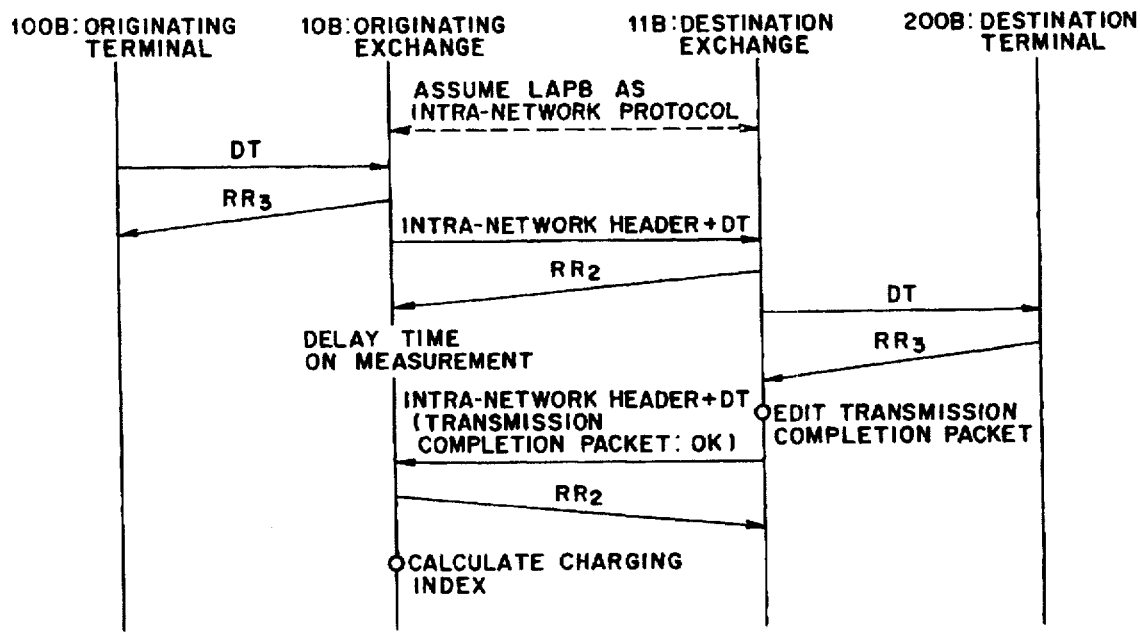
FIG. 28 is a signal sequence diagram used for explaining an operation of the first modification of the first embodiment according to the present invention.

The process described above is shown with the signal sequence diagram in FIG. 28. When the originating terminal 100B transmits the data packet DT, the originating exchange 10B returns the layer 2 receivable packet RR3 to the originating terminal 100B and transmits both an intra-network header and a data packet DT to the destination exchange 11B. At this time, it is assumed that the intra-network protocol is, for example, LAPB. After the destination exchange 10B receives a data packet DT, it returns the layer 3 receivable packet RR3 to the originating exchange 10B. The destination exchange 10B sends data packet information to the destination transfer confirmation and control unit 92B and then transmits data packet DT to the destination terminal 200B. After a reception of the data packet DT, the destination terminal 200B returns the layer 3 receivable packet RR3 to the destination exchange 11B. The destination transfer confirmation and control unit 92B edits a transmission completion packet. The destination exchange 11B transmits a data packet DT having information including an intra-network header and a transmission completion packet OK to the originating exchange 10B. When the originating exchange 10B receives the transmission completion packet, it returns the layer 2 receivable packet RR2 to the destination exchange 11B, measures a delay time taken between an origination and a transmission completion frame reception, and calculates a charging index in consideration of the delay time.

Figure 29:
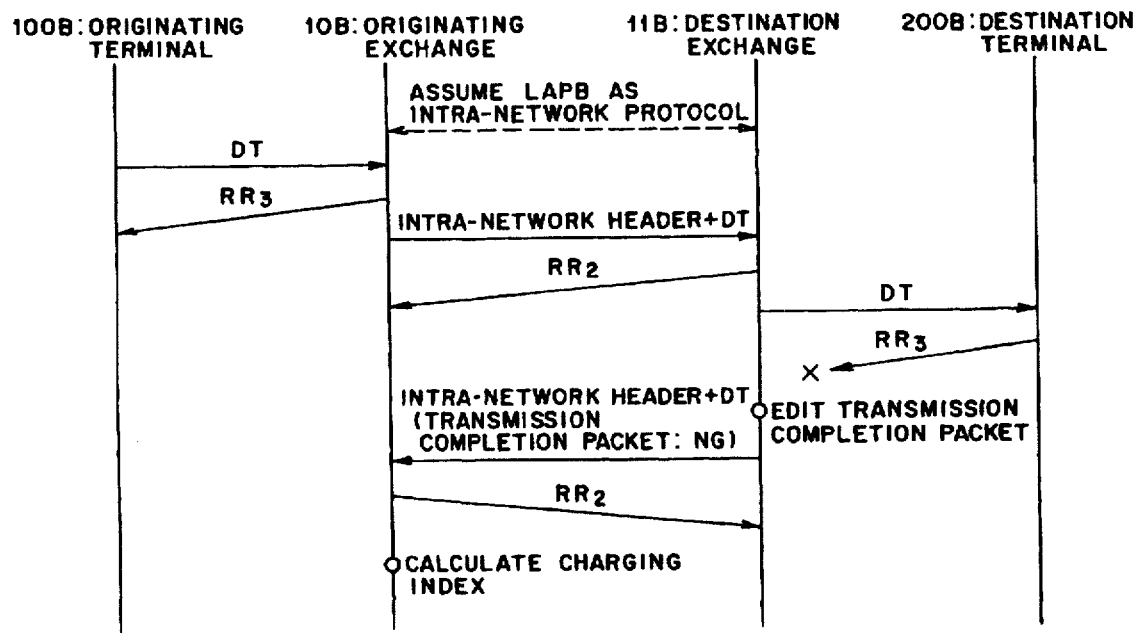
FIG. 29 is a signal sequence diagram used for explaining an operation of the first modification of the first embodiment according to the present invention.

As shown in FIG. 29, the originating terminal 100B transmits the data packet DT. The destination exchange 11B receives (intra-network header+data packet DT) from the originating exchange 10B. The destination terminal 200B receives a data packet DT. In this case, if the destination exchange 11B should not receive the layer 3 receivable packet RR3, the destination exchange 11B transmits data packet DT having information including an intra-network header and a transmission completion packet NG to the originating exchange 10B. In this case, when the originating exchange 10B receives a transmission completion packet returned, it measures a delay time taken between an origination and a transmission completion packet reception and then calculates a charging index in consideration of the delay time.

Figure 30:
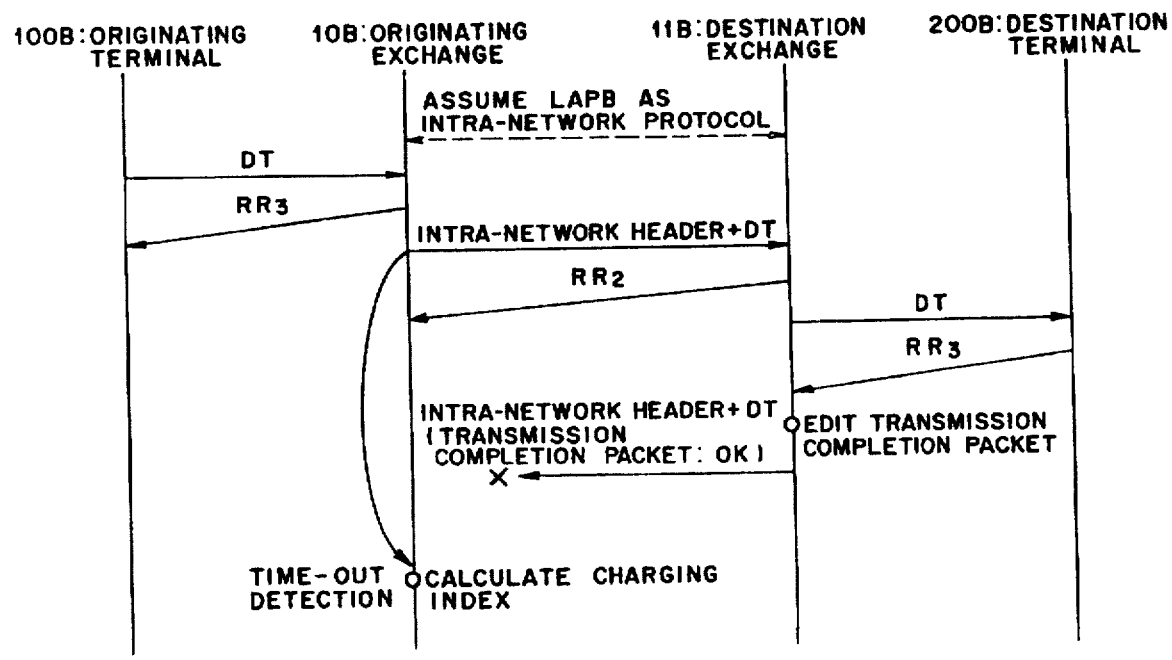
FIG. 30 is a signal sequence diagram used for explaining an operation of the first modification of the first embodiment according to the present invention.

As shown in FIG. 30, even if the originating terminal 100B transmits a data packet DT and the destination exchange 11B receives (intra-network header+data packet DT) from the originating exchange 10B, something may not allow the originating exchange 10B to receive the data packet DT having information including (intra-network header+transmission completion packet ) from the destination exchange 11B. In this case, the originating exchange 10B detects the time-out and then calculates suitably a charging index.

As described above, since the charging system can be graded by a delay in process (data transfer delay) in an user data network of the packet exchange 1B, improved services can be provided to a charging index system.

Figure 31:
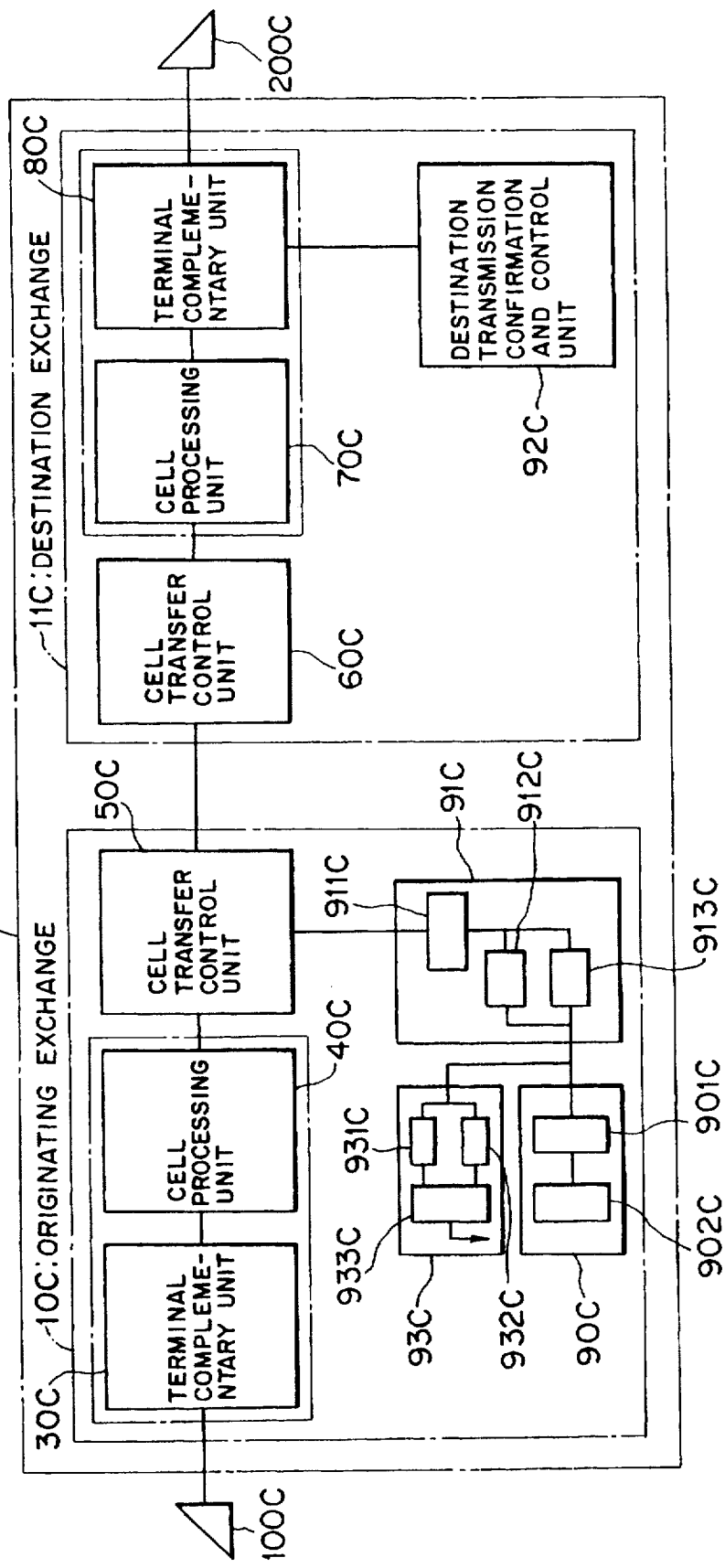
FIG. 31 is a block diagram showing the second modification of the first embodiment according to the present invention.

(b2) Explanation of the Second Modification of the First Embodiment:

The first embodiment relates to a frame relay switching network. The first modification of the first embodiment relates to a packet switching network. Both the first embodiment and the first modification of the first embodiment are applicable to ATM switching networks. FIG. 31 is a block diagram showing an ATM switching network embodying the first embodiment. Referring to FIG. 31, the ATM switching network 1C includes an originating exchange 10C and a destination exchange 11C. The ATM switching network 1C is a network used for communications with fixed length cells each having a control region and an information region.

The originating exchange 10C constitutes an originating node together with an originating terminal (ATM terminal) 100C. The destination exchange 11C constitutes a receiving node together with an originating terminal (ATM terminal) 200C.

The originating exchange 10C includes a terminal complementary unit (signal processing unit) 30C, a cell processing unit (signal processing unit) 40C, a cell transfer control unit (transfer processing unit) 50C, an originating transfer confirmation and control unit (originating transfer confirmation and control means) 91C, a delay time control unit (delay time measuring means) 93C, and a charging function unit (charging function means) 90C.

The destination exchange 11C includes a cell transfer control unit (transfer processing unit) 60C, a cell processing unit (signal processing unit) 70C, a terminal complementary unit (signal processing unit) 80C, and a destination transfer confirmation and control unit (destination transfer confirmation and control means) 92C.

The terminal complementary unit 30C in the originating exchange 10C receives a signal from the originating terminal 100C. The cell processing unit 40C subjects a user cell signal from the originating terminal 100C received by the terminal complementary unit 30C to a suitable signal process. Both the terminal complementary unit 30C and the cell processing unit 40C constitutes a signal processing unit that receives a signal from the originating terminal 100C to subject it to a suitable signal process.

The operation of each of the terminal complementary unit 30C and the cell processing unit 40C is similar to that in the first embodiment shown in FIGS. 8 and 9. In this case, the process in the step A5 is "notify the cell processing unit 40C". The operation in the step C5 is "request the cell transfer control unit 50C". The operation in the step C6 is "receive the transmission status from the cell transfer control unit 50C".

The cell transfer control unit 50C notifies the originating transfer confirmation and control unit 91C of a signal origination in response to a signal from the cell processing unit 40C and transfers a user cell signal to the destination exchange 11C. However, the cell transfer operation is similar to that in the first embodiment shown in FIG. 10. In this case, the process in the step C6 is "notify the cell processing unit 40C". The process in the step C7 is "notify the originating transfer confirmation and control unit 91C".

The cell transfer processing unit 60C in the destination exchange 11C transfers a signal to the cell processing unit 70C in response to a user cell signal from the originating exchange 10C. The operation is similar to that in the first embodiment shown in FIG. 11. In this case, the process in the step D5 is "notify the cell processing unit 70C".

The cell processing unit 70C subjects a signal received by the cell transfer processing unit 60C to a suitable process. The terminal complementary unit 80C notifies the destination transfer confirmation and control means 92C of a signal origination and outputs a signal to the destination terminal 200C. Hence, a combination of the cell processing unit 70C, the terminal complementary unit 80C, and the cell transfer processing unit 60C makes a signal processing unit. When receiving a signal from an originating node, the signal processing unit notifies the destination transfer confirmation and control means 92C of a signal reception and outputs a signal to the destination terminal 200C.

The operation of each of the cell processing unit 70C and the terminal complementary unit 80C is similar to that in the first embodiment shown in FIGS. 12 and 13. In this case, the process in the step F6 is "request the destination transfer confirmation and control unit 92C to perform a completion process". The process in the step F7 is "request the destination transfer confirmation and control unit 92C to perform an incompletion process".

In response to a signal from the originating exchange 10C, the destination transfer confirmation and control unit 92C transfers transmission completion report information in a form of a transmission completion cell to the originating exchange 10C. The process in the destination transfer confirmation and control unit 92C is similar to that in the first embodiment shown in FIG. 14. In this case, the process in the step G1 is "transfer completion cell editing". The process of the step G1 is "transfer completion cell transmission". The transmission completion cell, as shown in FIG. 32, has information including an originating terminal number, data link identifier, transmission cell length (fixed), and link identifier, in addition to the transmission completion status. The transmission completion cell is sent as a maintenance cell via a maintenance communication line (M plane).

The originating transfer confirmation and control unit 91C in the originating exchange 10C receives a transmission completion cell (maintenance cell) including transmission completion report information from the destination transfer confirmation and control unit 92C. The originating transfer confirmation and control unit 91C delivers a delay time measuring request and a charging index setting request when data is transferred from the originating exchange 10C to the destination exchange 11C in accordance with a result received. For that reason, the originating transfer confirmation and control unit 91C includes transfer completion report information receiving means 911C for receiving a transmission completion cell, delay time measuring means 912C for delivering a delay time measuring request when data is transferred from the originating node to the receiving node, and charging index setting request means 913C for delivering a charging index setting request when data is transferred from the originating node to the receiving node.

The originating transfer confirmation and control unit 91C includes a transmission confirmation and registration list 300C acting as signal information memory means for storing information (registration status, terminal number, data link identifier, transmission cell length, registration number) regarding a signal transmitted from the originating exchange 10C to the destination exchange 11C (refer to FIG. 33). When receiving a transmission completion cell from the destination transfer confirmation and control unit 92C in the destination exchange 11C, the originating transfer confirmation and control unit 91C executes a signal collation based on signal information (registration status, terminal number, data link identifier, transmission cell length, registration number) stored in the transfer confirmation and registration list 300C. As described above, the originating transfer confirmation and control unit 91C includes a transfer confirmation and registration list 300 C used to perform the signal collation. Thus, it is possible to collate easily and certainly an origination signal with a transmission completion cell returned with the origination signal.

The delay time control unit 93C receives a request from the delay time measurement requesting means 911C in the originating transfer confirmation and control unit 91C to measure a delay time when data is transferred from the originating exchange 10C to the destination exchange 11C.

The delay time control unit 93C includes originating time memory means 931C for storing a time at which a user cell signal is transmitted from the originating exchange 10C to the destination exchange 11C, transmission completion report information receiving time memory means 932C for storing a time at which the originating exchange 10C receives a transmission completion cell from the destination exchange 11C, and a time difference operating unit 933C for operating a time difference between a time stored in the originating time memory means 931C and a time stored in the transmission completion report information receiving time memory means 932C and for operating a delay time when data is transferred from the originating exchange 10C to the destination exchange 11. In the delay time control unit 93C, a delay time can be obtained easily and securely by merely measuring a signal origination time and a transmission completion cell receiving time.

The charging function unit 90C includes charging index setting means 901C for setting a different charging index based on a request from the charging index setting request means 913C in the originating transfer confirmation and control unit 91C and a delay time measured by the delay time measuring means 93C, and charging means 902C for performing a charging operation based on a charging index set by the charging index setting means 901C.

Moreover, the charging index setting means 901C in the charging function unit 90C includes a charging index calculation table 330C acting as memory means to store a charging index corresponding to a delay time (refer to FIG. 34). The charging index calculation table 330C has a table including a different index set every delay time. As described above, the charging index calculation table 330C in the charging index setting means 901C can obtain a charging index quickly and securely.

The operation of the originating transfer confirmation and control unit 91C is similar to that in the first embodiment shown in FIG. 15. In this case, a transmission completion cell is waited in the step H3 (a maintenance cell).

The operation of the delay time control unit 93C is similar to that in the first embodiment shown in FIG. 16. In this case, the process in the step K3 is "notify the originating transfer confirmation and control unit 91C of time-out".

The operation of the charging function unit 90C is similar to that in the first embodiment shown in FIG. 17. In this case, one cell length unit is used for a charging index calculation table.

A timer registration request in the originating transfer confirmation and control unit 91C, an editing of the transfer confirmation registration list 300C, a link identifier capture, a present time capture, and a timer list editing are performed at a data originating time (a user cell originating time) of the originating exchange 10C. Transfer judgment, a delay time measuring request, a charging control request, a receiving time capture, a timer list editing, a difference time measuring, a link identifier releasing, a charging index calculation based on delay time, and a charging index calculation are performed at a time at which the originating exchange 10C receives a transmission completion cell.

Figure 35:
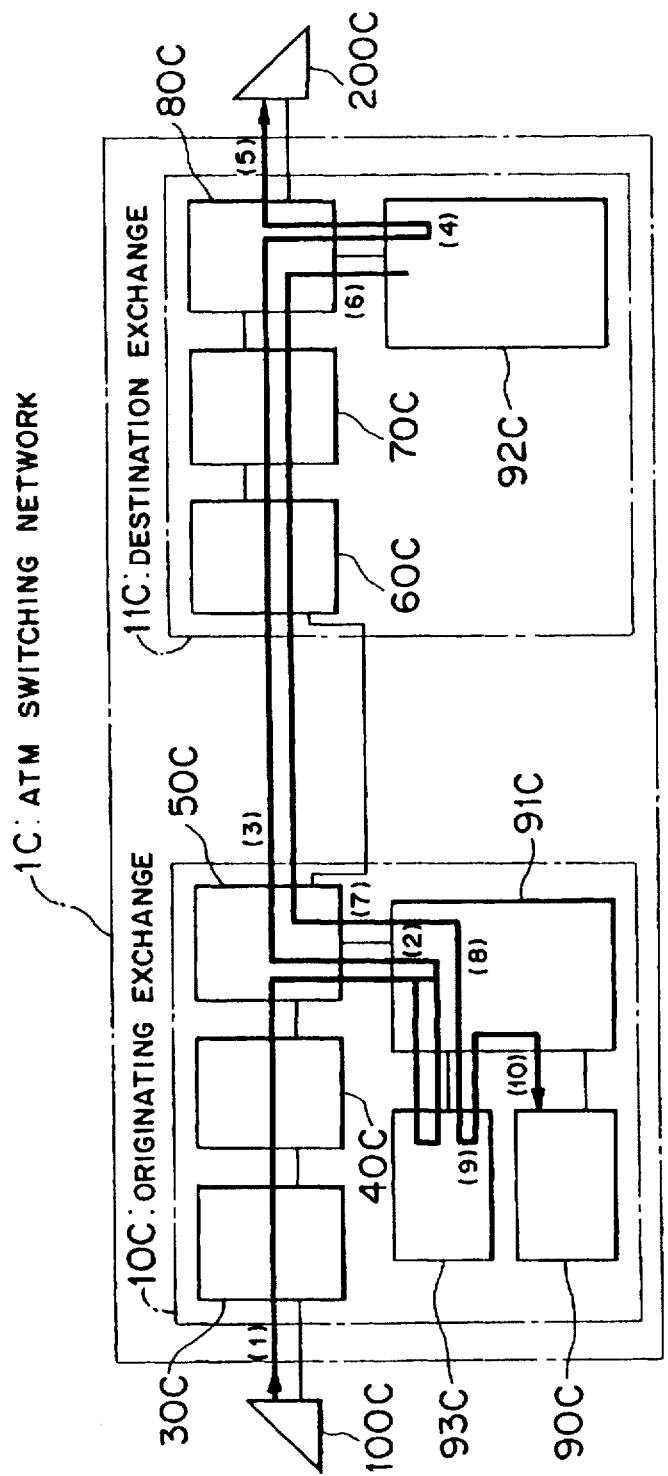
FIG. 35 is a block diagram used for explaining the second modification of the first embodiment according to the present invention.

In the configuration above, the terminal 100C transmits a user cell UC, and then the terminal complementary unit 30C in the cell exchange 10C receives it (refer to FIG. 35(1)). Thereafter, the cell transfer confirmation and control unit 91C takes over it to the cell transfer control unit 50C after a necessary process is made in the cell processing unit 40C. After the cell transfer control unit 50C requests the originating transfer confirmation and control unit 91C of a transfer confirmation and registration, it transmits the user cell UC from a station to a station (refer to FIG. 35(3)).

The originating transfer confirmation and control unit 91C captures a registration number BBB, writes necessary information to the transfer confirmation and registration list 300C, and requests the delay time control unit 93C to start measuring a delay time of the corresponding registration number BBB. The delay time control unit 93C activates a timer corresponding to the registration number BBB (refer to FIG. 35(2)).

The cell transfer control unit 60C in the destination exchange 11C receives a user cell transmitted from a station to a station. The cell processing unit 70C subjects the cell to a necessary process and then sends it to the terminal complementary unit 80C. The terminal complementary unit 80C transmits the user cell information to the destination transfer confirmation and control unit 92C (refer to FIG. 35(4)) and then transmits the user cell UC to the terminal 200C (refer to FIG. 35(5)).

The destination transfer confirmation and control unit 92C edits a transmission completion cell, and returns the outcome to the originating transfer confirmation and control unit 91C in the originating exchange 10C (refer to FIG. 35(6)). The originating transfer confirmation and control unit 91C confirms that transmission is under confirmation and registration, in reference to the content of the transmission completion cell and the content of the transmission confirmation and registration list 300C (refer to FIG. 35(7)). If the transmission is under confirmation and registration, the originating transfer confirmation and control unit 91C requests the delay time control unit 93C to measure the delay time of the registration number BBB (Refer to FIG. 35(8)).

The delay time control unit 93C halts the timer corresponding to the registration number BBB to calculate the delay time (refer to FIG. 35(9)). Then the originating transfer confirmation and control unit 91C, which has captured the delay time, requests the charging function unit 90C to perform a charging process (refer to FIG. 35(10)). The charging function unit 90C selects a calculation table corresponding to a time specified by the charging index calculation table 330C.

Figure 36:
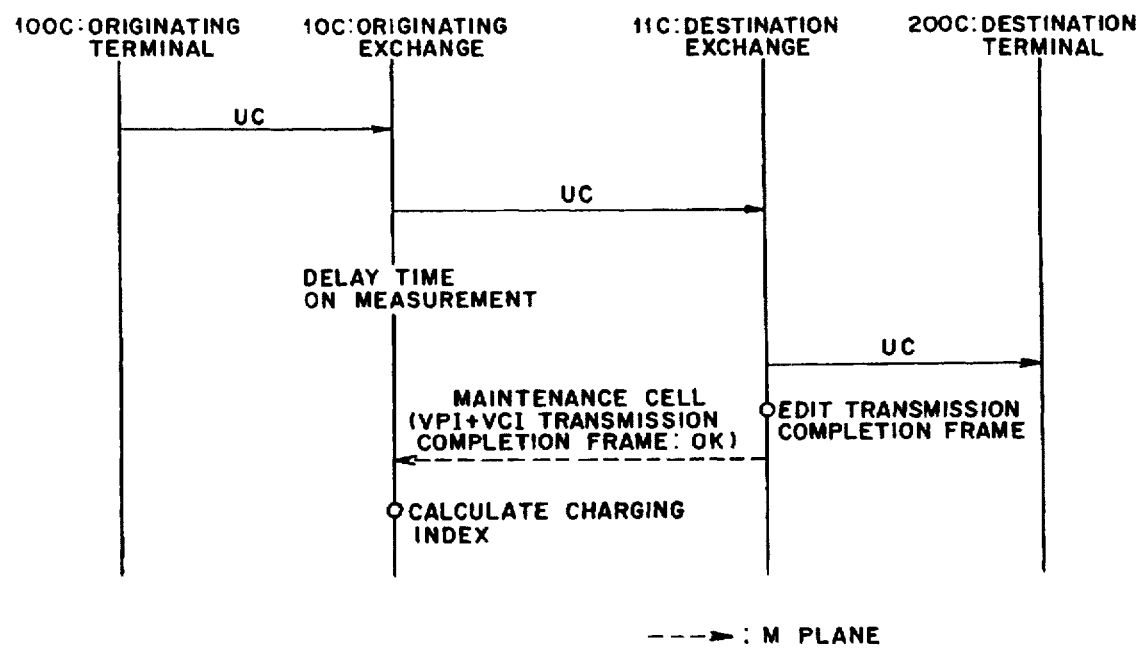
FIG. 36 is a signal sequence diagram used for explaining an operation of the second modification of the first embodiment according to the present invention.

FIG. 36 is a signal sequence diagram showing the operation described above. When the originating terminal 100 transmits a user cell UC, the originating exchange 10C transmits it to the destination exchange 11C. Thereafter, the destination exchange 10C receives the user cell UC to the destination transfer confirmation and control unit 92C and then transmits it to the destination terminal 200C. The destination transfer confirmation and control means 92C edits a transmission completion cell. Then the destination exchange 11C transmits a maintenance cell having information including a transmission completion OK to the originating exchange 10C. When the maintenance cell receives a transmission completion cell, the originating exchange 10C measures a delay time taken from a signal origination to a transmission completion cell reception, thus calculating a charging index in consideration of the delay time.

Even if the originating terminal 100C transmits a user cell UC and the destination exchange 11c receives it from the originating exchange 10C, something may not allow the originating exchange 10C to receive a maintenance cell having transmission completion information from the destination exchange 11C. In this case, the originating exchange 10C detects time-out to calculate suitably a charging index.

As described above, since a charging system can be graduated in accordance with a delay in process in a user data network included in the cell switching network 1C (data transfer delay), improved services can be provided in terms of charging index.

Figure 37:
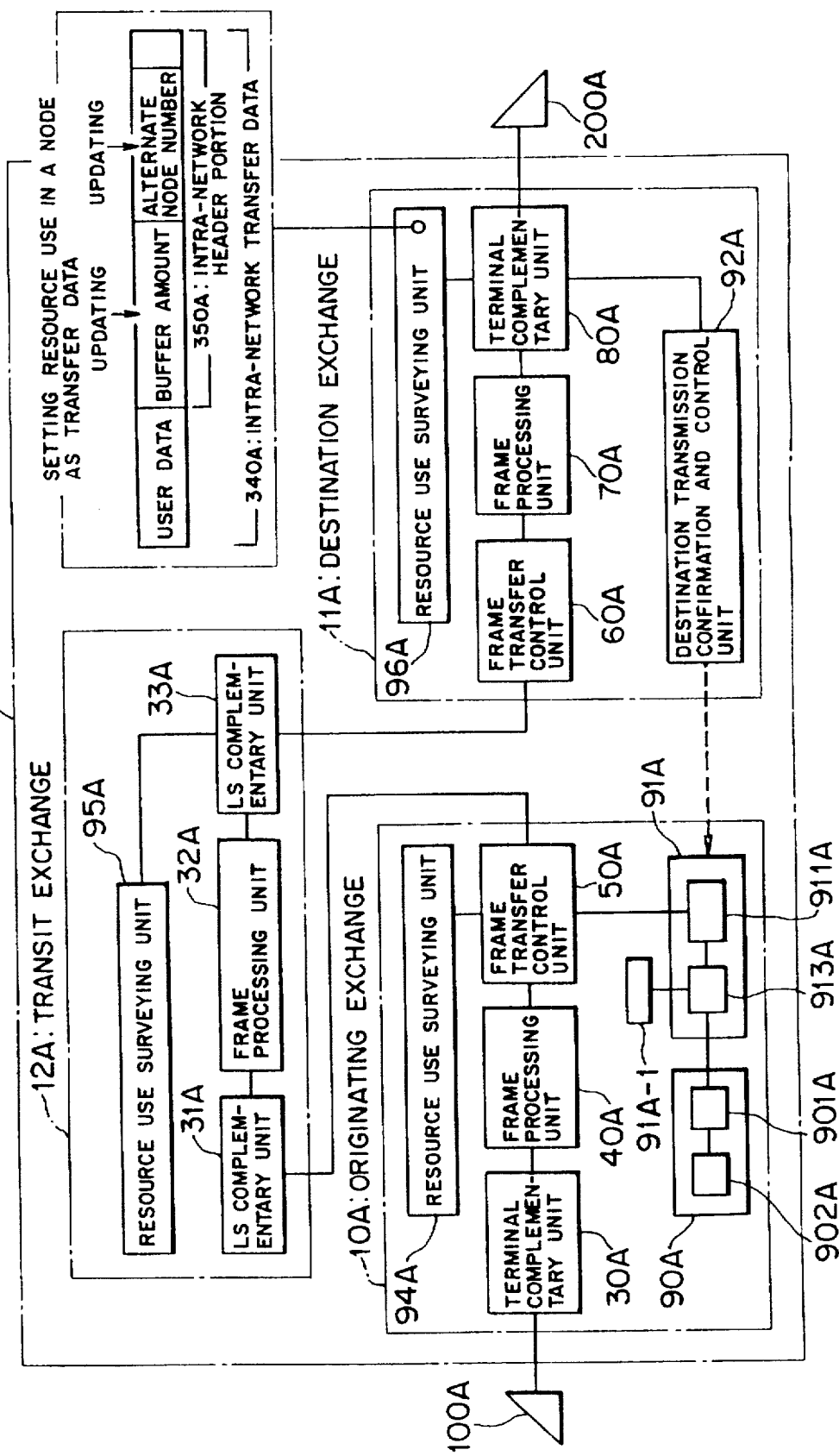
FIG. 37 is a block diagram showing the second embodiment according to the present invention.

(c) Explanation of the Second Embodiment:

FIG. 37 is a block diagram showing the second embodiment according to the present invention. Referring to FIG. 37, a frame relay exchange 1A includes an exchange 10A on an originating side, a transit exchange 12A, and an exchange 11A on a receiving side.

The originating exchange 10A constitutes an originating node together with an originating terminal (frame relay terminal) 100A. Like the first embodiment, the destination exchange 11A constitutes a receiving node together with a destination terminal (frame relay terminal) 200A.

The originating exchange 10A includes a terminal complementary unit (signal processing unit) 30A, a frame processing unit (signal processing unit) 40A, a frame transfer control unit (transfer processing unit) 50A, an originating transfer confirmation and control unit (originating transfer confirmation and control means) 91A, a timer control unit 91A-1, a charging function unit (charging function means) 90A, a resource use surveying unit (resource use surveying means) 94A.

The destination exchange 11A includes a frame transfer control unit (transfer processing unit) 60A, a frame processing unit (signal processing unit) 70A, a terminal complementary unit (signal processing unit) 80A, a destination transfer confirmation and control unit (destination transfer confirmation and control means) 92A, and a resource use surveying unit (resource use surveying means) 96A.

The transit exchange 12A includes an LS complementary unit (signal processing unit) 31A, a frame processing unit (signal processing unit) 32A, an LS complementary unit (signal processing unit) 33A, a resource use surveying unit (resource use surveying means) 95A.

In the originating exchange 10A, the terminal complementary unit 30A receives a user frame signal from the originating terminal 100A. The frame processing unit 40A receives a signal from the terminal complementary unit 30A to perform suitably a signal process. Both the terminal complementary unit 30A and the frame processing unit 40A form a signal processing unit which receives a signal from the originating terminal 100A to subject it to a suitable signal process.

The terminal complementary unit 30A and the frame processing unit 40A operate in the same manner as those in the first embodiment shown in FIGS. 8 and 9. Hence, the duplicate explanation will be omitted here.

When the frame transfer control unit 50A receives a signal from the frame processing unit 40A, it notifies the originating transfer confirmation and control unit 91A of a signal origination, requests the resource use surveying unit 94A to examine resources in a node, and transfers a user frame signal to the destination exchange 11A, together with a result examined by the resource use surveying unit 95A. The frame transfer function is substantially the same as that of the first embodiment shown in FIG. 10. In this case, after a notification process to the originating transfer confirmation and control unit 91A shown in FIG. 10 (refer to step C7), an intra-network resource surveying request is added to the resource use surveying unit 95A.

The resource use surveying unit 94A examines the amount of resources used in the originating exchange 10A. For example, the resource use surveying unit 94A updates a buffer length as a buffer amount in an intra-network transfer data and the number of alternate nodes to the intra-network header unit 305A in the intra-network transfer data 340A to use the outcome as resource use information.

When the frame transfer processing unit 60A in the destination exchange 11A receives a user frame signal from the originating exchange 10A, it transfers a signal to the frame processing unit 70A. The operation is similar to that of the first embodiment shown in FIG. 11. Hence, the duplicate explanation will be omitted here.

The frame processing unit 70A subjects a transit data signal received by the frame transfer processing unit 60A to a suitable signal process. The terminal complementary unit 80A notifies the destination transfer confirmation and control means 92A of a signal reception while it outputs a signal to the destination terminal 200A. Both the frame processing unit 70A and the terminal complementary unit 80A constitutes a signal processing unit that notifies the destination transfer confirmation and control means 92A of a signal reception when it receives the signal from the originating node via the frame transfer processing unit 60A while it outputs a signal to the destination terminal 200A. At the same time, information regarding the amount of equipment used between the originating node and the receiving node (or intra-network facility use information) is transmitted to the destination transfer confirmation and control means 92A.

The operation of each of the frame processing unit 70A and the terminal complementary unit 80A is substantially the same as those in the first embodiment shown in FIGS. 12 and 13. Hence, the duplicate explanation will be omitted here. The terminal complementary unit 80A notifies the destination transfer confirmation and control unit 92A of information regarding the amount of equipment used between the originating node and the receiving node while it requests the destination transfer confirmation and control unit 92A to execute a complete or incomplete process.

The resource use surveying unit 96A examines the amount of resources used in the destination exchange 11A. For example, the resource use surveying unit 96A updates a buffer length as a buffer amount in an intra-network transfer data and the number of alternate nodes to the intra-network header unit 350A in the intra-network transfer data 340A to use the outcome as resource use information.

The LS complementary units 31A and 33A in the transit exchange 12A process signals interchanged between exchanges, respectively. The frame processing unit 32A performs substantially the same signal process as the frame processing unit 40A in the originating exchange 10A and the frame processing unit 70A in the destination exchange 11A. The LS complementary unit 33A requests the resource use surveying unit 95A to examine resources in an node, and transmits a user frame signal to the destination exchange 11A, together with a result examined by the resource use surveying unit 95A.

The resource use surveying unit 95A examines the amount of resources used in the destination exchange 12A. For example, the resource use surveying unit 95A updates a buffer length as a buffer amount in an intra-network transfer data and the number of alternate nodes to the intra-network header unit 350A in the intra-network transfer data 340A to use the outcome as resource use information.

Figure 43:
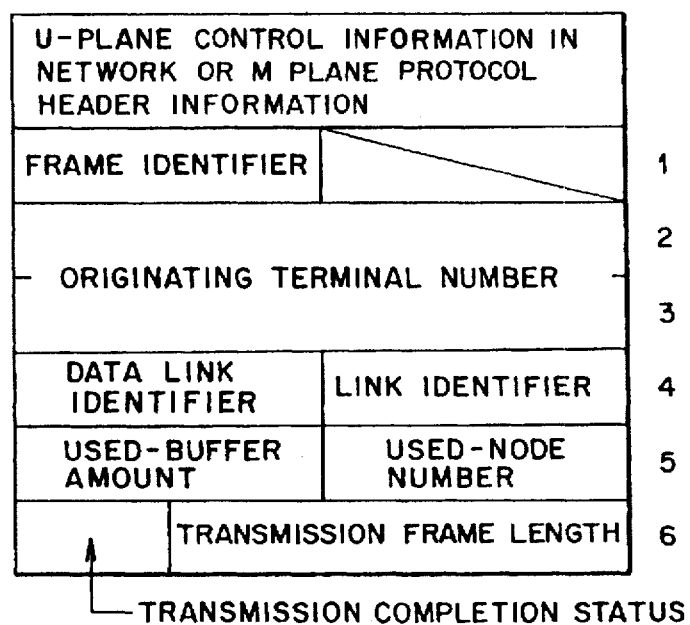
FIG. 43 is a diagram used for explaining a transmission completion frame.

Furthermore, when the destination transfer confirmation and control unit 92A in the destination exchange 11A receives a signal from the originating exchange 10A via the transit exchange 12A, it transmits a transmission completion frame including information regarding the amount of equipment used between the originating node and the destination node (or intra-network facility use information) and transmission completion report information to the originating exchange 10A, the two pieces of information being obtained based on the amount of resources examined by the resource use surveying units 94A to 96A. The operation of the destination transfer confirmation and control unit 92A is similar to that of the first embodiment shown in FIG. 14. When the destination transfer confirmation and control unit 92A receives a completion process request from the terminal complementary unit 80A, it edits a transmission completion frame, and then transmits a transmission completion frame. In this case, the transmission completion frame, as shown in FIGS. 38 and 43, includes information regarding an originating terminal number, a data link identifier, a transmission frame length, a link identifier, and an intra-network resource use, in addition to the transmission completion status. Control information in a U plane network or M plane protocol header information is inserted into the transmission completion frame in accordance with a communication line (refer to FIG. 43).

The originating transfer confirmation and control unit 91A in the originating exchange 10A receives a transmission completion frame including the intra-network facility use information and the transmission completion report information from the destination transfer confirmation and control unit 92A. In accordance with a result received, the originating transfer confirmation and control means 91A also delivers a charging index setting request. For that reason, the originating transfer confirmation and control means 91A functions as the transmission completion report information receiving means 911A for receiving a transmission completion frame including intra-network facility use information and transmission completion report information, and charging index setting and requesting means 913A for delivering a charging index setting request based on a result received by the transmission completion report information receiving means 911A.

The originating transfer confirmation and control unit 91A includes a transfer confirmation and registration list 300A (refer to FIG. 39) acting as signal information memory means for storing information (registration status, terminal number, data link identifier, transmission frame length, registration number) regarding a signal received originated from the originating exchange 10A to the destination exchange 11A. When a transmission completion frame is received from the destination transfer confirmation and control unit 92A in the destination exchange 11A, the originating transfer confirmation and control unit 91A executes a signal collation in accordance with signal information (registration status, terminal number, data link identifier, transmission frame length, registration number) stored in the transmission confirmation and registration list 330A. As described above, since the originating transfer confirmation and control unit 91A includes a transmission confirmation and registration list 300A to perform a signal collation, an originating signal can be collated easily and certainly with a transmission completion frame returned due to the originating signal.

The timer control unit 91A-1 executes a timer control needed in the originating transfer confirmation and control unit 91A.

The charging function unit 90A functions as a combination of the charging index setting means 901A for setting a different index based on a request from the charging index setting request means 913A in the originating transfer confirmation and control unit 91A and an intra-network facility use information obtained by the originating transfer confirmation and control unit 91A, and the charging means 902A for performing a charging operation based on a charging index set by the charging index setting means 901A.

The charging index setting means 901A in the charging function unit 90A includes a charging index calculation table 331A acting as memory means for storing a charging index in accordance with an intra-network facility use information (the amount of buffers used and the number of nodes) (refer to FIG. 40). The charging index calculation table 331A has, for example, plural tables for every amount of buffers used. In each table, a different charging index is set corresponding to the number of nodes. The charging index can be obtained easily and certainly by arranging a charging index calculation table 331A in the charging index setting means 901A.

Next, detail explanation will be made below as for the processing operation of each of the originating transfer confirmation control unit 91A, the timer control unit 91A-1, and the charging function unit 90A, with reference to FIG. 41.

The originating transfer confirmation and control unit 91A edits the transfer confirmation and registration list 300A in response to a timer registration request (steps H1 and H2). Thereafter, the originating transfer confirmation and control unit 91A waits for receiving a transmission completion frame (an event waiting status) from the destination exchange 11A (step H3). In a reception of a transmission completion frame, it is judged whether the transmission is OK in the step H4. If OK, the originating transfer confirmation and control unit 91A releases the timer registration while it outputs a charging control request to the charging function unit 90A (steps H5' and H6).

When a predetermined period of time passes in a waiting status for the transmission completion frame reception, or timeout has come, the transmission confirmation and registration list 300A is released (step H7'). If the transmission is NG, the transmission confirmation and registration 300A is released (step H7').

In response to a timer registration request from the originating transfer confirmation and control unit 91A, the timer control unit 91A-1 captures a timer identifier to edit a timer list (step M1 and M2).

The registration number BBB of an origination signal corresponds to an address of a timer identifier management table. A registration status (ON) and a time-out time (X seconds) are written in a timer list corresponding to the address BBB.

The timer list in the link identifier management table includes time-out time information. It is judged whether a time-out time has come during a transmission completion frame reception waiting status by subtracting a time-out time in the link identifier management table in accordance with the timer control period task operating in an event waiting status (steps K1' and K2'). In a time-out status, the time-out is notified the originating transfer confirmation and control unit 91A (step K3'). Thus, the originating transfer confirmation and control unit 91A releases a timer registration.

The charging function means 90A calculates a charging index corresponding to the delay time based on the number of buffers used and the number of nodes used in the table 331A to obtain a charging index in accordance with (charging index×frame length) (steps L11 and L12).

At the data originating time (user frame originating time) of the originating exchange 10A, a timer registration request in the originating transfer confirmation and control unit 91A, an editing (steps H1 and H2) of the transfer confirmation and registration list 300A, a timer identifier capture, and a timer list editing (steps M1 to M2) are processed. At a transmission completion frame receiving time of the originating exchange 10A, a transmission judgment, a timer registration releasing, a charging control request (steps H4, H5', and H6), a charging index calculation based on the number of buffers or nodes, and charging index calculation (steps L11 and L12).

Figure 42:
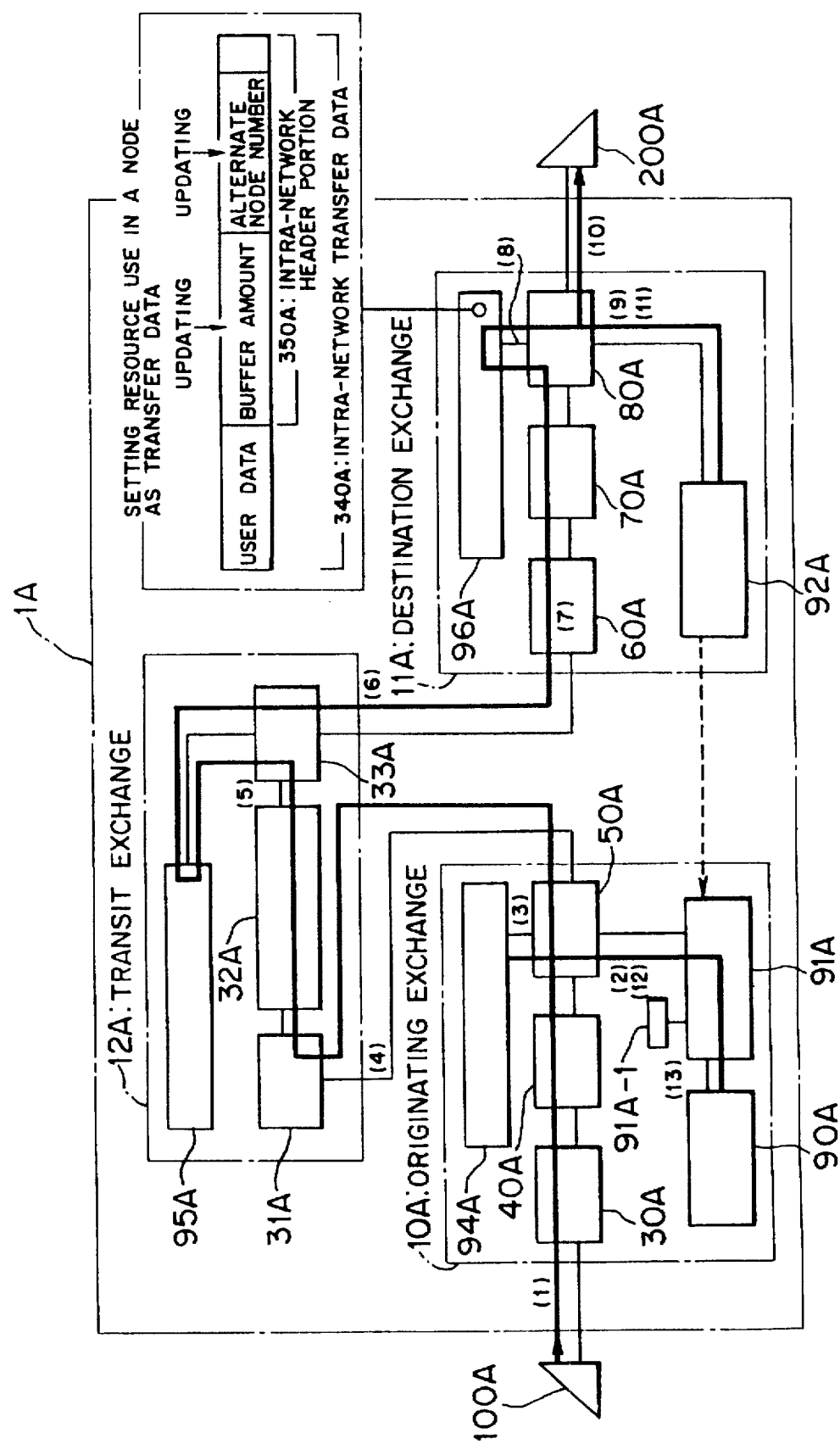
FIG. 42 is a block diagram used for explaining an operation of the second embodiment according to the present invention.

In the configuration described above, when the terminal 100A transmits an user frame UD, the terminal complementary unit 30A in the frame relay exchange 10A receives the user frame UD (refer to FIG. 42(1)). Thereafter, after the frame processing unit 40A performs a necessary process, the frame transfer control unit 50A takes over the process. When the frame transfer control unit 50A requests the originating transfer confirmation and control unit 91A to perform the transfer confirmation and registration (refer to FIG. 42(2)) and then requests the resource use surveying unit 94A to examine the amount of resources in the node (refer to FIG. 42(3)), it transmits data from a station to a station. The resource use surveying unit 94A sets a buffer length as a buffer amount of intra-network transfer data to the intra-network header unit 350A in an intra-network transfer data 340A, or sets "1" to the number of alternate nodes.

The originating transfer confirmation and control means 91A captures a registration number BBB to write necessary information onto the transfer confirmation and registration list 300A.

The LS complementary unit 31A in the transit exchange 12A receives a user frame UD interchanged between stations (refer to FIG. 42(4)). Then the frame processing unit 32A subjects the user frame UD to a necessary process and then outputs the outcome to the LS complementary 33A. The LS complementary unit 33A requests the resource use surveying unit 95A to examine the amount of resources in a node (refer to FIG. 42(5)), and then transmits intra-network transfer data from a station to a station (refer to FIG. 42(6)). The resource use surveying unit 95A adds the amount of buffers of the intra-network header 350A in the intra-network transfer data 340A to the buffer length of the intra-network transfer data in the selfnode, and adds "1" to the alternate node.

The frame transfer control unit 60A in the destination exchange 11 receives intra-network transfer data (refer to FIG. 42(7)). After the frame processing unit 70A executes a necessary process of the intra-network transfer data, the outcome is sent to the terminal complementary unit 80A.

The terminal complementary unit 80A requests the resource use surveying unit 96A to examine the amount of resources used in a node (FIG. 42(8)). The terminal complementary unit 80A transmits user frame information to the destination transfer confirmation and control unit 92A (refer to FIG. 42(9)) and then transmits the user frame to the terminal 200A (refer to FIG. 42(10)). At this time, the resource use surveying unit 96A adds the amount of buffers in the intranetwork header 350A of the intra-network transfer data 340A to the buffer length of the intra-network transfer data in the selfnode, and adds "1" to the alternate node.

The destination transfer confirmation and control unit 92A edits a transmission completion frame 320A and then returns the outcome to the originating transfer confirmation and control unit 91A in the originating exchange 10A (refer to FIG. 42(11)).

In response to the transmission completion frame (refer to FIG. 42(12)), the originating transfer confirmation and control unit 91A confirms that the transmission is under confirmation and registration, in reference to the content of the transmission completion frame and the content of the transmission confirmation and registration list 300A. The originating transmission confirmation and control unit 91A also transmits the amount of resources used in the network to the charging function unit 90A, together with terminal information and data link information to perform a charging process (refer to FIG. 42(13)). The charging function unit 90A selects a delay time specified on the charging index calculation table 331A and a calculation table corresponding to the amount of resources used in a network.

Figure 44:
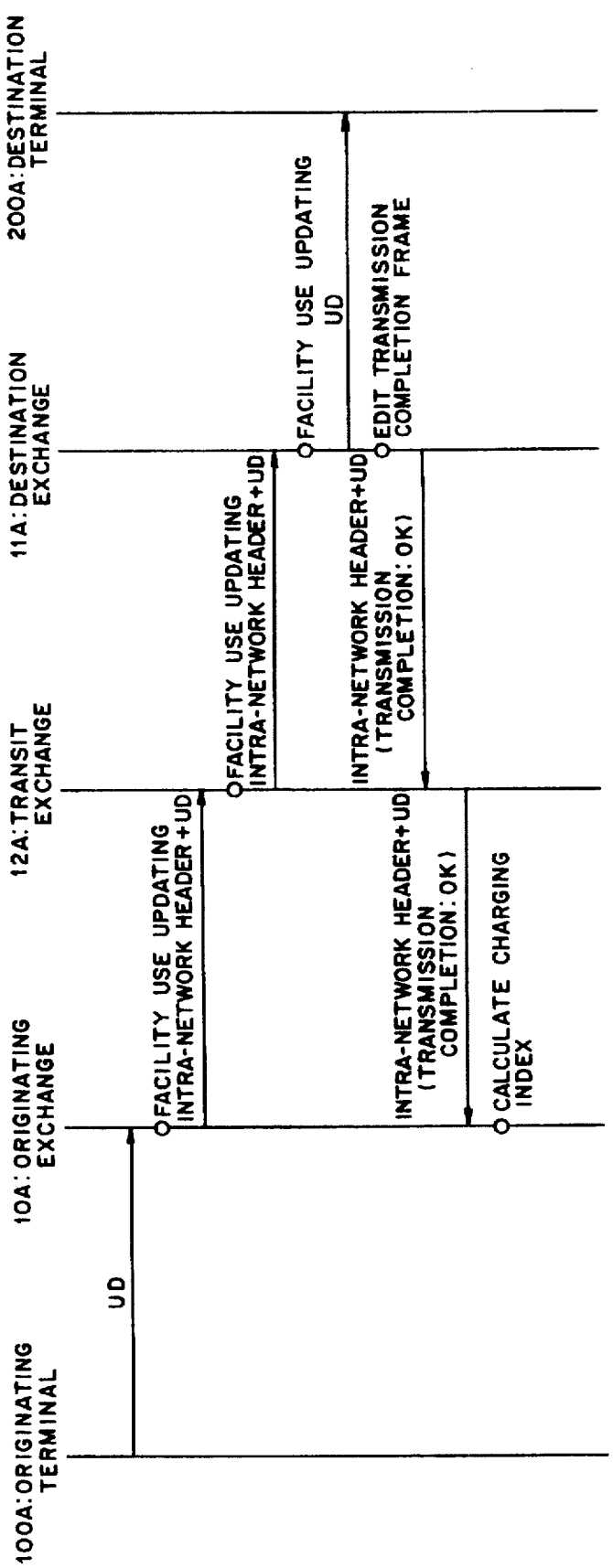
FIG. 44 is a signal sequence diagram used for explaining an operation of the second embodiment according to the present invention.

The process described above is shown with the signal sequence diagram in FIG. 44. That is, when the originating terminal 100A transmits a user frame UD, the originating exchange 10A updates the amount of equipment used and transmits both an intra-network header and a user frame UD to the transit exchange 12A. The transit exchange 12A updates the amount of equipment used and then transmits both an intra-network header and a user frame UD to the destination exchange 11A. At this time, it is assumed that the intra-network protocol is, for example, an LAPF core. When the frame relay exchange 11A receives a user frame UD, it updates the amount of equipment used and then sends the user frame information to the destination transfer confirmation and control unit 92A. Thus both the intra-network header and a user frame UD are transmitted to the destination terminal 200A. The destination transfer confirmation and control unit 92A edits a transmission completion frame. The destination exchange 11A transmits a user frame UD to the originating exchange 10A via the transit exchange 12A, the user frame UD having information regarding an intra-network header and a transmission completion frame OK. When the originating exchange 10A receives the transmission completion frame 321A, it calculates a charging index in consideration of the delay time.

For example, an intra-network process delay (data transfer delay) may become large with an increasing amount of equipment used in an user data network. In this case, a supplier of a frame relay switching network can maintain a good service quality by applying a lower service charging system. If it is judged that the amount of equipment in the network used with an user data increases without producing any delay in processing in a network (or data transfer delay), a supplier of an another data switching network can apply a higher service charging system.

As described above, according to the present invention, the charging system can be graduated to the amount of equipment used in the frame relay switching network 1A. Hence, services on the charging index can be improved. The service supplier can consider to apply a higher charging system in the case where equipment in the network are heavily used. This means that the service supplier can make much profit.

(c1) Explanation of the First Modification of the Second Embodiment:

The second embodiment relates to a frame relay switching network. The second embodiment is applicable to packet switching networks.

Figure 45:
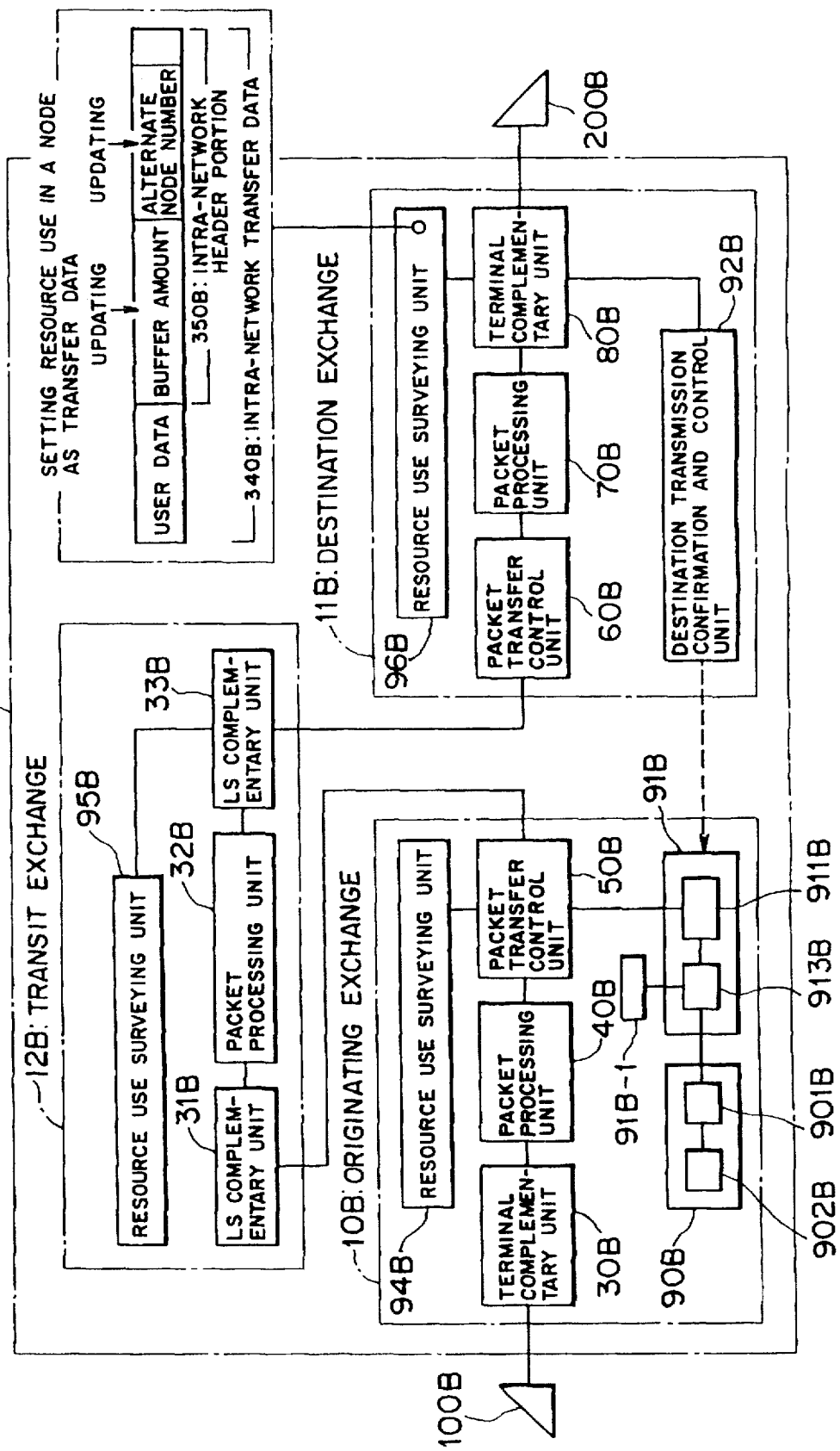
FIG. 45 is a block diagram showing the first modification of the second embodiment according to the present invention.

FIG. 45 is a block diagram showing the second embodiment applied to a packet switching network. Referring to FIG. 45, the packet switching network 1B includes an originating exchange 10B, a transit exchange 12B, and a destination exchange 11B.

The originating exchange 10B constitutes an originating node together with an originating terminal (packet terminal) 100B. The destination exchange 11B constitutes a destination node together with a destination terminal (packet terminal) 200B. This configuration is similar to the first modification of the first embodiment.

The originating exchange 10B includes a terminal complementary unit (signal processing unit) 30B, a packet processing unit (signal processing unit) 40B, a packet transfer control unit (transfer processing unit) 50B, an originating transfer confirmation and control unit (originating transfer confirmation and control means) 91B, a timer control unit 91B-1, a charging function unit (charging function means) 90B, and a resource use surveying unit (resource use surveying means) 94B.

The destination exchange 11B includes a packet transfer control unit (transfer processing unit) 60B, a packet processing unit (signal processing unit) 70B, a terminal complementary unit (signal processing unit) 80B, a destination transfer confirmation and control unit (destination transfer confirmation and control means) 92B, and a resource use surveying unit (resource use surveying means) 96B.

The transit exchange 12B includes an LS complementary unit (signal processing unit) 31B, a frame processing unit (signal processing unit) 32B, an LS complementary unit (signal processing unit) 33B, a resource use surveying unit (resource use surveying means) 95B.

The terminal complementary unit 30B in the originating exchange 10B receives a data packet signal from the originating terminal 100B. The packet processing unit 40B subjects a suitable signal process to a data packet signal from the originating terminal 100B received by the terminal complementary unit 30B. A signal processing unit is formed of the terminal complementary unit 30B and the packet processing unit 40B. The signal processing unit receives a signal from the originating terminal 100B to subject it to a suitable signal process.

The operation of each of the terminal complementary unit 30B and the packet processing unit 40B is similar to those in the first embodiment shown in FIGS. 8 and 9. The duplicate explanation will be omitted here. In this case, the process in the step A5 represents "notify the packet processing unit 40B". The process of the step B5 represents "request the packet transfer control unit 50B". The process of the step B6 represents "receive a transmission status from the packet transfer control unit 50B".

When the packet transfer control unit 50B receives a signal from the packet processing unit 40B, it notifies the originating transfer confirmation and control unit 91B of the signal origination. At the same time, the packet transfer confirmation and control unit 50B requests the resource use surveying unit 94B to perform a survey on resources in the node, and then transfers a data packet signal to the destination exchange 11B, together with a result examined by the resource use surveying unit 95B. The operation regarding the packet transmission corresponds substantially to that of the first embodiment shown in FIG. 10 (described above). In this case, the step C6 represents "notify the packet transfer processing unit 40B". The step C7 represents "notify the originating transfer confirmation and control unit 91B". After a notification process to the originating transfer confirmation and control unit 91B shown in FIG. 10 (refer to step C7), a process of checking resources in the node is additionally requested to the resource use surveying unit 95B.

The resource use surveying unit 94B examines the amount of resources used in the originating exchange 10B. The resource use surveying unit 94B, for example, updates the buffer length as a buffer amount of intra-network transfer data and the number of alternate nodes in the intra-network header unit 350B in the intra-network transfer data 340B to use those as resource use information.

When receiving an user packet signal from the originating exchange 10B, the packet transfer processing unit 60B in the destination exchange 11B transfers a signal to the packet processing unit 70B. The operation is similar to that in the first embodiment shown in FIG. 11. The duplicate explanation will be omitted here. In this case, the step D5 represents "notify the packet processing unit 70B".

The packet processing unit 70B subjects a signal received by the packet transfer processing unit 60B to a suitable signal process. The terminal complementary unit 80B notifies the destination transfer confirmation and control means 92B of a signal reception and outputs a signal to the destination terminal 200B. Both the packet processing unit 70B and the terminal complementary unit 80B constitutes a signal processing unit. When it receives a signal from the originating node via the packet transfer processing unit 60B and the intermediate node, the signal processing unit notifies the destination transfer confirmation and control means 92B of a signal reception and outputs a signal to the destination terminal 200B. In this case, the information regarding the amount of equipment used between the originating node and the receiving node in the network (or intra-network facility use information) is sent to the destination transfer confirmation and control means 92B.

The operation of each of the packet processing unit 70B and the terminal complementary unit 80B is similar to that of the first embodiment shown in FIGS. 12 and 13. The duplicate explanation will be omitted here. In this case, the step F6 represents "request the destination transfer confirmation and control unit 92B to execute a completion process". The step F7 represents "request the destination transfer confirmation and control unit 92B to execute an incompletion process". The terminal complementary unit 80B requests the destination transfer confirmation and control unit 92B to perform a complete or imcomplete process, together with a notification of information regarding the amount of equipment used between the originating node and the receiving node in the network.

The resource use surveying unit 96B examines the amount of resources used in the destination exchange 11B. The resource use surveying unit 96B, for example, updates the buffer length as a buffer amount of intra-network transfer data and the number of alternate nodes in the intra-network header unit 350B in the intra-network transfer data 340B to use those as resource use information.

In the transit exchange 12B, each of the LS complementary unit 31B and 33B executes a signal process between exchanges. The frame processing unit 32B executes substantially the same signal process as that of each of the frame processing unit 40B in the originating exchange 10B and the frame processing unit 70B in the destination exchange 11B. The LS complementary unit 33B requests the resource use surveying unit 95B to execute an intra-node resource examination and then transmits a user frame signal to the destination exchange 11B, together with a result measured by the resource use surveying unit 95B.

The resource use surveying unit 95B examines the amount of resources used in the transit exchange 12B. For example, the resource use surveying unit 95B updates the buffer length as a buffer amount of intra-network transfer data and the number of alternate nodes in the intra-network header portion 350B in the intra-network transfer data 340B to use the updated information as resource use information.

Figure 46:
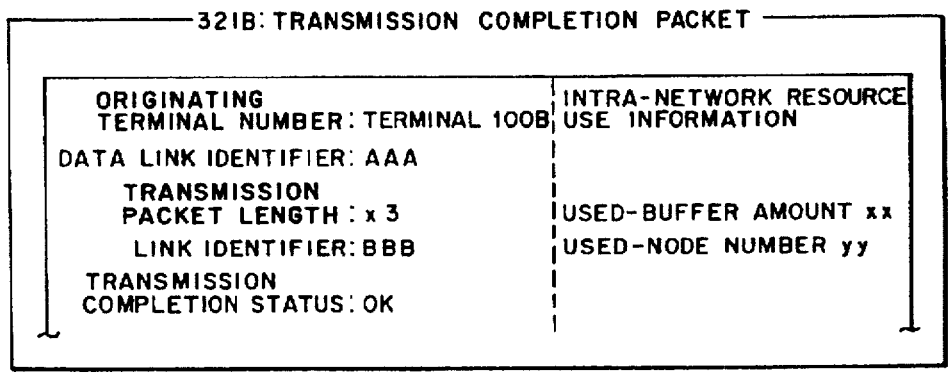
FIG. 46 is a diagram used for explaining a transmission completion packet.

In response to a signal from the originating exchange 10B via the transit exchange 12B, the destination transfer confirmation and control unit 92B in the destination exchange 11B transfers a transmission completion packet including information regarding the amount of equipment used between the originating node and the receiving node and transfer completion report information to the originating exchange 10B, the two pieces of information being obtained based on resources use examined by the resource use surveying units 94B to 96B. The process in the destination transfer confirmation and control unit 92B is nearly similar to that in the first embodiment shown in FIG. 14. That is, when receiving a request for a completion process from the terminal complimentary unit 80B, the destination transfer confirmation and control unit 92B edits a transmission completion packet and then transmits a transmission completion packet. The transmission completion packet, as shown in FIG. 46, has information including an originating terminal number, a data link identifier, a transmission packet length, a link identifier, and intra-network resource use, in addition to the transmission completion status. Control information in a U plane network or M plane protocol header information is inserted into a transmission completion packet in accordance with a communication line to which the transmission completion packet is transmitted.

When the originating transfer confirmation and control unit 91B in the originating exchange 10B receives a transmission completion packet including transmission completion information and intra-network facility use information from the destination transfer confirmation and control unit 92B, it delivers a charging index setting request based on the result received. Hence, the originating transfer confirmation and control unit 91B functions as the transmission completion report information receiving means 911B for receiving a transmission completion packet, and the charging index setting request means 913B for delivering a charging index setting request based on a result received by the transmission completion report information receiving means 911B.

Figure 47:
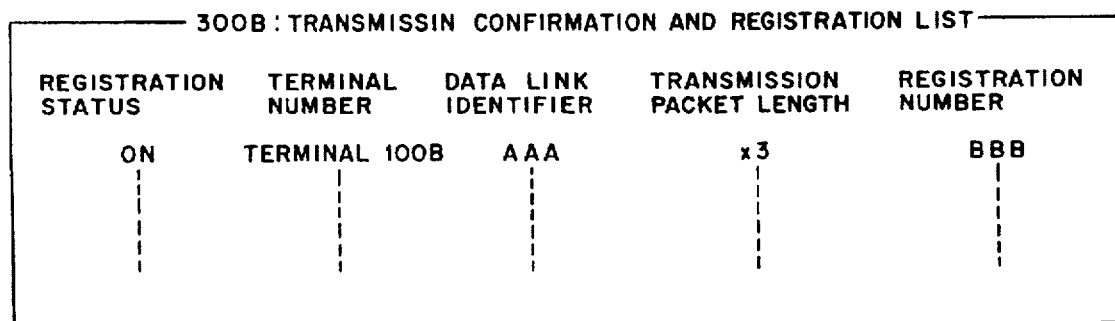
FIG. 47 is a diagram used for explaining a transmission confirmation registration list.

The originating transfer confirmation and control unit 91B includes a transmission confirmation and registration list 300B (refer to FIG. 47) acting as signal information memory means to store information (registration status, terminal number, data link identifier, transmission packet length, registration number) regarding a signal transmitted from the originating exchange 10B to the destination exchange 11B. When the originating transmission confirmation and control unit 91B receives a transmission completion packet from the destination transfer confirmation and control unit 92B in the destination exchange 11B, it collates a signal based on signal information (registration status, terminal number, data link identifier, transmission packet length, registration number) stored in the transmission confirmation and registration list 300B. As described above, since the originating transfer confirmation and control means 91B includes a transmission confirmation and registration list 300B to perform a collating operation, it is possible easily and certainly to collate an originating signal with a transmission completion packet returned due to the originating signal.

The timer control unit 91B-1 executes a timer control necessary to the originating transfer confirmation and control unit 91B.

The charging function unit 90B includes charging index setting means 901B for setting a different index based on a request from the charging index setting request means 913B in the originating transfer confirmation and control unit 91B and intra-network facility use information obtained by the originating transfer confirmation and control unit 91B, and charging means 902B for performing a charging operation based on a charging index set by the charging index setting means 901B.

Figure 48:
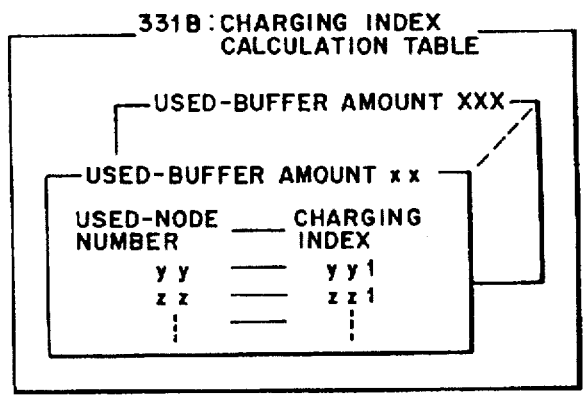
FIG. 48 is a diagram used for explaining a charging index calculation table.

The charging index setting means 901B in the charging function means 90B includes a charging index calculation table 331B acting as memory means for storing a charging index in accordance with intra-network facility use information (the amount of buffers used and the number of nodes used) (refer to FIG. 48). The charging index calculation table 331B has plural tables every number of buffers used. In each table, a different charging index is set corresponding to the number of nodes and a delay time.

As described above, since the charging index setting means 901B includes the charging index calculation table 331B, a charging index can be calculated quickly and certainly.

The operation of the timer control unit 91B-1 is similar to that in the second embodiment shown in FIG. 41. However, the operation in the step K3' is "notify the originating transfer confirmation and control unit 91B of a time-out".

The operation of the charging function unit 90B is similar to that in the second embodiment shown in FIG. 41. In this case, one packet length unit is used in the charging index calculation table.

In this case, a timer registration request by the originating transfer confirmation and control unit 91B, an editing of the transfer confirmation registration list 300B, a timer identifier capture, and a timer list editing are performed at a data origination time (data packet origination time) of the originating exchange 10B. When the originating exchange 10B receives a transmission completion packet, various processes including a transmission judgment, a timer registration releasing, a charging control request, a charging index calculation based on the number of buffers and number of nodes used, and a charging index calculation are performed.

Figure 49:
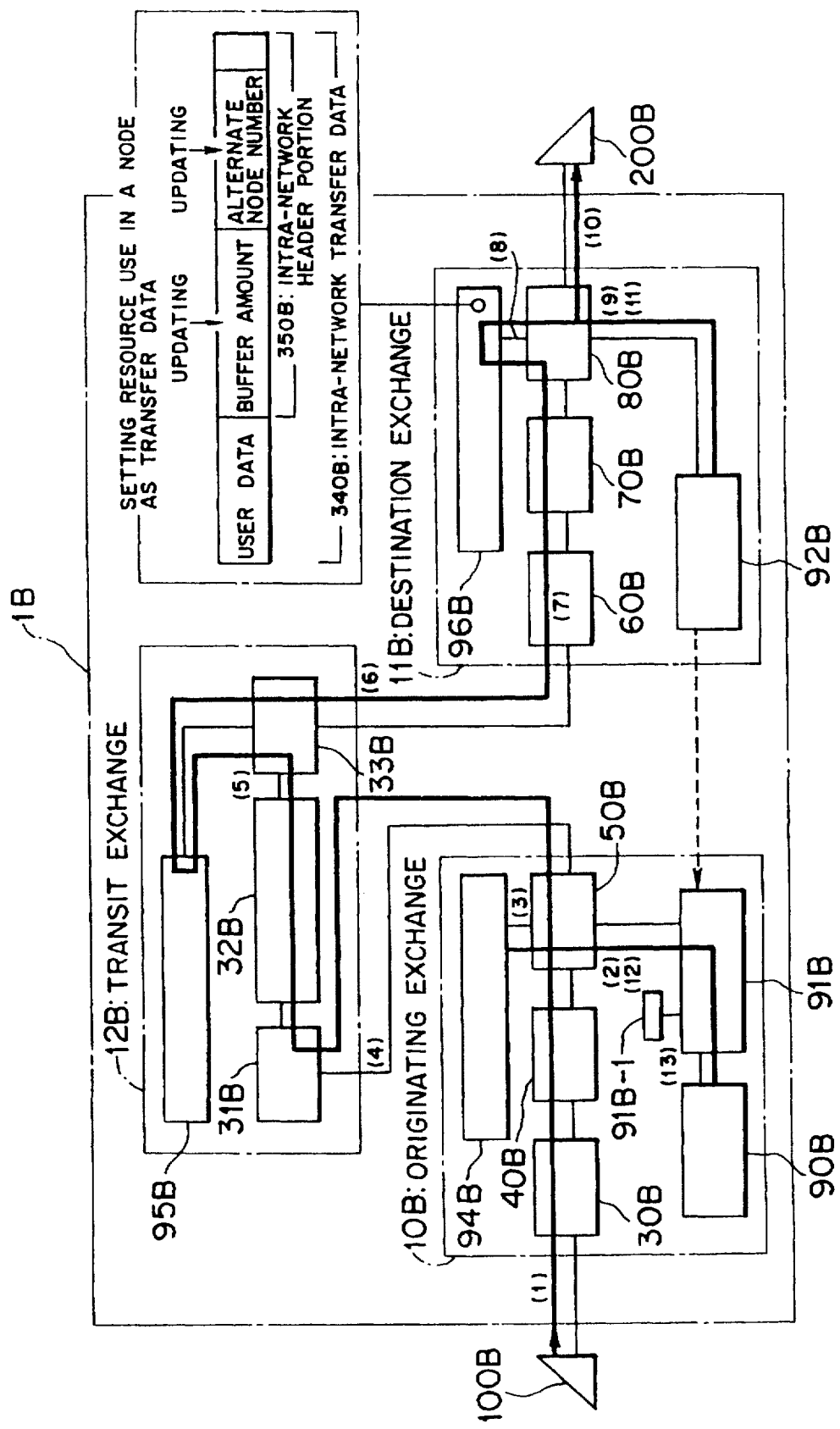
FIG. 49 is a block diagram used for explaining an operation of the first modification of the second embodiment according to the present invention.

In the configuration described above, when the originating terminal 100B transmits a data packet DT, the terminal complementary unit 30B in the packet exchange 10B receives it (refer to FIG. 49(1)). Then, after the packet processing unit 40B executes a necessary process, the packet transfer control unit 50B takes over the process flow. The packet transfer control unit 50B requests the originating transfer confirmation and control unit 91B to execute a transfer confirmation and registration (refer to FIG. 49(2)). Then, when the packet transfer control unit 50B requests the resource use surveying unit 94B to check the resources in the node, it transmits the result from a station to another station (refer to FIG. 49(3)). The resource use surveying unit 94B, for example, sets the intra-network header portion 350B in the intra-network transfer data 340B to a buffer length as a buffer amount of intra-network transfer data while it sets "1" to the number of alternate nodes.

The originating transfer confirmation and control means 91B captures a registration number BBB to write necessary information onto a transfer confirmation and registration list 300B.

The LS complementary unit 31B in the transit exchange 12B receives the data packet DT transmitted from a station to a station (refer to FIG. 49(4)). After the packet processing unit 32B performs a necessary process, it transmits the outcome to the LS complementary unit 33B. The LS complementary unit 33B requests the resource use surveying unit 95B to examine the amount of resources used in the node (refer to FIG. 49(5)) to transmit intra-network transfer data from a station to a station (refer to FIG. 49(6)). The resource use surveying unit 95B adds the buffer length of the intra-network transfer data 340B to the buffer amount of the intra-network header 350B in the intranetwork transfer data 340B and adds "1" to the alternate node.

The packet transfer control unit 60B in the destination exchange 11 receives the transfer data in the network (refer to FIG. 49(7)). After the packet processing unit 70B subjects a necessary process to the data packet, the outcome is taken over to the terminal complementary unit 80.

The terminal complementary unit 80B requests the resource use surveying unit 96B to examine the amount of resources used in the network (refer to FIG. 49(8)). After the terminal complementary unit 80B transmits data packet information to the destination confirmation and control unit 92B (refer to FIG. 49(9)), it transmits a data packet to the terminal 200B (refer to 49(10)). At this time, the resource use surveying unit 96B adds the buffer length of the intra-network transfer data in the self node to the buffer amount of the intra-network transfer data 340B in the intra-network header 350B, and adds "1" to the alternate node.

The destination transfer confirmation and control unit 92B edits a transmission completion packet 320B and returns the outcome to the originating transfer confirmation and control unit 91B in the originating exchange 10 (refer to FIG. 49(11)).

When the originating transfer confirmation and control unit 91B receives a transmission completion packet (refer to FIG. 49(12)), it confirms that a transmission is under confirmation and registration, based on both the content of the transmission completion packet and the content of the transmission confirmation and registration list 300B. During the transmission confirmation and registration, the originating transfer confirmation and control unit 91B sends the amount of resources used in the network and data link information to the charging function unit 90B, together with terminal information, to execute a charging process (refer to FIG. 49(13)). The charging function unit 90B selects a calculation table corresponding to the amount in use of resources in a network specified with the charging index calculation table 331B to calculate a charging index.

Figure 50:
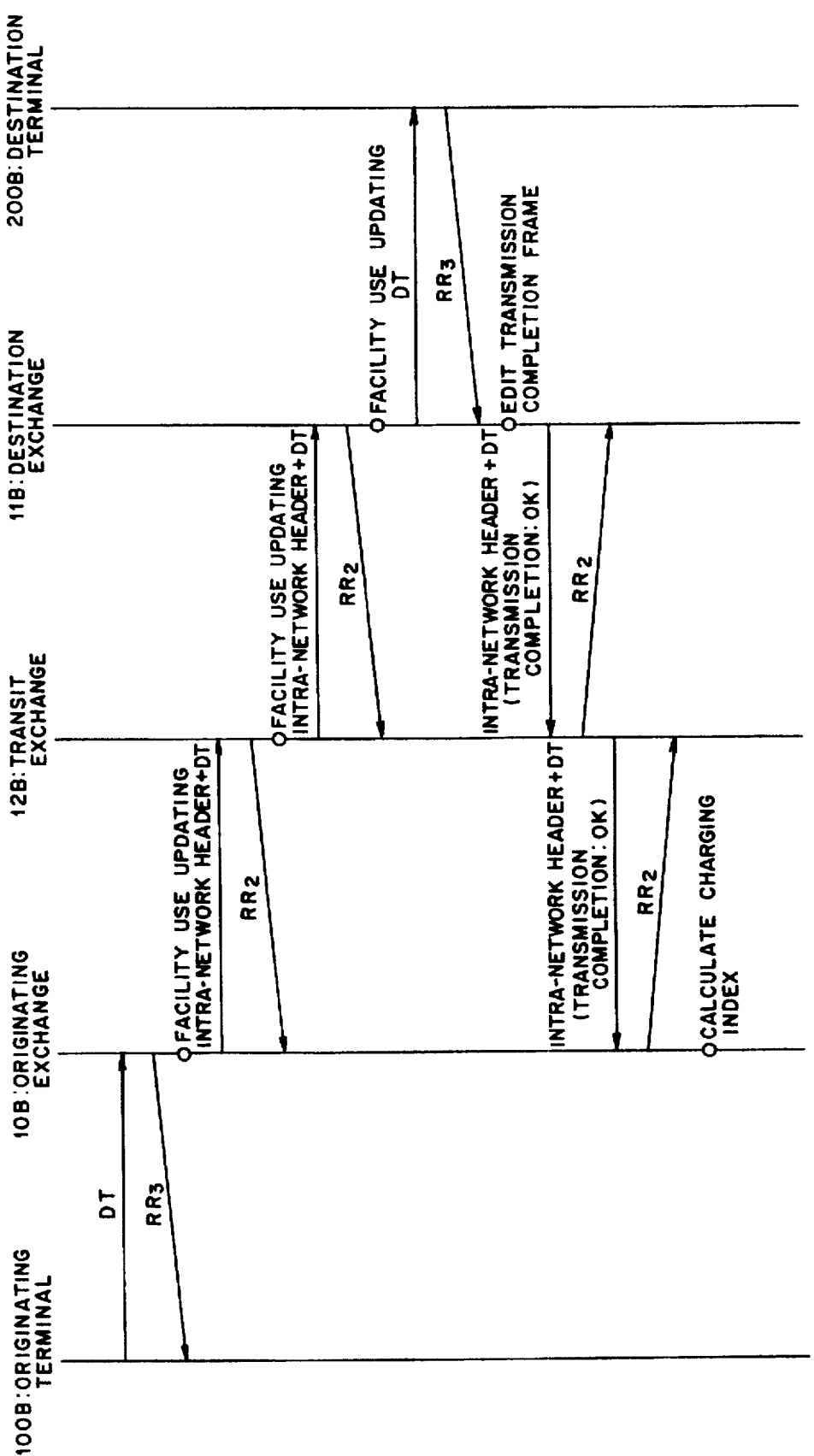
FIG. 50 is a signal sequence diagram used for explaining an operation of the first modification of the second embodiment according to the present invention.

The process described above is shown with the signal sequence diagram in FIG. 50. When the originating terminal 100B transmits the data packet DT, the originating exchange 10B returns the layer 2 receivable packet RR2 to the originating terminal 100B and updates the amount of equipment used to transmit an intra-network header and a data packet DT to the transit exchange 12B. The transit exchange 12B returns the layer 2 receivable packet RR2 to the originating exchange 10B, and updates the amount of equipment used to transmit the intra-network header and the data packet DT to the destination exchange 11B. When the packet exchange 11B receives a data packet DT, it returns the layer 2 receivable packet RR2 to the transit exchange 12B while it updates the amount of equipment used to transmit the data packet information to the destination transfer confirmation and control unit 92B. Then the data packet DT is transmitted to the destination terminal 200B. The destination terminal 200B returns the layer 3 receivable packet RR3 to the destination exchange 11B. The destination transfer confirmation and control unit 92B edits a transmission completion packet. The destination exchange 11B transmits a data packet DT having information regarding an intra-network header and a transmission completion packet OK to the originating exchange 10B via the transit exchange 12B. When the originating exchange 11B receives the data packet DT, it returns the layer 2 receivable packet RR2 to the destination exchange 11B. When the originating exchange 10B receives the transmission completion packet 321B, it calculates a charging index in consideration of the amount of equipment used in the network.

For example, when an intra-network process delay (data transfer delay) become large with an increasing amount of equipment used in an user data network, a supplier of a packet switching network can maintain a good service quality by applying a lower charging system. If it is judged that the amount of equipment in a data network used with a user data network increases without any delay in processing in a network (or data transfer delay), a supplier of an another data switching network can apply a higher charging system.

As described above, according to the present invention, the charging system can be graduated to the amount of equipment used in the network in the packet switching network 1B. Hence, services on the charging index can be improved. The service supplier can consider that a higher charging system is applied in the case where equipment in the network are heavily used. This means that the service supplier can make much profit.

(c2) Explanation of the Second Modification of the Second Embodiment:

The second embodiment relates to a frame relay switching network. The first modification of the second embodiment relates to a packet switching network. However, the second embodiment or the first modification of the second embodiment is applicable to ATM switching networks.

Figure 51:
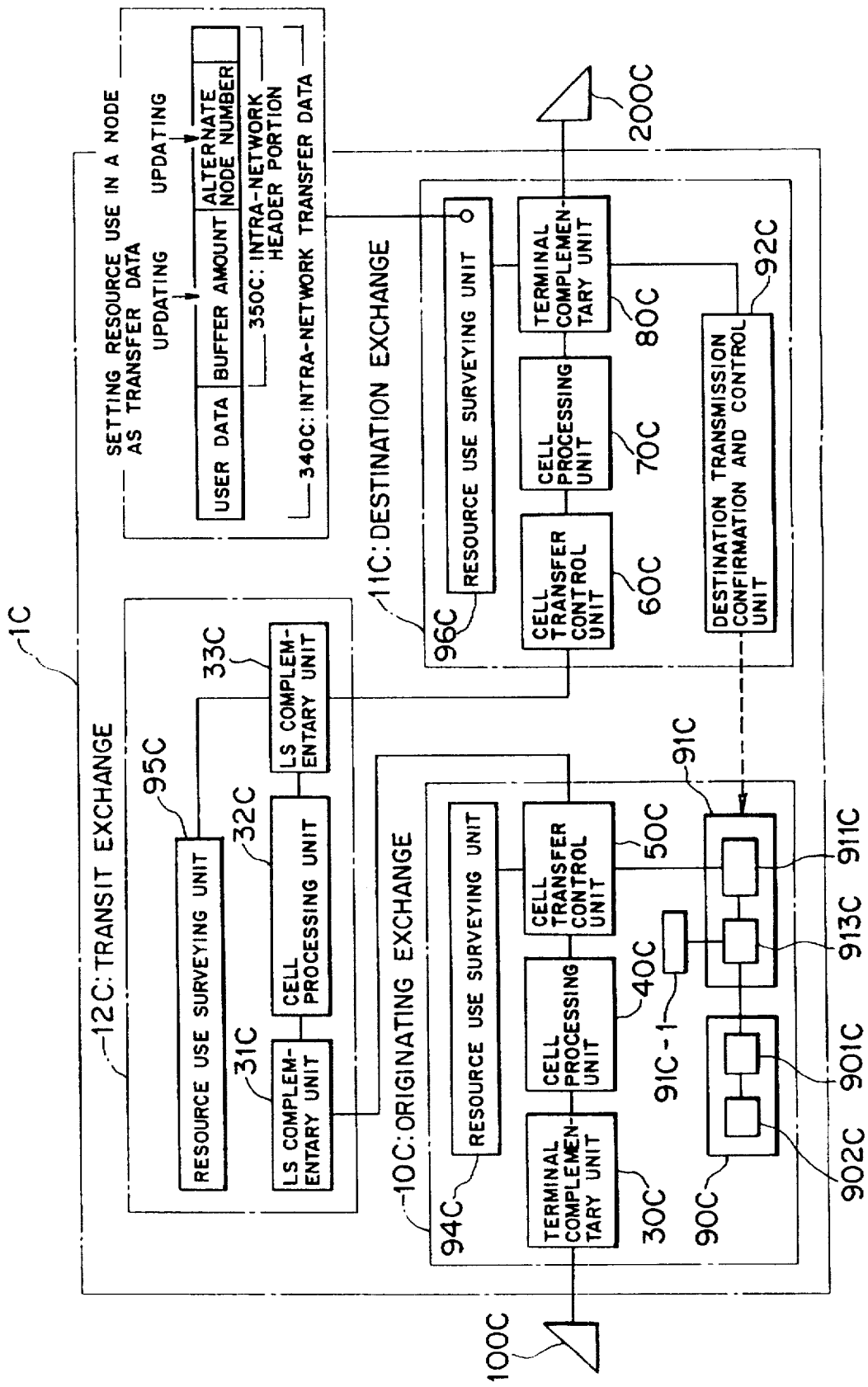
FIG. 51 is a block diagram showing the second modification of the second embodiment according to the present invention.

FIG. 51 is a block diagram showing the second embodiment applied to an ATM switching network. Referring to FIG. 51, the ATM switching network 1C includes an originating exchange 10C, a transit exchange 12C, and a destination exchange 1C.

The originating exchange 10C constitutes an originating node together with an originating terminal (ATM terminal) 100. The destination exchange 11C constitutes a receiving node together with a destination terminal (ATM terminal) 200C. This configuration is the same as that in the second modification of the first embodiment.

The originating exchange 10C includes a terminal complementary unit (signal processing unit) 30C, a cell processing unit (signal processing unit) 40C, a cell transfer control unit (transfer processing unit) 50C, an originating transfer confirmation and control unit (originating transfer confirmation and control means) 91C, a timer control unit 91C-1, a charging function unit (charging function means) 90C, and a resource use surveying unit (resource use surveying means) 94C.

The destination exchange 11C includes a cell transfer control unit (transfer processing unit) 60C, a cell processing unit (signal processing unit) 70C, a terminal complementary unit (signal processing unit) 80C, a destination transfer confirmation and control unit (destination transfer confirmation and control means) 92C, and a resource use surveying unit (resource use surveying means) 96C.

The transit exchange 12C includes an LS complementary unit (signal processing unit) 31C, a cell processing unit (signal processing unit) 32C, an LS complementary unit (signal processing unit) 33C, a resource use surveying unit (resource use surveying means) 95C.

The terminal complementary unit 30C in the originating exchange 10C receives a signal from the originating terminal 100C. The cell processing unit 40C subjects a suitable signal process to a data packet signal from the originating terminal 100C received by the terminal complementary unit 30C. The signal processing unit is formed of the terminal complementary unit 30C and the cell processing unit 40C. The signal processing unit receives a signal from the originating terminal 100C to subject it to a suitable signal process.

The operation of each of the terminal complementary unit 30C and the cell processing unit 40C is similar to those in the first embodiment shown FIGS. 8 and 9. The duplicate explanation will be omitted here. In this case, the process in the step A5 represents "notify the packet processing unit 40C". The process of the steps C5 represents "request the cell transfer control unit 50C. The process of the step C6 represents "receive a transmission status from the packet transfer control unit 50C".

When the cell transfer control unit 50C receives a signal from the cell processing unit 40C, it notifies the originating transfer confirmation and control unit 91C of the signal origination. At the same time, the cell transfer control unit 50C requests the resource use surveying unit 94C to examine the resources in the node and transfers a signal to the destination exchange 11C, together with a result examined by the resource use surveying unit 95C. The operation regarding the cell transmission corresponds substantially to that in the first embodiment shown in FIG. 10. In this case, the step C6 represents "notify the cell transfer processing unit 40C". The step C7 represents "notify the originating transfer confirmation and control unit 91C". After the notifying step to the originating transfer confirmation and control unit 91C shown in FIG. 10 (refer to step C7, the resource use surveying unit 95C is additionally requested to survey resources in the node.

The resource use surveying unit 94C examines the amount of resources used in the originating exchange 10C. The resource use surveying unit 94C, for example, updates the buffer length as a buffer amount of intra-network transfer data and the number of alternate nodes in the intra-network header unit 350C in the intra-network transfer data 340C to use those as resource use information.

When receiving a signal from the originating exchange 10C, the cell transfer processing unit 60C in the destination exchange 11C transfers a signal to the cell processing unit 70C. The operation is similar to those in the first embodiment shown in FIG. 11. The duplicate explanation will be omitted here. In this case, the step D5 represents "notify the cell processing unit 70C".

The cell processing unit 70C subjects a transit data signal received by the cell transfer processing unit 60C to a suitable signal process. The terminal complementary unit 80C notifies the destination transfer confirmation and control means 92C of a signal reception and outputs a signal to the destination terminal 200C. Both the cell processing unit 70C and the terminal complementary unit 80C constitute a signal processing unit. The signal processing unit notifies the destination transfer confirmation and control means 92C of a signal reception and outputs a signal to the destination terminal 200C when it receives a signal from the originating node via the packet transfer processing unit 60C and an intermediate node. In this case, the information regarding the amount of equipment used between the originating node and the receiving node in the network (or intra-network facility use information) is sent to the destination transfer confirmation and control means 92C.

The operation of each of the cell processing unit 70C and the terminal complementary unit 80C is similar to that of the first embodiment shown in FIGS. 12 and 13. The duplicate explanation will be omitted here. In this case, the step F6 represents "request the destination transfer confirmation and control unit 92C to execute a completion process". The step F7 represents "request the destination transfer confirmation and control unit 92C to execute an incompletion process. At the time of a complete or incomplete process to the destination transfer confirmation and control unit 92C, the terminal complementary unit 80C notifies the destination transfer confirmation and control unit 92C of information regarding the amount of equipment used between the originating node and the receiving node in the network.

The resource use surveying unit 96C examines the amount of resources used in the destination exchange 11C. The resource use surveying unit 96C, for example, updates the buffer length as a buffer amount of intra-network transfer data and the number of alternate nodes in the intra-network header unit 350C in the intra-network transfer data 340C to use them as resource use information.

In the transit exchange 12C, each of the LS complementary unit 31C and 33C executes a signal process between exchanges. The frame processing unit 32C executes substantially the same signal process as that of each of the frame processing unit 40C in the originating exchange 10C and the frame processing unit 70C in the destination exchange 11C. The LS complementary unit 33C requests the resource use surveying unit 95C to examine the amount of resources used in the node and then transmits a user frame signal to the destination exchange 11C, together with a result checked by the resource use surveying unit 95C.

The resource use surveying unit 95C examines the amount of resources used in the transit exchange 12C. For example, the resource use surveying unit 95C updates the buffer length as a buffer amount of intra-network transfer data and the number of alternate nodes in the intra-network header portion 350C in the intra-network transfer data 340C to use the updated information as resource use information.

In response to a signal from the originating exchange 10C via the transit exchange 12C, the destination transfer confirmation and control unit 92C in the destination exchange 11C transfers a transmission completion cell including information regarding the amount of equipment used between the originating node and the receiving node and transfer completion report information to the originating exchange 10C, the two pieces of information being obtained based on the resource use examined by the resource use surveying units 94C to 96C. The process in the destination transfer confirmation and control unit 92C is nearly similar to that in the first embodiment shown in FIG. 14. That is, the destination transfer confirmation and control unit 92C edits a transmission completion cell when the terminal complementary unit 80C requests it of a completion process, and then transmits the transmission completion cell. The transmission completion cell, as shown in FIG. 52, has information including an originating terminal number, a data link identifier, a transmission packet length, a link identifier, and intra-network resource use, in addition to the transmission completion status. The transmission completion cell is transmitted via the maintenance communication line.

When the originating transfer confirmation and control unit 91C in the originating exchange 10C receives a transmission completion cell including transmission completion report information and intra-network facility use information from the destination transfer confirmation and control unit 92C, it delivers a charging index setting request based on the result received. Hence, the originating transfer confirmation and control unit 91C functions as the transmission completion report information receiving means 911C for receiving a transmission completion cell including information regarding the use amount of equipment in a network and information regarding a transmission completion report, and the charging index setting request means 913C for delivering a charging index setting request based on a result received by the transmission completion report information receiving means 911C.

The originating transfer confirmation and control unit 91C includes a transmission confirmation and registration list 300C (refer to FIG. 53) acting as signal information memory means to store information (registration status, terminal number, data link identifier, transmission packet length, registration number) regarding a signal transmitted from the originating exchange 10C to the destination exchange 11C. When the originating transmission confirmation and control unit 91C receives a transmission completion cell from the destination transfer confirmation and control unit 92C in the destination exchange 11C, it collates a signal based on signal information (registration status, terminal number, data link identifier, transmission packet length, registration number) stored in the transmission confirmation and registration list 300C. As described above, since the originating transfer confirmation and control means 91C includes a transmission confirmation and registration list 300C to perform a collating operation, it is possible to collate easily and certainly an originating signal with a transmission completion cell returned due to the originating signal.

The timer control unit 91C-1 executes a timer control necessary to the originating transfer confirmation and control unit 91C.

The charging function unit 90C includes charging index setting means 901C for setting a different index based on a request from the charging index setting request means 913C in the originating transfer confirmation and control unit 91C and intra-network facility use information obtained by the originating transfer confirmation and control unit 91C, and charging means 902C for performing a charging operation based on a charging index set by the charging index setting means 901C.

The charging index setting means 901C in the charging function means 90C includes a charging index calculation table 331C acting as memory means for storing a charging index in accordance with intra-network facility use information (the amount of buffers used and the number of nodes) (refer to FIG. 54). The charging index calculation table 331C has plural tables every number of buffers used. In each table, a different charging index is set corresponding to the number of nodes and a delay time.

As described above, since the charging index setting means 901C includes the charging index calculation table 331C, a charging index can be calculated quickly and certainly.

The operation of the timer control unit 91C-1 is similar to that in the second embodiment shown in FIG. 41. However, the operation in the step K3' is "notify the originating transfer confirmation and control unit 91C of a time-out".

The operation of the charging function unit 90C is similar to that in the third embodiment shown in FIG. 41. In this case, one packet length unit is used in the charging index calculation table.

In this case, the originating transfer confirmation and control unit 91C performs a timer registration request by the originating transfer confirmation and control unit 91C, an editing of the transfer confirmation and registration list 300C, a timer identifier capture, and a timer list editing when the originating exchange 10C performs a data origination (data cell origination). When the originating exchange 10C receives a transmission completion cell, various processes including a transmission judgment, a timer registration releasing, a charging control request, a charging index calculation based on the number of buffers and number of nodes used, and charging index calculation are performed.

Figure 55:
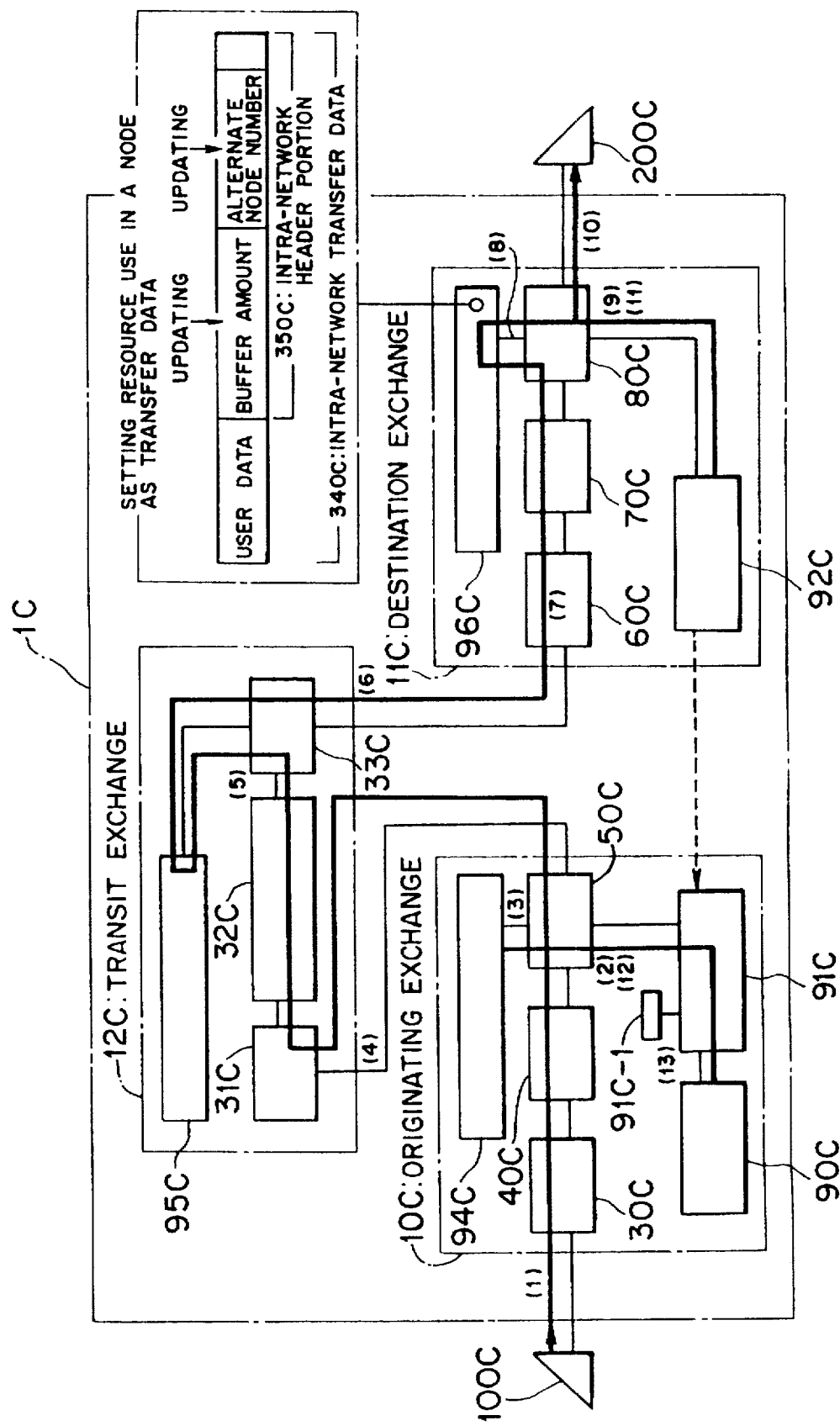
FIG. 55 is a block diagram used for explaining an operation of the second modification of the second embodiment according to the present invention.

When the originating terminal 100C transmits a user cell UC, the terminal complementary unit 30C in the cell exchange 10C receives it (refer to FIG. 55(1)). Then, after the cell processing unit 40C executes a necessary process, the cell transfer control unit 50C takes over the process flow. The cell transfer control unit 50C requests the originating transfer confirmation and control unit 91C to execute a transfer confirmation and registration (refer to FIG. 55(2)). After the cell transfer control unit 50C requests the resource use surveying unit 94C to examine resources in the node, it transmits the result from a station to another station (refer to FIG. 55(3)). The resource use surveying unit 94C, for example, sets the intranetwork header portion 350C in the intra-network transfer data 340C to a buffer length as a buffer amount of intra-network transfer data while it sets "1" as the number of alternate nodes.

The originating transfer confirmation and control means 91C captures a registration number BBB to write necessary information onto a transfer confirmation and registration list 300C.

The LS complementary unit 31C in the transit exchange 12C receives the user cell UC transmitted from a station to a station (refer to FIG. 55(4)). After the packet processing unit 32C performs a necessary process, it transmits the outcome to the LS complementary unit 33C. The LS complementary unit 33C requests the resource use surveying unit 95C to examine the amount of resources used in the node (refer to FIG. 55(5)) to transmit intra-network transfer data from a station to a station (refer to FIG. 55(6)). The resource use surveying unit 95C adds the buffer length of the intra-network transfer data 340C to the buffer amount of the intra-network header 350C in the intranetwork transfer data 340C and adds "1" to the alternate node.

The cell transfer control unit 60C in the destination exchange 11 receives the transfer data in the network (refer to FIG. 55(7)). After the cell processing unit 70C executes a necessary process, the outcome is taken over to the terminal complementary unit 80.

The terminal complementary unit 80C requests the resource use surveying unit 96C to examine the amount of resources used (refer to FIG. 55(8)). After the terminal complementary unit 80C transmits the user cell information to the destination confirmation and control unit 92C (refer to FIG. 55(9)), it transmits a user cell to the terminal 200C (refer to FIG. 55(10)). At this time, the resource use surveying unit 96C adds the buffer length of the intra-network transfer data in the self node to the buffer amount of the intra-network transfer data 340C in the intra-network header 350C, and adds "1" to the alternate node.

The destination transfer confirmation and control unit 92C edits a transmission completion cell 320C and returns the outcome to the originating transfer confirmation and control unit 91C in the originating exchange 10 (refer to FIG. 55(11)).

When the originating transfer confirmation and control unit 91C receives a transmission completion cell (refer to FIG. 55(12)), it confirms that transmission is under confirmation and registration, based on both the content of the transmission completion cell and the content of the transmission confirmation and registration list 300C. During the transmission confirmation and registration, the originating transfer confirmation and control unit 91C sends the amount of resources used in the network to the charging function unit 90C, together with terminal information and data link information, to execute a charging process (refer to FIG. 55(13)). The charging function unit 90C selects a calculation table corresponding to a delay time and an intra-network resource use specified by the charging index calculation table 331C to calculate a charging index.

Figure 56:
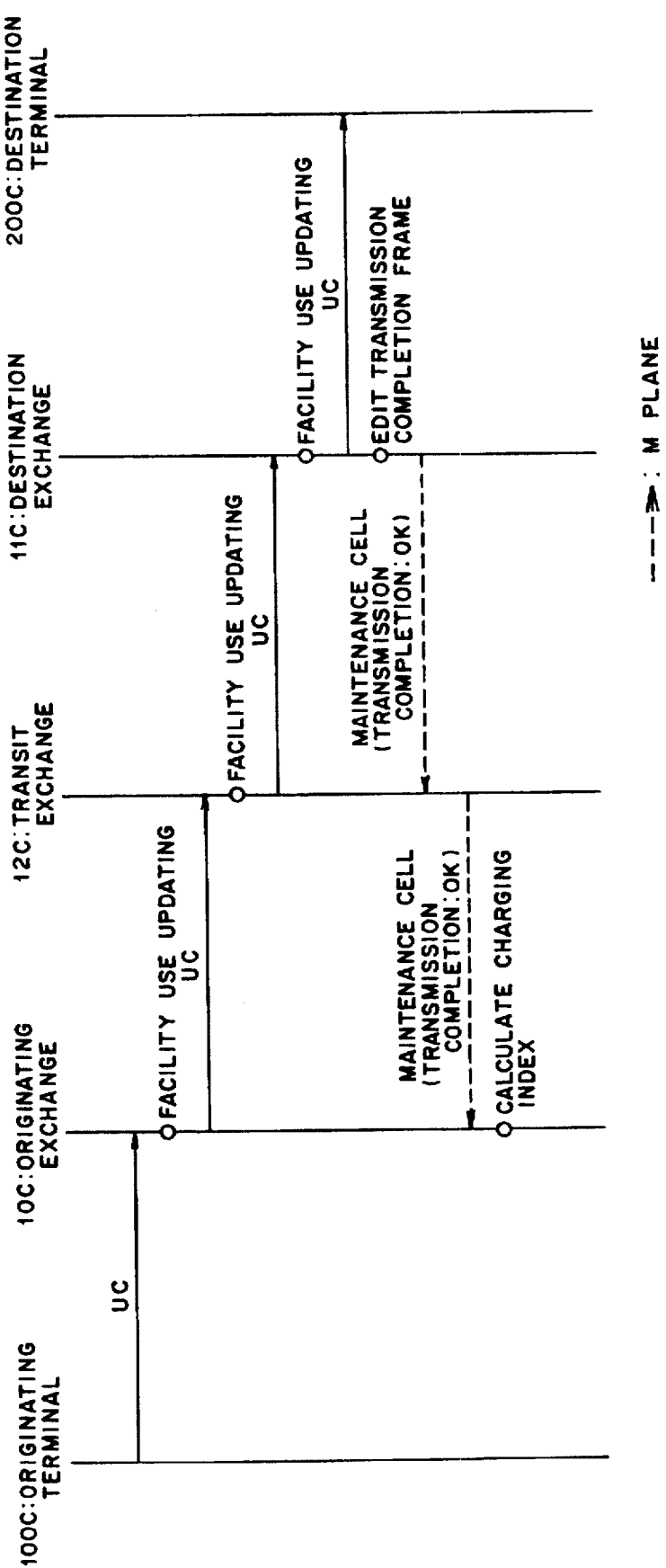
FIG. 56 is a signal sequence diagram used for explaining an operation of the second modification of the second embodiment according to the present invention.

The process described above is shown with the signal sequence diagram in FIG. 56. When the originating terminal 100C transmits the user cell UC, the originating exchange 10C updates the amount of equipment used while it transmits the user cell UC to the transit exchange 12C. The transit exchange 12C updates the amount of equipment used to transmit the data cell UC to the destination exchange 11C. When the ATM exchange 11C receives the user cell UC, it updates the amount of equipment used to transmit the user cell information to the destination transfer confirmation and control unit 92C. Then the user cell UC is transmitted to the destination terminal 200C. The destination transfer confirmation and control unit 92C edits a transmission completion cell. The destination exchange 11C transmits a user cell UC having information including an intra-network header and a transmission completion OK to the originating exchange 10C via the transit exchange 12C. When the originating exchange 10C receives the transmission completion cell 321C, it calculates a charging index in consideration of the amount of equipment used in the network (or intra-network facility use information).

For example, when an intra-network process delay (data transfer delay) becomes large with an increasing amount of equipment used in a user data network, a supplier of an ATM switching network can provide a good service quality by applying a lower charging system. If it is judged that the amount of equipment in a network used with a user data increases without any delay in processing in the network (data transfer delay), a supplier of another data switching network may apply a higher charging system.

As described above, according to the present invention, the charging system can be graduated to the amount of equipment used in the network in the ATM switching network 1C. Hence, services on the charging index can be improved. The service supplier can apply a higher charging system in the case where equipment in the network are heavily used. This means that the service supplier can make much profit.

Figure 57:
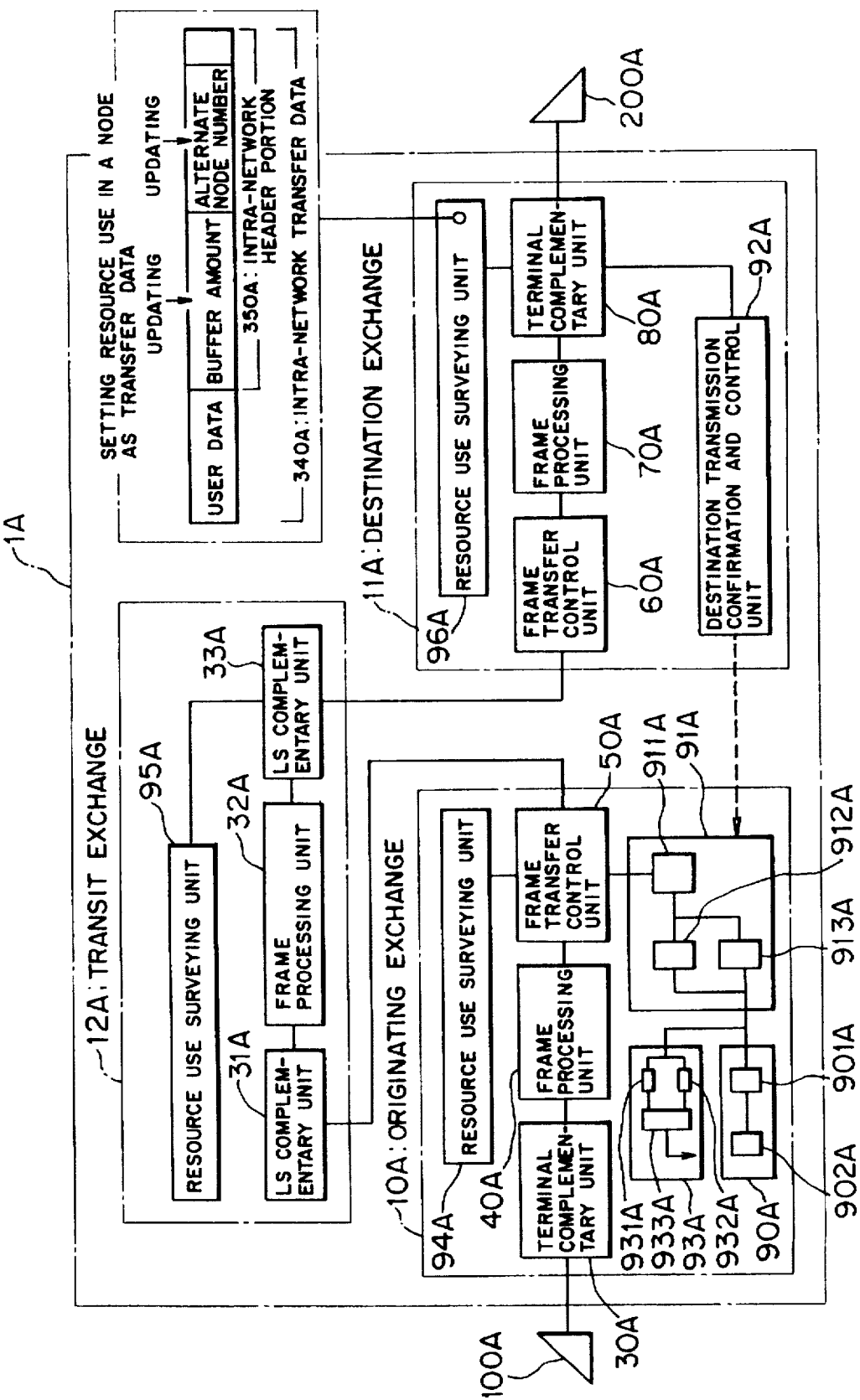
FIG. 57 is a block diagram showing the third embodiment of the present invention.

(d) Explanation of Third Embodiment:

FIG. 57 is a block diagram showing the third embodiment according to the present invention. Referring to FIG. 57, a frame relay exchange 1A includes an exchange 10A on an originating side, a transit exchange 12A, and an exchange 11A on a destination side.

The originating exchange 10A constitutes an originating node together with an originating terminal (frame relay terminal) 100A. The destination exchange 11A constitutes a receiving node together with a destination terminal (frame relay terminal) 200A, like the first and second embodiments.

The originating exchange 10A includes a terminal complementary unit (signal processing unit) 30A, a frame processing unit (signal processing unit) 40A, a frame transfer control unit (transfer processing unit) 50A, an originating transfer confirmation and control unit (originating transfer confirmation and control means) 91A, a delay time control unit (delay time measuring means) 93A, a charging function unit (charging function means) 90A, and a resource use surveying unit (resource use surveying means) 94A.

The destination exchange 11A includes a frame transfer control unit (transfer processing unit) 60A, a frame processing unit (signal processing unit) 70A, a terminal complementary unit (signal processing unit) 80A, a destination transfer confirmation and control unit (destination transfer confirmation and control means) 92A, and a resource use surveying unit (resource use surveying means) 96A.

The transit exchange 12A includes an LS complementary unit (signal processing unit) 31A, a frame processing unit (signal processing unit) 32A, an LS complementary unit (signal processing unit) 33A, and a resource use surveying unit (resource use surveying means) 95A.

In the originating exchange 10A, the terminal complementary unit 30A receives a user frame signal from the originating terminal 100A. The frame processing unit 40A receives a signal from the terminal complementary unit 30A to perform suitably a signal process. Both the terminal complementary unit 30A and the frame processing unit 40A form a signal processing unit which receives a signal from the originating terminal 100A to subject it to a suitable signal process.

The terminal complementary unit 30A and the frame processing unit 40A operate in the same manner as those in the first embodiment shown in FIGS. 8 and 9, respectively. Hence, the duplicate explanation will be omitted here.

When the frame transfer control unit 50A receives a signal from the frame processing unit 40A, it notifies the originating transfer confirmation and control unit 91A of a signal origination; requests the resource use surveying unit 94A to check resources in a node; and transfers a user frame signal to the destination exchange 11A, together with a result examined by the resource use surveying unit 95A. The frame transfer function is substantially the same as that of the first embodiment shown in FIG. 10. In this case, after a notifying process to the originating transfer confirmation and control unit 91A (refer to step C7), the resource use surveying unit 95A is additionally requested to check resources in a node.

The resource use surveying unit 94A examines the amount of resources used in the originating exchange 10A.

For example, the resource use surveying unit 94A updates a buffer length as a buffer amount in an intra-network transfer data and the number of alternate nodes to the intra-network header unit 350A in the intra-network transfer data 340A, and uses the outcome as information regarding the amount of resources used.

When the frame transfer processing unit 60A in the destination exchange 11A receives a user frame signal from the originating exchange 10A, it transfers a signal to the frame processing unit 70A. The operation of the frame transfer control unit 60A is the same as that in the first embodiment shown in FIG. 11. Hence, the duplicate explanation will be omitted here.

The frame processing unit 70A subjects a transit data signal received by the frame transfer processing unit 60A to a suitable signal process. The terminal complementary unit 80A notifies the destination transfer confirmation and control means 92A of a signal reception while it outputs a signal to the destination terminal 200A. Both the frame processing unit 70A and the terminal complementary unit 80A constitutes a signal processing unit that notifies the destination transfer confirmation and control means 92A of a signal reception when it receives the signal from the originating node via the frame transfer processing unit 60A while it outputs a signal to the destination terminal 200A. At the same time, information regarding the amount of intra-network equipment used between the originating node and the destination node (intra-network facility use information) is transmitted to the destination transfer confirmation and control means 92A.

The operation of each of the frame processing unit 70A and the terminal complementary unit 80A is substantially the same as those in the first embodiment shown in FIGS. 12 and 13. Hence, the duplicate explanation will be omitted here. The terminal complementary unit 80A requests the destination transfer confirmation and control unit 92A to execute a complete or incomplete process while it notifies information regarding the amount of equipment used between the originating node and the receiving node.

The resource use surveying unit 96A examines the amount of resources used in the destination exchange 11A. For example, the resource use surveying unit 96A updates a buffer length as a buffer amount in an intra-network transfer data and the number of alternate nodes to the intra-network header unit 350A in the intra-network transfer data 340A, and uses the outcome as resource use information.

The LS complementary units 31A and 33A in the transit exchange 12A perform a signal process between exchanges, respectively. The frame processing unit 32A performs the same signal process as the frame processing unit 40A in the originating exchange 10A and the frame processing unit 70A in the destination exchange 11A. The LS complementary unit 33A requests the resource use surveying unit 95A to examine resources in an node, and transmits a user frame signal to the destination exchange 11A, together with a result examined by the resource use surveying unit 95A.

The resource use surveying unit 95A examines the amount of resources used in the transit exchange 12A. For example, the resource use surveying unit 95A updates a buffer length as a buffer amount in an intra-network transfer data and the number of alternate nodes to the intra-network header unit 350A in the intra-network transfer data 340A, and uses the outcome as resource use information.

Furthermore, when the destination transfer confirmation and control unit 92A in the destination exchange 11A receives a signal from the originating exchange 10A via the transit exchange 12A, it transmits a transmission completion frame including information regarding the amount of equipment used between the originating node and the destination node in an network and transmission completion report information to the originating exchange 10A, the two pieces of information being obtained based on the amount of resources examined by the resource use surveying units 94A to 96A. The operation of the destination transfer confirmation and control unit 92A is similar to the first embodiment shown in FIG. 14. When the destination transfer confirmation and control unit 92A receives a request for a completion process from the terminal complementary unit 80A, it edits a transmission completion frame, and then transmits a transmission completion frame. In this case, the transmission completion frame, as shown in FIG. 58, includes information regarding an originating terminal number, a data link identifier, a transmission frame length, a link identifier and a intra-network resource use, in addition to the transmission completion status. U plane intra-network control information or M plane protocol header information is inserted into the transmission completion frame in accordance with the communication line.

The originating transfer confirmation and control unit 91A in the originating exchange 10A receives a transmission completion frame including transmission completion report information and intra-network facility use information from the destination transfer confirmation and control unit 92A. In accordance with the result received, the originating transfer confirmation and control means 91A also delivers a charging index setting request and a delay time measuring request when data is transferred from the originating exchange 10A to the destination exchange 11A. For that reason, the originating transfer confirmation and control means 91A functions both the transmission completion report receiving means 911A for receiving a transmission completion frame including intra-network facility use information and transmission completion report information, the delay time measuring and requesting means 912A for delivering a delay time measuring request when data is transferred from the originating node to the receiving node based on a result received by the transmission completion report receiving means 911A, and the charging index setting and requesting means 913A for delivering a charging index setting request when data is transferred from the originating node to the receiving node based on a result received by the transmission completion report receiving means 911A.

The originating transfer confirmation and control unit 91A includes a transfer confirmation and registration list 300A (refer to FIG. 59) acting as signal information memory means for storing information (registration status, terminal number, data link identifier, transmission frame length, registration number) regarding a signal received originated from the originating exchange 10A to the destination exchange 11A. When a transmission completion frame is received from the destination transfer confirmation and control unit 92A in the destination exchange 11A, the originating transfer confirmation and control unit 91A executes a signal collation in accordance with signal information (registration status, terminal number, data link identifier, transmission frame length, registration number) stored in the transmission confirmation and registration list 300A. As described above, since the originating transfer confirmation and control unit 91A includes a transmission confirmation and registration list 300A to perform a signal collation, an originating signal can be collated easily and certainly with a transmission completion frame returned due to the originating signal.

In response to a request from the delay time measurement requesting means 911A in the originating transfer confirmation and control unit 91A, the delay time control unit 93A measures a delay time taken to transfer data from the originating exchange 10A to the destination exchange 11A.

In this case, the delay time control unit 93A is constituted of originating time memory means 931A for storing the time at which a user frame signal is originated from the originating exchange 10A to the destination exchange 11A; transmission completion report receiving time memory means 932A for storing the time at which the originating exchange 10A receives a transmission completion frame from the destination exchange 11A; and time difference operating means 933A for operating a time difference between the time stored in the originating time memory means 931A and the time stored in the transmission completion report receiving means 932A and for operating the delay time taken to transfer data from the originating exchange 10A to the destination exchange 11A. As described above, the delay time control unit 93A can calculate easily and certainly a delay time by merely measuring both a signal origination time and a transmission completion frame receiving time.

The charging function unit 90A functions as a combination of the charging index setting means 901A for setting a different charging index based on a request from the charging index setting request means 913A in the originating transfer confirmation and control unit 91A, a delay time measured by the delay time measuring means 93A, and information regarding the amount of equipment used in a network; and the charging means 902A for performing a charging operation based on a charging index set by the charging index setting means 901A.

The charging index setting means 901A in the charging function unit 90A includes a charging index calculation table 332A acting as memory means for storing a charging index in accordance with a delay time and information regarding the amount of equipment used in a network (the amount of buffers used and the number of nodes) (refer to FIG. 60). The charging index calculation table 332A has plural tables corresponding to the amount of buffers used. Each table may store a table number to be retrieved next in accordance with the number of nodes and set a different charging index every delay time (refer to the charging function unit 90A in FIG. 61).

As described above, the charging index setting means 901A includes the charging index calculation table 332A to calculate a charging index quickly and with reliability.

Next, detail explanation will be made below as for the operation of each of the originating transfer confirmation and control unit 91A, the delay time control unit 93A, and the charging function unit 90A, with reference to FIG. 61.

The originating transfer confirmation and control unit 91A executes a timer registration request to edit the transfer confirmation and registration list 300A (steps H1 and H2). Thereafter, the originating transfer confirmation and control unit 91A waits for receiving a transmission completion frame (an event waiting status) from the destination exchange 11A (step H3). In a reception of the transmission completion frame, it is judged whether the transmission is OK in the step H4. If OK, the originating transfer confirmation and control unit 91A outputs a delay time measuring request to the delay time control unit 93A while it outputs a charging control request to the charging function unit 90A (steps H5 and H6).

When a predetermined period of time passes in the transmission completion frame reception waiting status, or a time-out has come, the timer registration is released (step H7). If the transmission is NG, a timer registration is released (step H7).

In response to a timer registration request to the originating transfer confirmation and control unit 91A, the delay time control unit 93A captures a link identifier and a present time (a time at which a signal is originated from the originating exchange 10A to the destination exchange 11A) to write the origination time onto a timer list (steps J1 to J3).

The originating exchange 10A captures the time at which a transmission completion frame from the destination exchange 11A has been received, and edits to write it onto the timer list (steps J4 and J5)

The registration number BBB of an origination signal is the address of a link identifier management table. Both the current signal origination time (start time) and transmission completion frame receiving time (end time) are written in a timer list corresponding to the address BBB. Then, the difference between the origination time and the reception time is measured (step J6) to release the link identifier (step J7).

The timer list in the link identifier management table includes information regarding a time-out time. It is judged whether a time-out time has come during a transmission completion frame reception waiting status by subtracting a time-out time in the link identifier management table in accordance with the timer control period task operated in an event waiting status (steps K1 and K2). When a time-out has come, the event is notified the originating transfer confirmation and control unit 91A (step K3). Thus, the originating transfer confirmation and control unit 91A releases the timer registration.

The charging function means 90A calculates a charging index from the table 332A based on the delay time, the number of buffers, or the number of nodes to obtain a charging index in accordance with (charging index x frame length) (steps L21 and L22).

At the data originating time (a user frame originating time) of the originating exchange 10A, a request for a timer registration request by the originating transfer confirmation and control unit 91A, an editing (steps H1 and H2) of the transfer confirmation and registration list 300A, a link identifier capture, a present time capture, and a timer list editing (steps J1 to J3) are performed. At a transmission completion frame receiving time of the originating exchange 10A, a transmission judgment, a delay time measuring request, a charging control request (steps H4 to H6), a receiving time capture, a timer list editing, a time difference measurement, a link identifier releasing (steps J4 to J7), a charging index calculation based on a delay time, the number of buffers, and the number of nodes, and a charging index calculation (steps L21 and L22) are performed.

Figure 62:
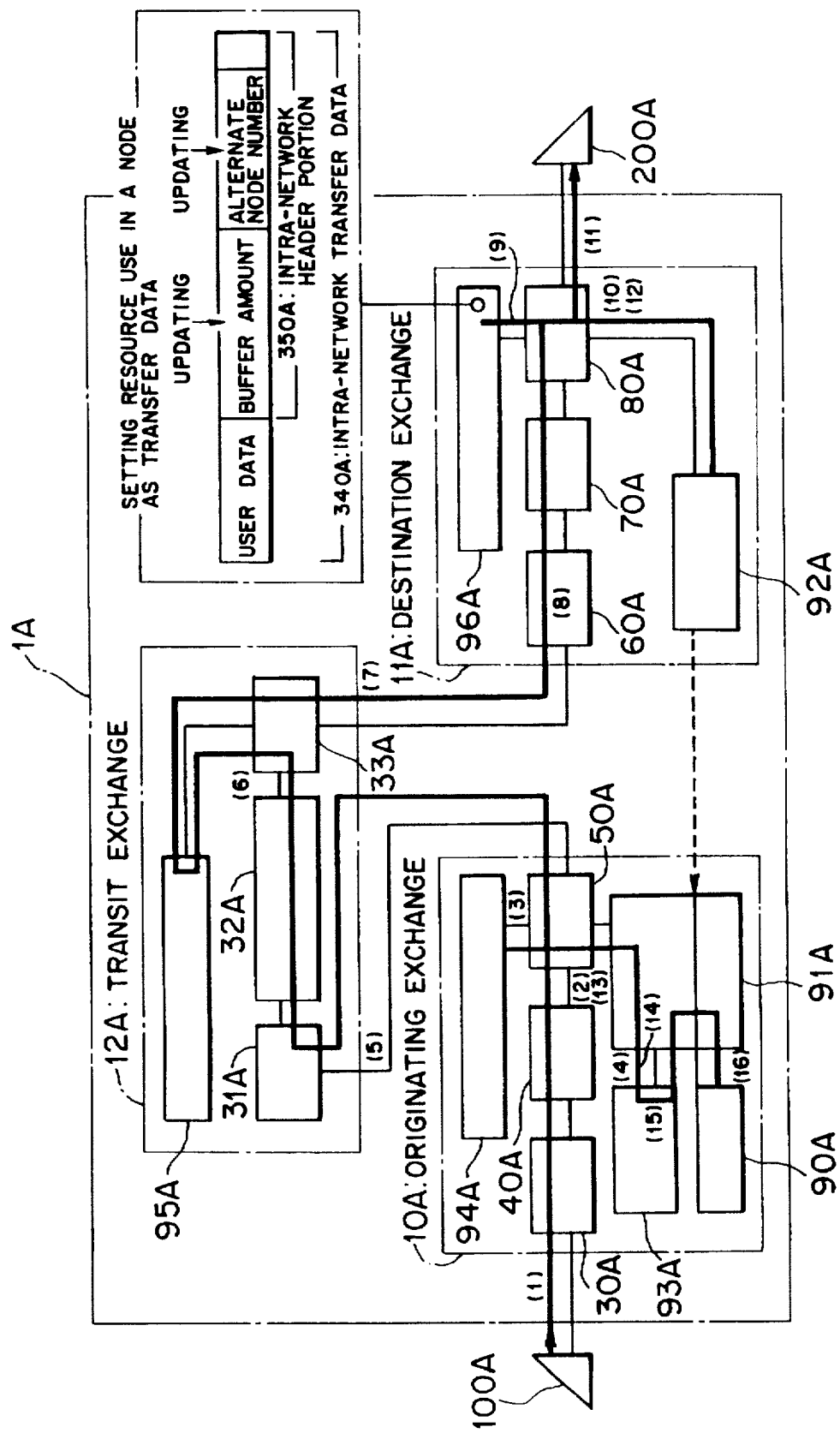
FIG. 62 is a block diagram used for explaining an operation of the third embodiment according to the present invention.

In the configuration described above, when the originating terminal 100A transmits a user frame UD, the terminal complementary unit 30A in the frame relay exchange 10A receives it (refer to FIG. 62(1)). Thereafter, after the frame processing unit 40A performs a necessary process, the frame transfer control unit 50A succeeds the process flow. The frame transfer control unit 50A request the originating transfer confirmation and control unit 91A to execute a transfer confirmation and registration (refer to FIG. 62(2)) and requests the resource use surveying unit 94A to check resources used in the node (refer to FIG. 62(3)). Then the frame transfer control unit 50A transmits data from one station to another station. The resource use surveying unit 94A sets a buffer length as the amount of buffers of transfer data in a network to the intranetwork header unit 350A in an intra-network transfer data 340A, or sets "1" to the number of alternate nodes.

The originating transfer confirmation and control means 91A captures a registration number BBB to write necessary information on the transfer confirmation and registration list 300A.

In this case, the originating transfer confirmation and control unit 91A further requests the delay time control unit 93A to start activating a delay time measurement. The delay time control unit 93A starts the timer corresponding to the registration number BBB (refer to FIG. 62(4)).

The LS complementary unit 31A in the transit exchange 12A receives a user frame UD transmitted from a station to a station (refer to FIG. 62(5)). Then the frame processing unit 32A subjects the user frame UD to a necessary process and then outputs the outcome to the LS complementary unit 33A. The LS complementary 33A requests the resource use surveying unit 95A to check the amount of resources used in a node (refer to FIG. 62(6)), then transmits intra-network transfer data from a station to a station (refer to FIG. 62(7)). The resource use surveying unit 95A adds the amount of buffers used in the intra-network header 350A in the intra-network transfer data 340A to the buffer length of the intra-network transfer data in the self-node, and adds "1" to the alternate node.

The frame transfer control unit 60A in the destination exchange 11 receives the intra-network transfer data (refer to FIG. 62(8)). After the frame processing unit 70A executes a necessary process of the intra-network transfer data, the outcome is sent to the terminal complementary unit 80A.

The terminal complementary unit 80A requests the resource use surveying unit 96A to check the amount of resources used in a node (FIG. 62(9)). The terminal complementary unit 80A transmits the user frame information to the destination transfer confirmation and control unit 92A (refer to FIG. 62(10)) and then transmits the user frame to the terminal 200A (refer to FIG. 62(11)). At this time, the resource use surveying unit 96A adds the amount of buffers in the intranetwork header 350A in the intra-network transfer data 340A to the buffer length of the intra-network transfer data in the selfnode, and adds "1" to the alternate node.

The destination transfer confirmation and control unit 92A edits a transmission completion frame 320A and then returns the outcome to the originating transfer confirmation and control unit 91A in the originating exchange 10A (refer to FIG. 62(12)).

In response to the transmission completion frame (refer to FIG. 62(13)), the originating transfer confirmation and control unit 91A confirms that a transmission is under confirmation and registration, in reference to the content of the transmission completion frame and the content of the transmission confirmation and registration list 300A. If the transmission is under confirmation and registration, the originating transmission confirmation and control unit 91A also requests the delay time control unit 93A to execute a delay time measurement of the registration number BBB (refer to FIG. 62(14)).

The delay time control unit 93A halts the timer corresponding to the registration number BBB to calculate the delay time (refer to FIG. 62(15)). The originating transfer confirmation and control unit 91A captures the delay time and then transmits the resources used in the network to the charging function unit 90A, together with terminal information and data link information, to perform a charging process (refer to FIG. 62(16)). The charging function unit 90A selects a delay time specified on the charging index calculation table 331A and a calculation table corresponding to the resources used in a network.

Figure 63:
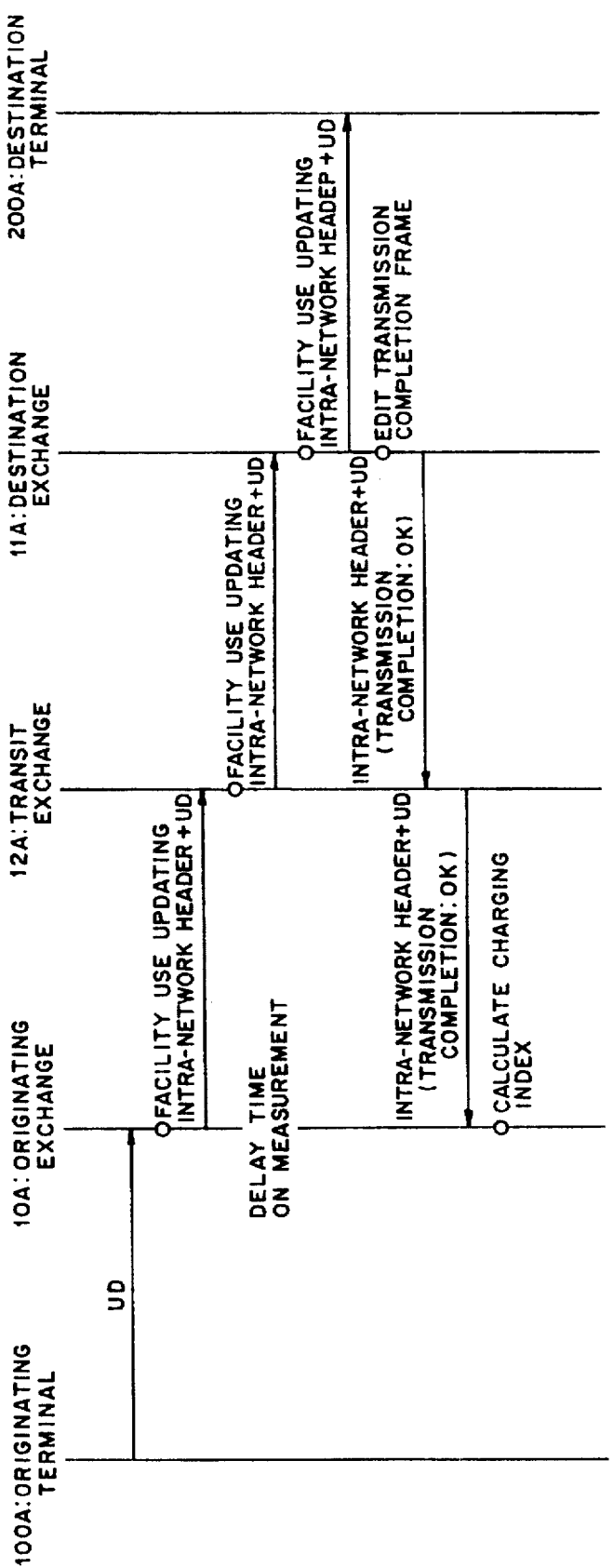
FIG. 63 is a signal sequence diagram used for explaining an operation of the third example according to the present invention.

The process described above is shown with the signal sequence diagram in FIG. 63. That is, when the originating terminal 100A transmits a user frame UD, the originating exchange 10A updates the amount of equipment used and transmits both an intra-network header and a user frame UD to the transit exchange 12A. At this time, it is assumed that the intra-network protocol is, for example, an LAPF core. When the frame relay exchange 11A receives a user frame UD, it updates the amount of equipment used and then sends the user frame information to the destination transfer confirmation and control unit 92A. Thus both the intra-network header and the user frame UD are transmitted to the destination terminal 200A. The destination transfer confirmation and control unit 92A edits a transmission completion frame. The destination exchange 11A transmits a user frame UD to the originating exchange 10A via the transit exchange 12A, the user frame UD having information regarding an intra-network header and a transmission completion frame OK. When the originating exchange 10A receives the transmission completion frame 321A, it measures the delay time taken from an origination to a transmission completion frame reception. A charging index is calculated in consideration to the delay time.

For example, when an intra-network process delay (data transfer delay) becomes large with an increasing number of user data used in a network, a supplier of a frame relay switching network can provide a good service quality by applying a lower charging system. If it is judged that the amount of equipment used with a user data network increases without any delay in processing in a network (or data transfer delay), a supplier of another data switching network can apply a higher charging system.

As described above, according to the present invention, the charging system can be graduated in accordance with the delay in processing and the amount of equipment used in the network in the frame relay switching network 1A. Hence, services can be improved on the charging index. The service supplier can consider a higher charging system in the case where equipment in the network are heavily used. This means that the service supplier can make much profit.

(d1) Explanation of the First Modification of the Third Embodiment:

The third embodiment relates to a frame relay switching network. The third embodiment is applicable to packet switching networks.

Figure 64:
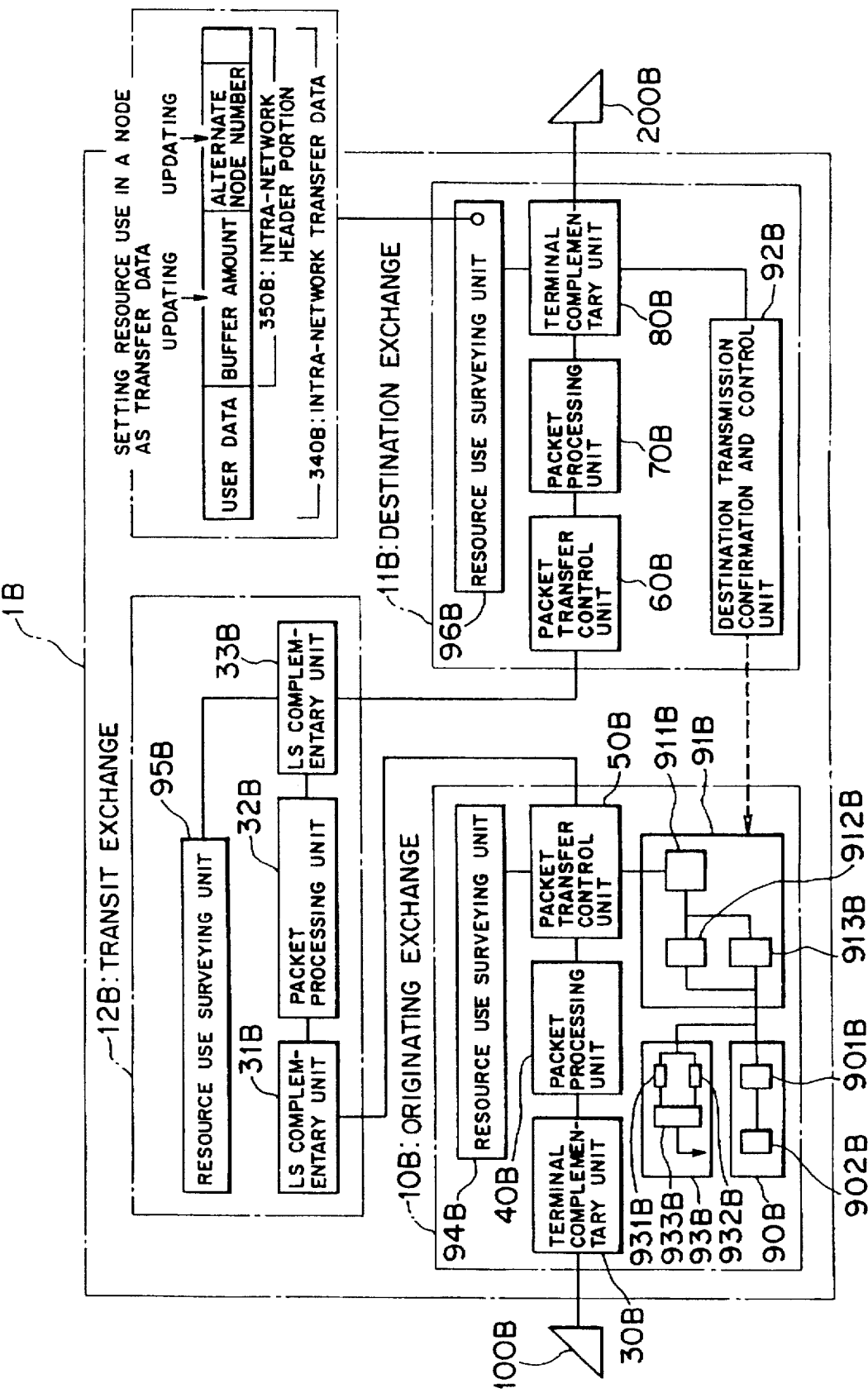
FIG. 64 is a block diagram showing the first modification of the third embodiment according to the present invention.

FIG. 64 is a block diagram showing the third embodiment applied to a packet switching network. Referring to FIG. 64, the packet switching network 1B includes an originating exchange 10B, a transit exchange 12B, and a destination exchange 11B.

The originating exchange 10B constitutes an originating node together with an originating terminal (packet terminal) 100B. The destination exchange 11B constitutes a destination node together with a destination terminal (packet terminal) 200B. This configuration is the same as the first modification of each of the first and second embodiments.

The originating exchange 10B includes a terminal complementary unit (signal processing unit) 30B, a packet processing unit (signal processing unit) 40B, a packet transfer control unit (transfer processing unit) 50B, an originating transfer confirmation and control unit (originating transfer confirmation and control means) 91B, a delay time control unit (delay time measuring means) 93B, a charging function unit (charging function means) 90B, and a resource use surveying unit (resource use surveying means) 94B.

The destination exchange 11B includes a packet transfer control unit (transfer processing unit) 60B, a packet processing unit (signal processing unit) 70B, a terminal complementary unit (signal processing unit) 80B, a destination transfer confirmation and control unit (destination transfer confirmation and control means) 92B, and a resource use surveying unit (resource use surveying means) 96B.

The transit exchange 12B includes an LS complementary unit (signal processing unit) 31B, a packet processing unit (signal processing unit) 32B, an LS complementary unit (signal processing unit) 33B, and a resource use surveying unit (resource use surveying means) 95B.

The terminal complementary unit 30B in the originating exchange 10B receives a data packet signal from the originating terminal 100B. The frame processing unit 40B subjects a signal from the originating terminal 100B received by the terminal complementary unit 30B to a suitable signal process. The signal processing unit is formed of the terminal complementary unit 30B and the packet processing unit 40B and receives a signal from the originating terminal 100B to subject it to a suitable signal process.

The operation of each of the terminal complementary unit 30B and the packet processing unit 40B is similar to those in the first embodiment shown in FIGS. 8 and 9. The duplicate explanation will be omitted here. In this case, the process in the step A5 represents "notify the packet processing unit 40B". The process of the step B5 represents "request the packet transfer control unit 50B". The process of the step B6 represents "receive a transmission status from the packet transfer control unit 50B".

When the packet transfer control unit 50B receives a signal from the packet processing unit 40B, it notifies the originating transfer confirmation and control unit 91B of the signal origination, requests the resource use surveying unit 94B to check the resources in the node, and transfers a data packet signal to the destination exchange 11B together with a result examined by the resource use surveying unit 95B. The operation regarding the packet transmission corresponds substantially to that shown in FIG. 10 (described above). In this case, the step C6 represents "notify the packet transfer processing unit 40B". The step C7 represents "notify the originating transfer confirmation and control unit 91B". After a notifying step to the originating transfer confirmation and control unit 91B shown in FIG. 10 (refer to step C7), the resource use surveying unit 95B is additionally requested to check the resources in a node.

The resource use surveying unit 94B examines the amount of resources used in the originating exchange 10B. The resource use surveying unit 94B, for example, updates the buffer length of intra-network transfer data as a buffer amount and the number of alternate nodes in the intra-network header unit 350B in the intra-network transfer data 340B to use those as resource use information.

When receiving a user packet signal from the originating exchange 10B, the packet transfer processing unit 60B in the destination exchange 11B transfers a signal to the packet processing unit 70B. The operation is similar to that in the first embodiment shown in FIG. 11. The duplicate explanation will be omitted here. In this case, the step D5 represents "notify the packet processing unit 70B".

The packet processing unit 70B subjects a signal received by the packet transfer processing unit 60B to a suitable signal process. The terminal complementary unit 80B notifies the destination transfer confirmation and control means 92B of a signal reception and outputs a signal to the destination terminal 200B. Both the packet processing unit 70B and the terminal complementary unit 80B constitutes a signal processing unit. When receiving a signal from the originating node via the packet transfer processing unit 60B and an intermediate node, the signal processing unit notifies the destination transfer confirmation and control means 92B of a signal reception and outputs a signal to the destination terminal 200B. In this case, the information regarding the amount of equipment used between the originating node and the receiving node in the network (or intra-network facility use information) is sent to the destination transfer confirmation and control means 92B.

The operation of each of the packet processing unit 70B and the terminal complementary unit 80B is substantially similar to that of the first embodiment shown in FIGS. 12 and 13. The duplicate explanation will be omitted here. In this case, the step F6 represents "request the destination transfer confirmation and control unit 92B to execute a completion process". The step F7 represents "request the destination transfer confirmation and control unit 92B to execute a incompletion process". At the time of a complete or incomplete process to the destination transfer confirmation and control unit 92B, the terminal complementary unit 80B notifies the destination transfer confirmation and control unit 92B of information regarding the amount of equipment used between the originating node and the receiving node in the network.

The resource use surveying unit 96B examines the amount of resources used in the destination exchange 11B. The resource use surveying unit 96B, for example, updates the buffer length of intra-network transfer data as a buffer amount and the number of alternate nodes in the intra-network header unit 350B in the intra-network transfer data 340B to use those as resource use information.

In the transit exchange 12B, each of the LS complementary unit 31B and 33B executes a signal process between exchanges. The frame processing unit 32B executes substantially the same signal process as that of each of the frame processing unit 40B in the originating exchange 10B and the frame processing unit 70B in the destination exchange 11B. The LS complementary unit 33B requests the resource use surveying unit 95B to check resources in the node and transmits a user frame signal to the destination exchange 11B, together with a result examined by the resource use surveying unit 95B.

The resource use surveying unit 95B checks the amount of resources used in the transit exchange 12B. For example, the resource use surveying unit 95B updates the buffer length as a buffer amount of intra-network transfer data and the number of alternate nodes in the intra-network header portion 350B in the intra-network transfer data 340B to use the updated information as resource use information.

In response to a signal from the originating exchange 10B via the transit exchange 12B, the destination transfer confirmation and control unit 92B in the destination exchange 11B transfers a transmission completion packet including information regarding the amount of equipment used between the originating node and the receiving node in the network to the originating exchange 10B, the two pieces of information being obtained based on the amount of resources used which is examined by the resource use surveying units 94B to 96B. The process in the destination transfer confirmation and control unit 92B is nearly similar to that in the first embodiment shown in FIG. 14. That is, in response to a completion process request from the terminal complementary unit 80B, the destination transfer confirmation and control unit 92B edits a transmission completion packet, and then transmits a transmission completion packet. The transmission completion packet, as shown in FIG. 65, has information including an originating terminal number, a data link identifier, a transmission packet length, a link identifier, and intra-network resource use, in addition to the transmission completion status. U plane intra-network control information or M plane protocol header information is inserted into a transmission completion packet in accordance with a communication line to which the transmission completion packet is transmitted.

The originating transfer confirmation and control unit 91B in the originating exchange 10B receives a transmission completion packet including transmission completion report information and intra-network facility use information from the destination transfer confirmation and control unit 92B. Based on the result received, the originating transfer confirmation and control unit 91B delivers a delay time measuring request and a charging index setting request when data is transferred from the originating exchange 10B to the destination exchange 11B. Hence, the originating transfer confirmation and control unit 91B functions as the transmission completion report information receiving means 911B for receiving a transmission completion packet including intra-network facility use information and transmission completion report information, the delay time measurement requesting means 912B for delivering a delay time when data is transmitted from the originating node to the receiving node based on a result received by the transmission completion report information receiving means 911B, and the charging index setting request means 913B for delivering a charging index setting request when data is transmitted from the originating node to the receiving node based on a result received by the transmission completion report information receiving means 911B.

The originating transfer confirmation and control unit 91B includes a transmission confirmation and registration list 300B (refer to FIG. 66) acting as signal information memory means to store information (registration status, terminal number, data link identifier, transmission packet length, registration number) regarding a signal transmitted from the originating exchange 10B to the destination exchange 11B. When the originating transmission confirmation and control unit 91B receives a transmission completion packet from the destination transfer confirmation and control unit 92B in the destination exchange 11B, it collates a signal based on signal information (registration status, terminal number, data link identifier, transmission packet length, registration number) stored in the transmission confirmation and registration list 300B. As described above, since the originating transfer confirmation and control means 91B includes a transmission confirmation and registration list 300B to perform a collating operation, it is easy and certain to collate an originating signal with a transmission completion packet returned due to the originating signal.

The delay time control unit 93B receives a request from the delay time measurement requesting means 911B in the originating transfer confirmation and control unit 91B to measure a delay time taken to transfer data from the originating exchange 10B to the destination exchange 11B.

In this case, the delay time control unit 93B includes originating time memory means 931B for storing the time at which a data packet signal is outputted from the originating exchange 10B to the destination exchange 11B; transmission completion report receiving time memory means 932B for storing the time at which the originating exchange 10B receives a transmission completion packet from the destination exchange 11B; and time difference operating means 933B for operating a time difference between the time stored in the originating time memory means 931B and the time stored in the transmission completion report receiving time memory means 932B and for operating the delay time when data is transferred from the originating exchange 10B to the destination exchange 11B. The delay time control unit 93B described above can calculate easily and without errors a delay time by merely measuring a signal originating time and a transmission completion packet receiving time.

The charging function unit 90B includes charging index setting means 901B for setting a different index based on a request from the charging index setting request means 913B in the originating transfer confirmation and control unit 91B and intra-network facility use information obtained by the originating transfer confirmation and control unit 91B, and charging means 902B for performing a charging operation based on a charging index set by the charging index setting means 901B.

The charging index setting means 901B in the charging function means 90B includes a charging index calculation table 332B acting as memory means for storing a charging index in accordance with a delay time and intra-network facility use information (the amount of buffers used and the number of nodes) (refer to FIG. 67). The charging index calculation table 332B has plural tables each corresponding to a buffer used. In each table, a different charging index is set corresponding to the number of nodes and a delay time. In each table, the number of tables to be retrieved next may be stored in accordance with the number of nodes to prepare a table with a different charging index set every delay time (refer to the charging function unit 90B shown in FIG. 68).

As described above, since the charging index setting means 901B includes the charging index calculation table 332B, a charging index can be calculated quickly and certainly.

Figure 61:
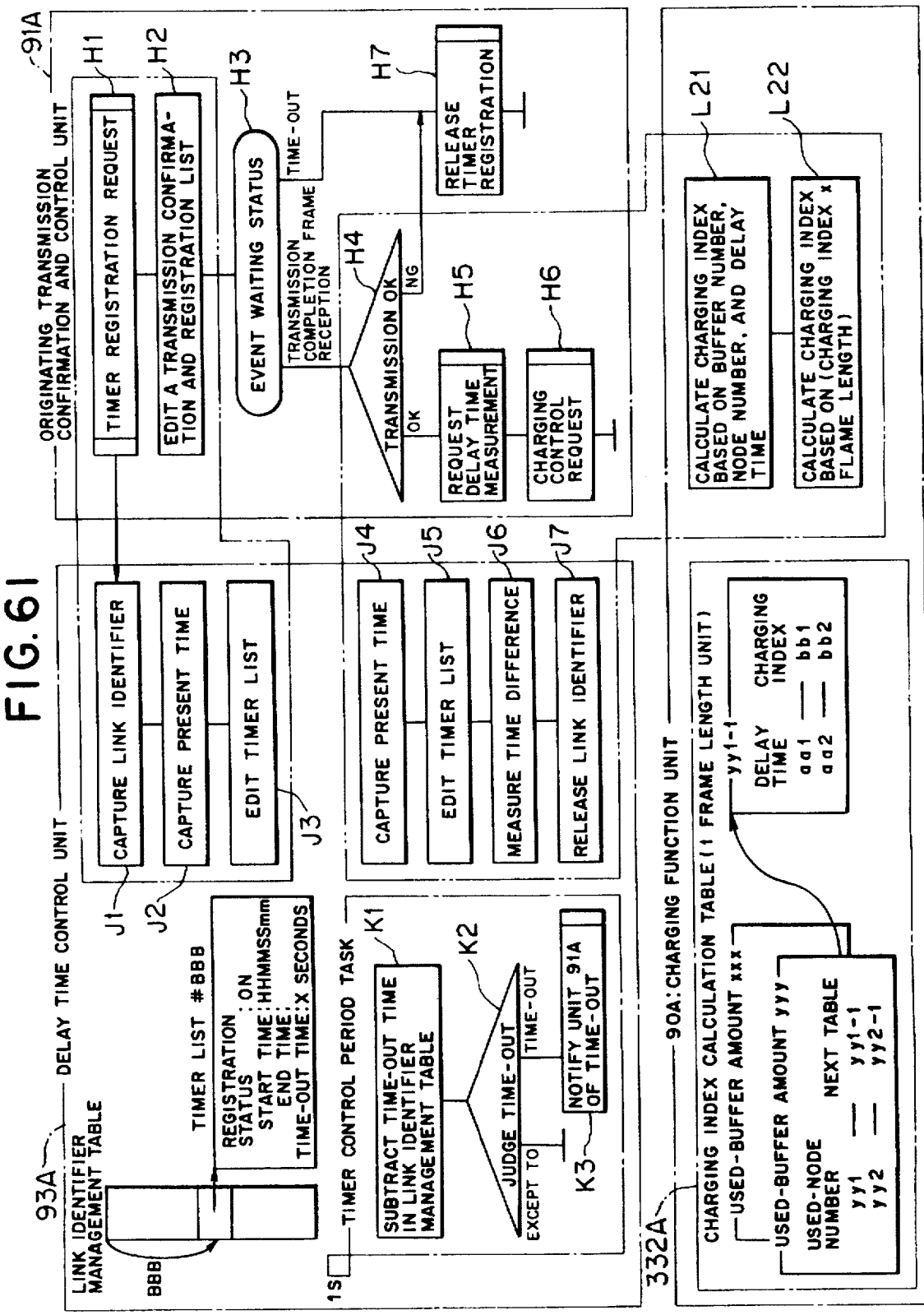
FIG. 61 is a diagram used for explaining an operation each of an originating transmission confirmation control unit, a timer control unit, and a charging function unit.

The operation of the timer control unit 93 is similar to that in the third embodiment shown in FIG. 61. However, the operation in the step K3 is "notify the originating transfer confirmation and control unit 91B of a time-out".

The operation of the charging function unit 90B is similar to that in the third embodiment shown in FIG. 61. In this case, one packet length unit is used in the charging index calculation table.

In this case, when the originating exchange 10B performs a data origination (data packet origination), a process which includes a timer registration request by the originating transfer confirmation and control unit 91B, an editing of the transfer confirmation and registration list 300B, a link identifier capture, a present time capture, and a timer list editing is performed. When the originating exchange 10B receives a transmission packet, a process which includes a transmission judgment, a delay time measuring request, a charging control request, a receiving time capture, a timer list editing, a difference time measurement, a link identifier releasing, a charging index calculation based on a delay time, and a charging index calculation is performed.

Figure 68:
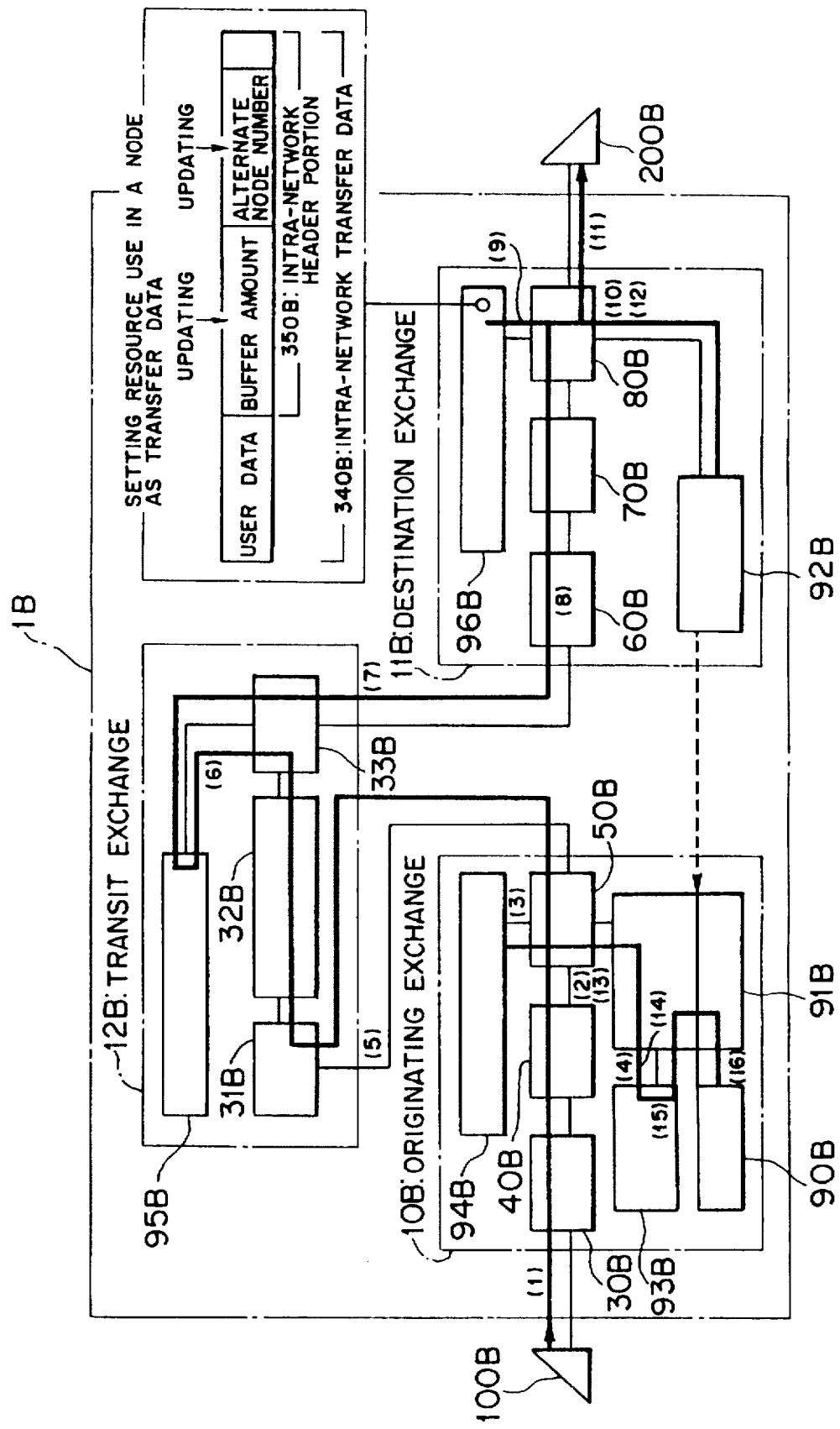
FIG. 68 is a block diagram used for explaining an operation of the first modification of the third embodiment according to the present invention.

When the originating terminal 100B transmits a data packet DT, the terminal complementary unit 30B in the packet exchange 10B receives it (refer to FIG. 68(1)). Then, after the packet processing unit 40B executes a necessary process, the packet transfer control unit 50B takes over the process flow. The packet transfer control unit 50B requests the originating transfer confirmation and control unit 91B to execute a transfer confirmation and registration (refer to FIG. 68(2)). After the packet transfer control unit 50B requests the resource use surveying unit 94B to check the resources in the node, it transmits the result from a station to a station (refer to FIG. 68(3)). The resource use surveying unit 94B, for example, sets the intra-network header portion 350B in the intra-network transfer data 340B to a buffer length as the buffer amount of intra-network transfer data while it sets "1" to the number of alternate nodes.

The originating transfer confirmation and control means 91B captures a registration number BBB to write necessary information onto a transfer confirmation and registration list 300B.

At this time, the originating transfer confirmation and control unit 91B captures the registration number BBB to write necessary information on the transfer confirmation and registration list 300B while it requests the delay time control unit 93B to measure the delay time of the corresponding registration number BBB. The delay time control unit 93B activates the timer corresponding to the registration number BBB (refer to FIG. 68(4)).

The LS complementary unit 31B in the transit exchange 12B receives the data packet DT transmitted from a station and a station (refer to FIG. 68(5)). After the packet processing unit 32B performs a necessary process, it transmits the outcome to the LS complementary unit 33B. The LS complementary unit 33B requests the resource use surveying unit 95B to check the amount of resources used in the node (refer to FIG. 68(6)) to transmit intra-network transfer data from a station to a station (refer to FIG. 68(7)). The resource use surveying unit 95B adds the buffer length of the intra-network transfer data 340B to the buffer amount in the intra-network header 350B in the intranetwork transfer data 340B and adds "1" to the alternate node.

The packet transfer control unit 60B in the destination exchange 11 receives the transfer data in the network (refer to FIG. 68(8)). After the packet processing unit 70B subjects a necessary process to the data packet, the outcome is sent to the terminal complementary unit 80.

The terminal complementary unit 80B requests the resource use surveying unit 96B to check the amount of resources used in the node (refer to FIG. 68(9)). After the terminal complementary unit 80B transmits data packet information to the destination confirmation and control unit 92B (refer to FIG. 68(10)), it transmits a data packet to the terminal 200B (refer to 68(11)). At this time, the resource use surveying unit 96B adds the buffer length of the intra-network transfer data in the self node to the buffer amount of the intra-network transfer data 340B in the intra-network header 350B, and adds "1" to the alternate node.

The destination transfer confirmation and control unit 92B edits a transmission completion packet 320B and returns the outcome to the originating transfer confirmation and control unit 91 in the originating exchange 10 (refer to FIG. 68(12)).

When the originating transfer confirmation and control unit 91B receives the transmission completion packet (refer to FIG. 68(13)), it confirms that transmission is under confirmation and registration, based on both the content of the transmission completion packet and the content of the transmission and confirmation registration list 300B. If the transmission is under confirmation and registration, the originating transfer confirmation and control unit 91B requests the delay time control unit 93B to measure the delay time of the registration number BBB (refer to FIG. 68(14)).

The delay time control unit 93B halts the timer corresponding to the registration number BBB to calculate the delay time (refer to FIG. 68(15)). The originating transfer confirmation and control unit 91B, which has captured the delay time, sends the amount of resources used in the network to the charging function unit 90B, together with terminal information and the data link information (refer to FIG. 68(16)). The charging function unit 90B selects a delay time specified by the charging index calculation table 332B and a calculation table corresponding to the amount of resources used in the network to calculate a charging index.

Figure 69:
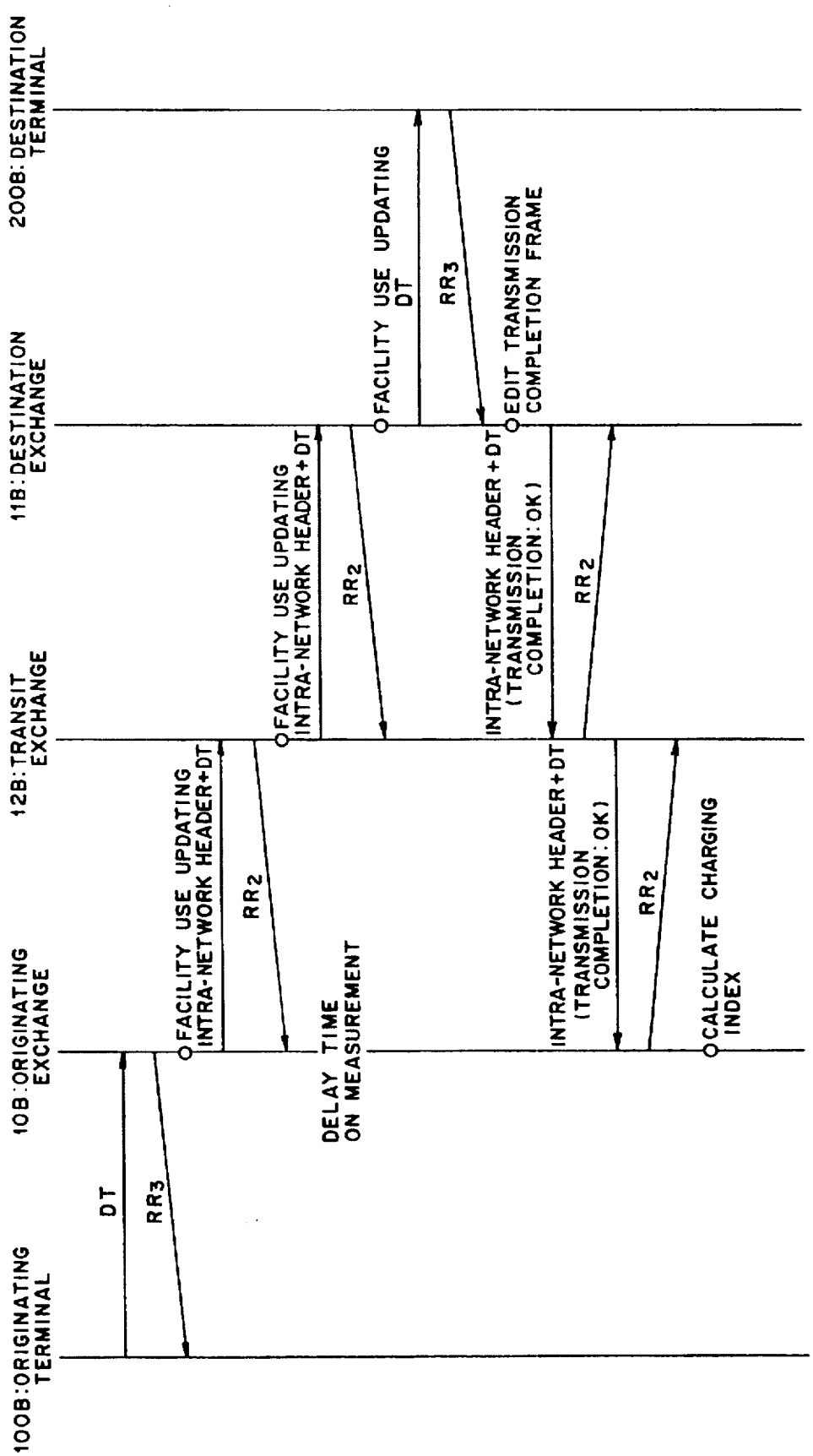
FIG. 69 is a signal sequence diagram used for explaining an operation of the first modification of the third embodiment according to the present invention.

The process described above is shown with the signal sequence diagram in FIG. 69. When the originating terminal 100B transmits the data packet DT, the originating exchange 10B returns the layer 2 receivable packet RR2 to the originating terminal 100B and updates the amount of equipment used (or facility use) to transmit an intra-network header and a data packet DT to the transit exchange 12B.

The transit exchange 12B returns the layer 2 receivable packet RR2 to the originating exchange 10B, and updates the facility use to transmit the intra-network header and the data packet DT to the destination exchange 11B. When the packet exchange 11B receives a data packet DT, it returns the layer 2 receivable packet RR2 to the transit exchange 12B while it updates the facility use to transmit the data packet information to the destination transfer confirmation and control unit 92B. Then the data packet DT is transmitted to the destination terminal 200B. The destination terminal 200B returns the layer 3 receivable packet RR3 to the destination exchange 11B. The destination transfer confirmation control unit 92B edits a transmission completion packet. The destination exchange 11B transmits both an intra-network header and a data packet DT having information regarding a transmission completion packet OK to the originating exchange 10B via the transit exchange 12B. When the originating exchange 10B receives the data packet DT, the layer 2 receivable packet RR2 is sent back. When the originating exchange 10B receives the transmission completion packet 321B, it calculates a delay time taken between the origination and the reception of the transmission completion packet and then calculates a charging index in consideration of both the delay time and the amount of equipment used in the network.

For example, when a delay in an intra-network process (data transfer delay) becomes large with an increasing amount of equipment in a network used with user data, a supplier of a packet switching network can provide a good service quality by applying a low charging system. If it is judged that the amount of equipment in the network used with user data increases without any delay in processing in a network (data transfer delay), a supplier of an another data switching network can apply a higher charging system.

As described above, according to the present invention, the charging system can be graduated to a delay in processing in a user data network and the amount of equipment used in the network in the packet switching network 1B. Hence, services on the charging index can be improved. The service supplier can consider a higher charging system in the case where equipment in the network are heavily used. This means that the service supplier can make much profit.

(d2) Explanation of the Second Modification of the Third Embodiment:

The third embodiment relates to a frame relay switching network. The first modification of the third embodiment relates to a packet switching network. However, the third embodiment or the first modification of the third embodiment is applicable to ATM switching networks.

Figure 70:
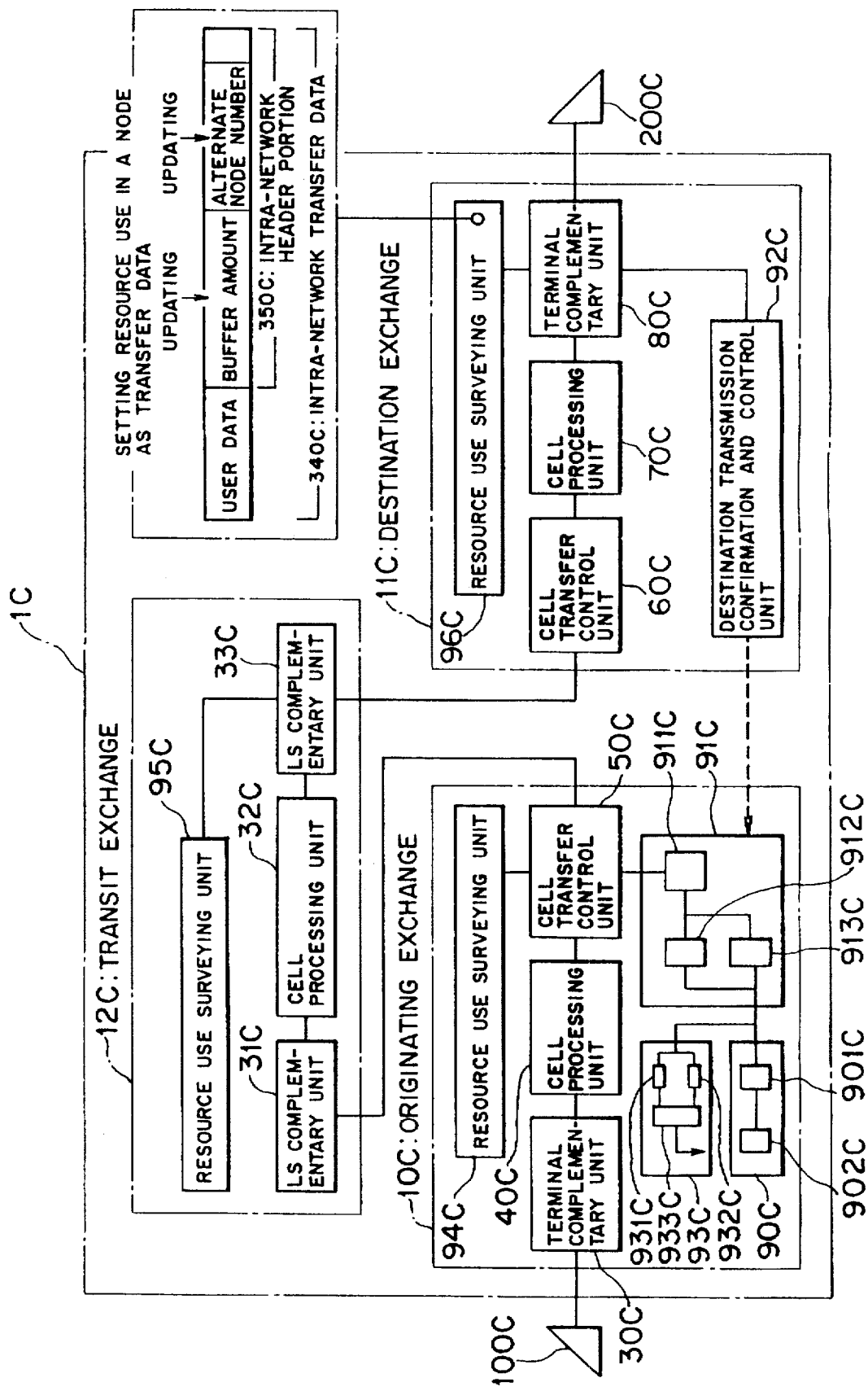
FIG. 70 is a block diagram showing the second modification of the third embodiment according to the present invention.

FIG. 70 is a block diagram showing the third embodiment applied to an ATM switching network. Referring to FIG. 70, the ATM switching network 1C includes an originating exchange 10C, a transit exchange 12C, and a destination exchange 1C.

The originating exchange 10C constitutes an originating node together with an originating terminal (ATM terminal) 100C. The destination exchange 11C constitutes a receiving node together with a destination terminal (ATM terminal) 200C. This configuration is the same as the second modification of each of the first and second embodiments.

The originating exchange 10C includes a terminal complementary unit (signal processing unit) 30C, a cell processing unit (signal processing unit) 40C, a cell transfer control unit (transfer processing unit) 50C, an originating transfer confirmation and control unit (originating transfer confirmation and control means) 91C, a delay time control unit (delay time measuring means) 93C, a charging function unit (charging function means) 90C, and a resource use surveying unit (resource use surveying means) 94C.

The destination exchange 11C includes a cell transfer control unit (transfer processing unit) 60C, a cell processing unit (signal processing unit) 70C, a terminal complementary unit (signal processing unit) 80C, a destination transfer confirmation and control unit (destination transfer confirmation and control means) 92C, and a resource use surveying unit (resource use surveying means) 96C.

The transit exchange 12C includes an LS complementary unit (signal processing unit) 31C, a cell processing unit (signal processing unit) 32C, an LS complementary unit (signal processing unit) 33C, and a resource use surveying unit (resource use surveying means) 95C.

The terminal complementary unit 30C in the originating exchange 10C receives a signal from the originating terminal 100C. The cell processing unit 40C subjects a suitable signal process to a data packet signal from the originating terminal 100C received by the terminal complementary unit 30C. The signal processing unit is formed of the terminal complementary unit 30C and the cell processing unit 40C, and receives a signal from the originating terminal 100C to subject it to a suitable signal process.

The operation of each of the terminal complementary unit 30C and the cell processing unit 40C is similar to those in the first embodiment shown in FIGS. 8 and 9. The duplicate explanation will be omitted here. In this case, the process in the step A5 represents "notify the packet processing unit 40C". The process of the step C5 represents "request the cell transfer control unit 50C". The process of the step C6 represents "receive a transmission status from the packet transfer control unit 50C".

When the cell transfer control unit 50C receives a signal from the cell processing unit 40C, it notifies the originating transfer confirmation and control unit 91C of the signal origination. At the same time the cell transfer control unit 50C requests the resource use surveying unit 94C and transfers a signal to the destination exchange 11C, together with a result examined by the resource use surveying unit 95C. The operation regarding the cell transmission corresponds substantially to that in the first embodiment shown in FIG. 10. In this case, the step C6 represents "notify the cell transfer processing unit 40C". The step C7 represents "notify the originating transfer confirmation and control unit 91C". After a notifying step to the originating transfer confirmation and control unit 91C shown in FIG. 10 (refer to step C7), the resource use surveying unit 95C is requested to additionally examine the amount of resources used in a node.

The resource use surveying unit 94C examines the amount of resources used in the originating exchange 10C. The resource use surveying unit 94C, for example, updates the buffer length as a buffer amount of intra-network transfer data and the number of alternate nodes in the intra-network header unit 350C in the intra-network transfer data 340C to use those as resource use information.

When receiving a signal from the originating exchange 10C, the cell transfer processing unit 60C in the destination exchange 11C transfers a signal to the cell processing unit 70C. The operation is similar to that in the first embodiment shown in FIG. 11. Hence, the duplicate explanation will be omitted here. In this case, the step D5 represents "notify the cell processing unit 70C".

The cell processing unit 70C subjects a transit data signal received by the cell transfer processing unit 60C to a suitable signal process. The terminal complementary unit 80C notifies the destination transfer confirmation and control means 92C of a signal reception and outputs a signal to the destination terminal 200C. Both the cell processing unit 70C and the terminal complementary unit 80C constitute a signal processing unit. The signal processing unit notifies the destination transfer confirmation and control means 92C of a signal reception and outputs a signal to the destination terminal 200C when it receives a signal from the originating node via the packet transfer processing unit 60C and an intermediate node. In this case, the information regarding the amount of equipment used between the originating node and the receiving node in the network is sent to the destination transfer confirmation and control means 92C.

The operation of each of the cell processing unit 70C and the terminal complementary unit 80C is similar to that of the first embodiment shown in FIGS. 12 and 13. The duplicate explanation will be omitted here. In this case, the step F6 represents "request the destination transfer confirmation and control unit 92C to execute a completion process". The step F7 represents "request the destination transfer confirmation and control unit 92C to execute an incompletion process. At the time of a completion or incompletion process to the destination transfer confirmation and control unit 92C, the terminal complementary unit 80C notifies the destination transfer confirmation and control unit 92C of information regarding the amount of equipment used between the originating node and the receiving node in the network (or intra-network facility use information).

The resource use surveying unit 96C examines the amount of resources used in the destination exchange 11C. The resource use surveying unit 96C, for example, updates the buffer length as a buffer amount of intra-network transfer data and the number of alternate nodes in the intra-network header unit 350C in the intra-network transfer data 340C to use those as resource use information.

In the transit exchange 12C, each of the LS complementary unit 31C and 33C executes a signal process between exchanges. The frame processing unit 32C executes substantially the same signal process as that of each of the frame processing unit 40C in the originating exchange 10C and the frame processing unit 70C in the destination exchange 11C. The LS complementary unit 33C requests the resource use surveying unit 95C to examine the amount of resources in a node and then transmits a user frame signal to the destination exchange 11C, together with a result examined by the resource use surveying unit 95C.

The resource use surveying unit 95C examines the amount of resources used in the transit exchange 12C. For example, the resource use surveying unit 95C updates the buffer length as a buffer amount of intra-network transfer data and the number of alternate nodes in the intra-network header portion 350C in the intra-network transfer data 340C to use the updated information as resource use information.

Figure 71:
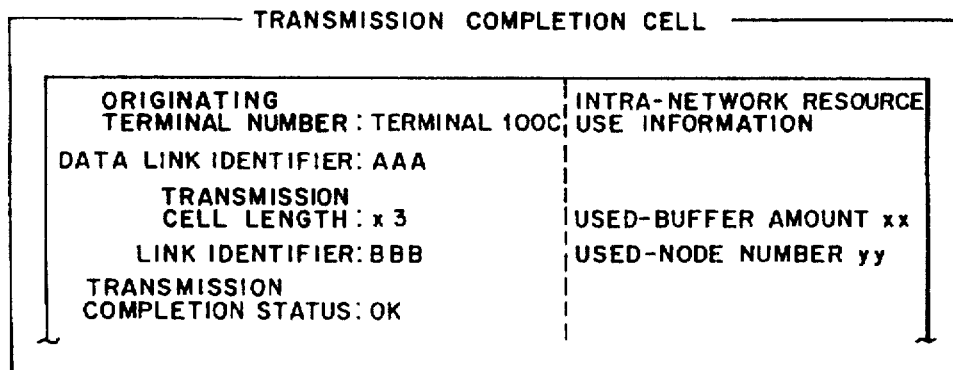
FIG. 71 is a diagram used for explaining a transmission completion cell.

In response to a signal from the originating exchange 10C via the transit exchange 12C, the destination transfer confirmation and control unit 92C in the destination exchange 11C transfers a transmission completion packet including information regarding the amount of equipment used between the originating node and the receiving node in a network and transmission completion report information to the originating exchange 10C, the two pieces of information being obtained based on the amount of resources used which is examined by the resource use surveying units 94C to 96C. The process in the destination transfer confirmation and control unit 92C is nearly similar to that in the first embodiment shown in FIG. 14. That is, the destination transfer confirmation and control unit 92C edits a transmission completion packet when the terminal complementary unit 80C requests it to perform a completion process, and then transmits a transmission completion packet. The transmission completion packet, as shown in FIG. 71, has information including an originating terminal number, a data link identifier, a transmission packet length, a link identifier, and an intra-network resource use, in addition to the transmission completion status. The transmission completion cell is sent by way of a maintenance communication line.

When the originating transfer confirmation and control unit 91C in the originating exchange 10C receives a transmission completion packet including transmission completion report information and intra-network facility use information from the destination transfer confirmation and control unit 92C, it delivers a delay measuring time and a charging index setting request when data is transferred from the originating exchange 10C to the destination exchange 11C, based on the result received. Hence, the originating transfer confirmation and control unit 91C functions as the transmission completion report receiving means 911C for receiving a transmission completion cell including intranetwork facility use information and transmission completion report information, delay time measurement requesting means 912C for delivering a delay time when data is transferred from the originating node to the receiving node based on a result received by the transmission completion report information receiving means 911C, and the charging index setting request means 913C for delivering a charging index setting request when data is transferred from the originating node to the receiving node based on a result received by the transmission completion report information receiving means 911C.

Figure 72:
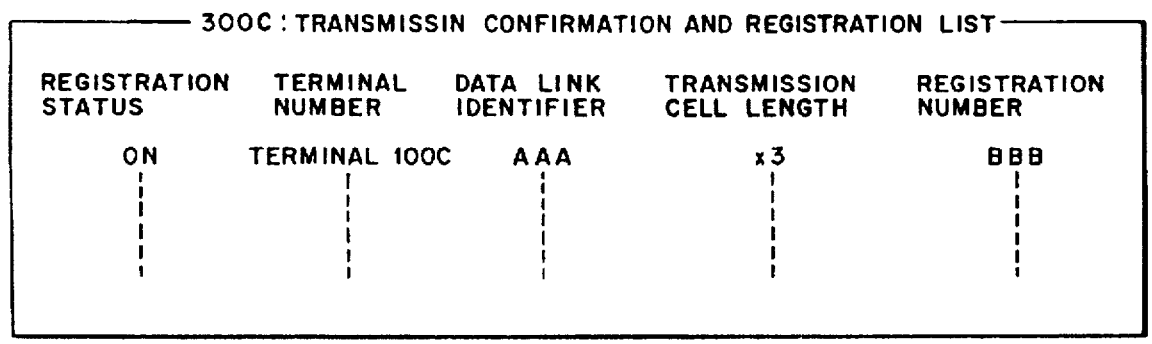
FIG. 72 is a diagram used for explaining a transmission confirmation registration list.

The originating transfer confirmation and control unit 91C includes a transmission confirmation and registration list 300C (refer to FIG. 72) acting as signal information memory means to store information (registration status, terminal number, data link identifier, transmission packet length, registration number) regarding a signal transmitted from the originating exchange 10C to the destination exchange 11C. When the originating transmission confirmation and control unit 91C receives a transmission completion cell from the destination transfer confirmation and control unit 92C in the destination exchange 11C, it collates a signal based on signal information (registration status, terminal number, data link identifier, transmission cell length, registration number) stored in the transmission confirmation and registration list 300C. As described above, since the originating transfer confirmation and control means 91C includes a transmission confirmation and registration list 300C to perform a collating operation, it is easy and certain that an originating signal is collated with a transmission completion cell returned due to the originating signal.

The delay time control unit 93C measures a delay time taken to transfer data from the originating exchange 10C to the destination exchange 11C in response to a request from the delay time measurement requesting means 911C in the originating transfer confirmation and control unit 91C.

In this case, the delay time control unit 93C includes originating time memory means 931C for storing the time at which data cell signal is outputted from the originating exchange 10C to the destination exchange 11C; transmission completion report receiving time memory means 932C for storing the time at which the originating exchange 10C receives a transmission completion cell from the destination exchange 11C; and time difference operating means 933C for operating the time difference between the time stored by the originating time memory means 931C and the time stored by the transmission completion report receiving time memory means 932C and for operating a delay time taken to transfer data from the originating exchange 10C to the destination exchange 11C. The delay time control unit 93C described above can calculate easily and certainly by merely measuring a signal originating time and a transmission completion cell receiving time.

The charging function unit 90C includes charging index setting means 901C for setting a different index based on a request from the charging index setting request means 913C in the originating transfer confirmation and control unit 91C, a delay time measured by the delay time measuring means 93C, and information regarding the amount of equipment used in the network obtained by the originating transfer confirmation and control unit 91C, and charging means 902C for performing a charging operation based on a charging index set by the charging index setting means 901C.

Figure 73:
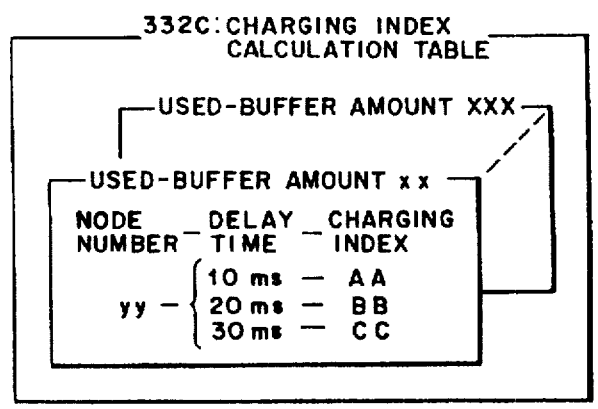
FIG. 73 is a diagram used for explaining a charging index calculation table.

The charging index setting means 901C in the charging function means 90C includes a charging index calculation table 332C acting as memory means for storing both a delay time and a charging index in accordance with intra-network facility use information (the amount of buffers used and the number of nodes) (refer to FIG. 73). The charging index calculation table 332C has plural tables each having the number of buffers used. In each table, a different charging index is set corresponding to the number of nodes and a delay time. For example, a table may be prepared corresponding to the amount of the buffers used. Each table stores a table number to be retrieved next in accordance with the number of nodes and a sub-table including a different charging index set every delay time corresponding to a table number (refer to the charging function unit 90C in FIG. 75).

As described above, since the charging index setting means 901C includes the charging index calculation table 332C, a charging index can be calculated quickly and certainly.

The operation of the delay time control unit 93C is similar to that in the third embodiment. However, the operation in the step K3 is "notify the originating transfer confirmation and control unit 91C of a time-out".

The operation of the charging function unit 90C is similar to that in the third embodiment shown in FIG. 61. In this case, one packet length unit is used in the charging index calculation table.

In this case, when the originating exchange 10C performs a data origination (data cell origination), the originating transfer confirmation and control unit 91C performs a timer registration request, an editing of the transfer confirmation and registration list 300C, a link identifier capture, a present time capture, and a timer list editing. When the originating exchange 10C receives a transmission completion cell, various processes including a transmission judgment, a delay time measurement requirement, a charging control request, a present time capture, timer list editing, a difference time measurement, a link identifier releasing, a charging request based on a delay time, and a charging index calculation are performed.

Figure 74:
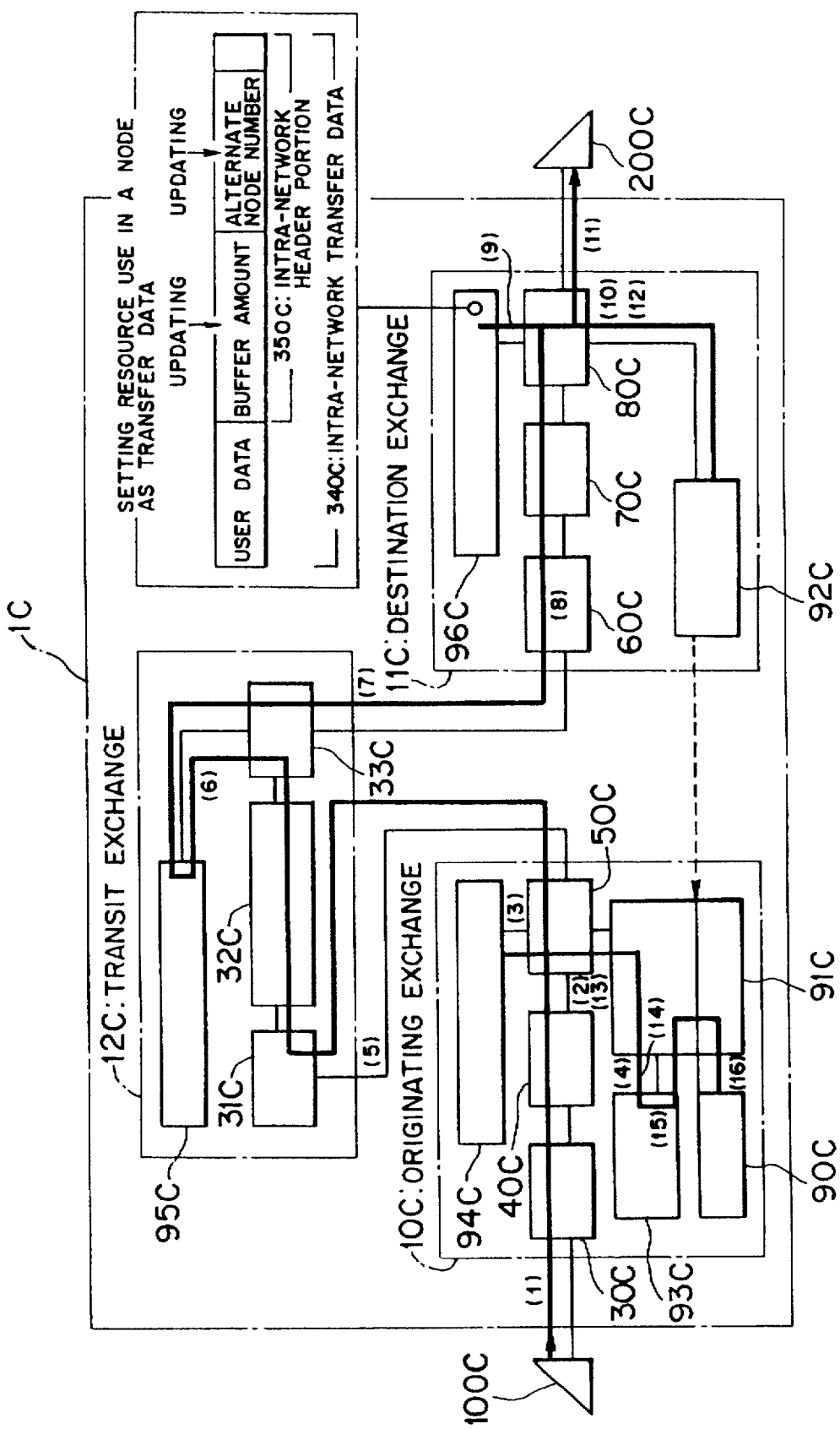
FIG. 74 is a block diagram used for explaining an operation of the second modification of the third embodiment according to the present invention.

When the terminal 100C transmits a user cell UC, the terminal complementary unit 30C in the cell exchange 10C receives it (refer to FIG. 74(1)). Then, after the cell processing unit 40C executes a necessary process, the cell transfer control unit 50C takes over the process flow. The cell transfer control unit 50C requests the originating transfer confirmation and control unit 91C to execute a transfer confirmation and registration (refer to FIG. 74(2)). After the cell transfer control unit 50C requests the resource use surveying unit 94C to examine the resources in the node, it transmits the result from a station to a station (refer to FIG. 74(3)). The resource use surveying unit 94C, for example, sets a buffer length as a buffer amount of intra-network transfer data to the intra-network header portion 350C in the intra-network transfer data 340C, or it sets "1" to the number of alternate nodes.

The originating transfer confirmation and control means 91C captures a registration number CCC to write necessary information onto a transfer confirmation and registration list 300C.

At this time, the originating transfer confirmation and control unit 91C captures the registration BBB, writes necessary information to the transfer confirmation and registration list 300C, and requests the delay time control unit 93C to measure the delay time of the registration number BBB. The delay time control unit 93C activates the timer corresponding to the registration number BBB (refer to FIG. 74(4)).

The LS complementary unit 31C in the transit exchange 12C receives the user cell UC transmitted from a station to a station (refer to FIG. 74(5)). After the packet processing unit 32C performs a necessary process, it transmits the outcome to the LS complementary unit 33C. The LS complementary unit 33C requests the resource use surveying unit 95C to examine the amount of resources used in the node (refer to FIG. 74(6)) to transmit intra-network transfer data from a station to a station (refer to FIG. 74(7)). The resource use surveying unit 95C adds the buffer length of the intra-network transfer data to the buffer amount of the intra-network header 350C in the intranetwork transfer data 340C and adds "1" to the alternate node.

The cell transfer control unit 60C in the destination exchange 11 receives the transfer data in the network (refer to FIG. 74(8)). After the cell processing unit 70C executes a necessary process, the outcome is succeeded to the terminal complementary unit 80.

The terminal complementary unit 80C requests the resource use surveying unit 96C to examine the resources used in a node (refer to FIG. 74(9)). After the terminal complementary unit 80C transmits the user cell information to the destination confirmation and control unit 92C (refer to FIG. 74(10)), it transmits a user cell to the terminal 200C (refer to 74(11)). At this time, the resource use surveying unit 96C adds the buffer length of the intra-network transfer data in the self-node to the buffer amount of the intra-network header 350C of the intra-network transfer data 340C, and adds "1" to the alternate node.

The destination transfer confirmation and control unit 92C edits a transmission completion cell 320C and returns the outcome to the originating transfer confirmation and control unit 91 in the originating exchange 10 (refer to FIG. 74(12)).

When the originating transfer confirmation and control unit 91C receives a transmission completion cell (refer to FIG. 74(13)), it confirms that a transmission is under confirmation and registration, based on both the content of the transmission completion cell and the content of the transmission confirmation and registration list 300C. During the transmission confirmation and registration, the destination transfer confirmation and control unit 91C requests the delay time control unit 93C to measure the delay time of the registration number CCC (refer to FIG. 74(14)).

The delay time control unit 93C halts the timer corresponding to the registration number CCC to calculate the delay time (refer to FIG. 74(15)). The originating transfer confirmation and control unit 91C, which has captured the delay time, transfers the amount of resources used in the network (or intra-network resource use) to the charging function unit 90C, together with the terminal information and data link information, to execute a charging operation (FIG. 74(16)). The charging function unit 90C selects a calculation table corresponding to both a delay time specified with reference to the charging index calculation table 332C and the intra-network resource use to calculate a charging index.

Figure 75:
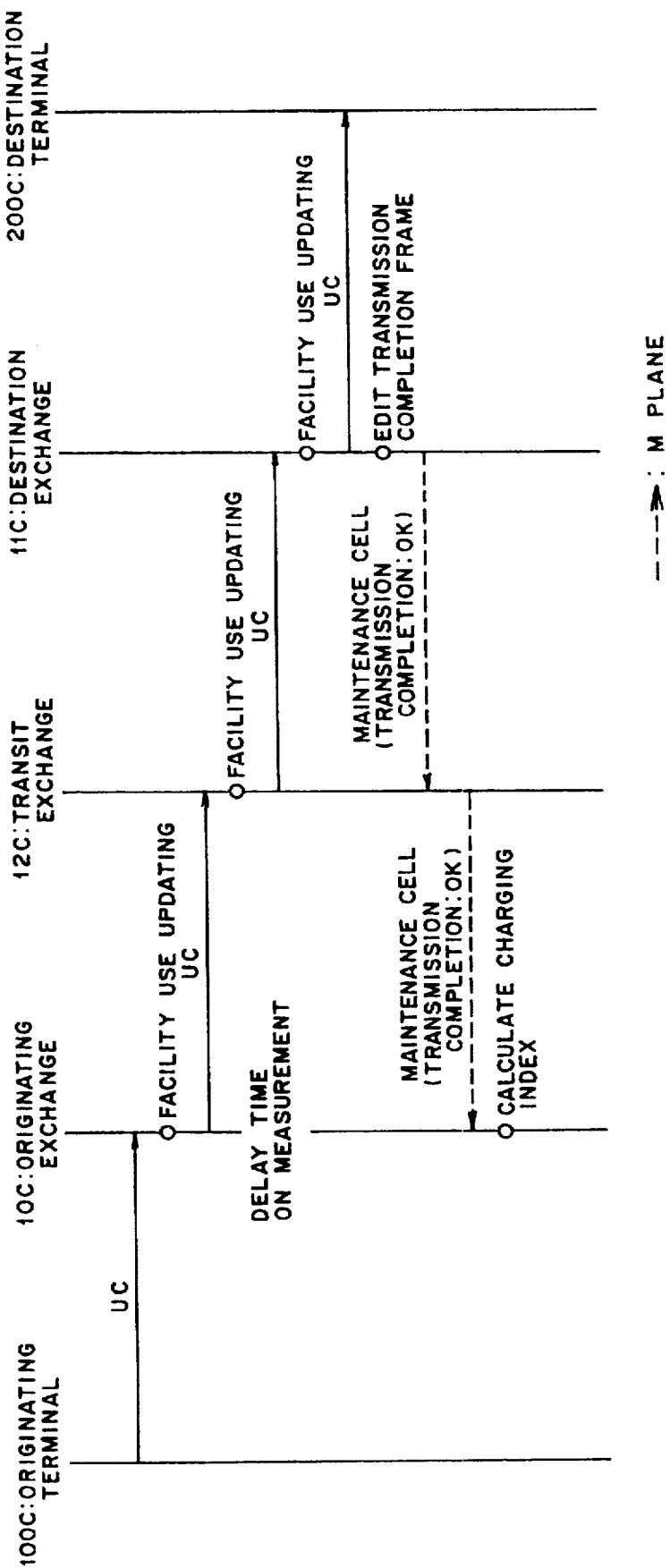
FIG. 75 is a signal sequence diagram used for explaining an operation of the second modification of the third embodiment according to the present invention.

The process described above is shown with the signal sequence diagram in FIG. 75. When the originating terminal 100C transmits the user cell UC, the originating exchange 10C updates the amount of equipment used (or facility use) and transmits it to the transit exchange 12C. The transit exchange 12C updates the amount of equipment used to transmit the user cell UC to the destination exchange 11C. When the ATM exchange 11C receives the user cell UC, it updates the amount of equipment used to transmit the user cell information to the destination transfer confirmation and control unit 92C. Then the user cell UC is transmitted to the destination terminal 200C. The destination transfer confirmation and control unit 92C edits a transmission completion cell. The destination exchange 11C transmits a user cell UC having information including both an intra-network header and a transmission completion OK via the transit exchange 12C. When the originating exchange 10C receives the transmission completion cell 321C, it measures a delay time ranging from the originating time to the transmission completion cell receiving time, thus calculating a charging index in consideration of the delay time and the amount of equipment used in the network.

For example, when an intra-network process delay (data transfer delay) becomes large with an increasing number of equipment used in a network, a supplier of an ATM switching network can provide a good service quality by applying a lower charging system. If it is judged that the number of equipment used with user data increases without any delay in processing in a network (or data transfer delay), a supplier of another data switching network can apply a higher charging system.

As described above, according to the present invention, the charging system can be graduated in accordance with both a delay in processing with which user data uses equipment in the ATM switching network 1C and the amount of equipment used in the ATM switching network. Hence, services on the charging index can be improved. The service supplier can apply a higher charging system in the case where equipment in the network are heavily used. This means that the service supplier can make much profit.

(e) Others:

In the first and third embodiments, each of the delay time control units 93A to 93C may be formed as a counter that is triggered when an originating node outputs a signal to a receiving node, stops its operation when the originating node receives transmission completion report information from the receiving node, and measures a delay time taken to transfer data from the originating node to the receiving node based on the result measured at its halt operation. The delay time control unit 93A can calculate easily and certainly a delay time.

Figure 76:
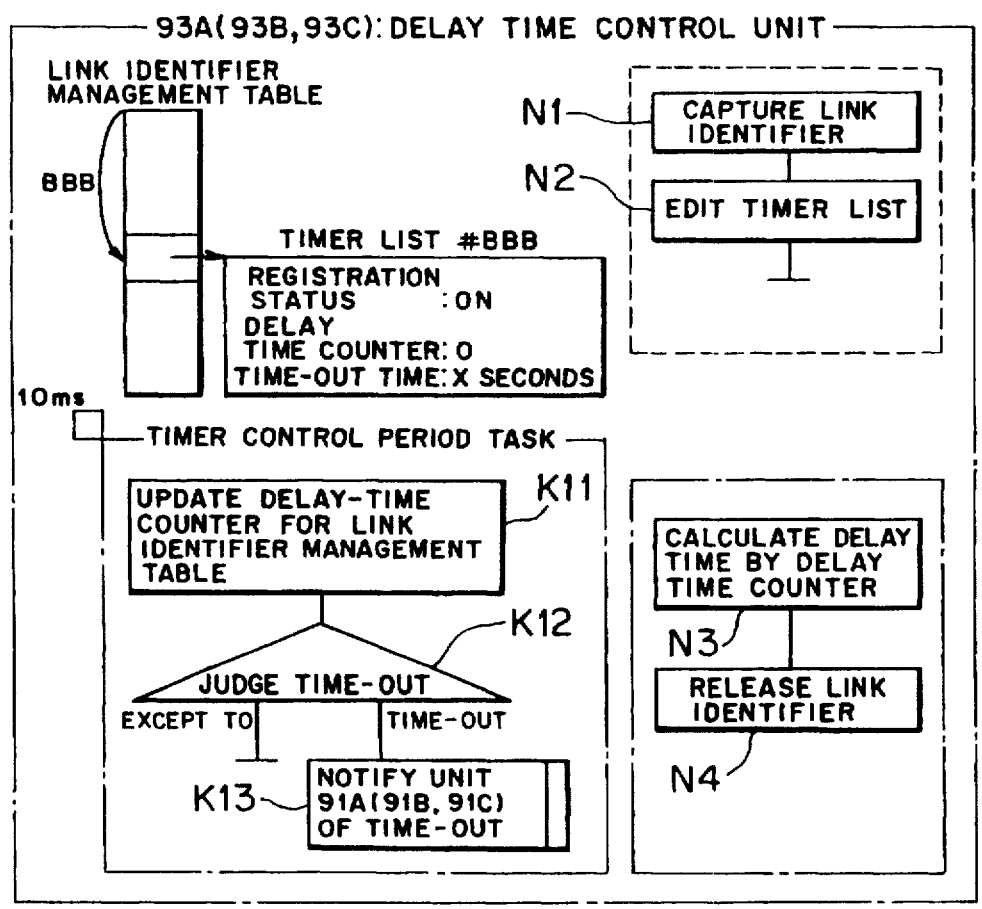
FIG. 76 is a diagram used for explaining an operation of another embodiment of an delay time control unit.

In this case, in response to a timer registration requested by each of the originating transfer confirmation and control units 91A to 91C, each of the delay time control units 93A to 93C, as shown in FIG. 76, captures a link identifier to edit a timer list (steps N1 and N2).

When each of the originating exchanges 10A to 10C receives a transmission completion frame Z (packet, cell) from each of the destination exchanges 11A to 11C, the counter calculate a delay time to release the link identifier (steps N3 and N4).

Information including a registration status (ON), a counter value, and a time-out time is written in the timer list corresponding to the address BBB being an address of the registration number BBB of an originating signal in the link identifier management table.

Since the timer list of the link identifier management table includes time-out time information, the counter value is updated with reference to the link identifier table in a timer control period task operated in an event waiting state, so that it is judged whether a time-out time has come during the transmission completion signal receive waiting state (steps K11 and K12). The originating transfer confirmation and control units 91A to 91C is notified of the time-out time (step K13). Thus, each of the originating transfer confirmation and control units 91A to 91C releases the time-out registration.

In the process described above, the link identifier capture and timer list editing (steps N1 and N2) are executed at a data originating time (or at a user frame originating time) of the originating exchange 10A. Both a delay time calculation by a counter and a link identifier releasing (steps N3 and N4) are performed at a transmission completion signal receiving time of the originating exchange 10A.

In the second and third embodiments, a transit node is arranged between an originating node and a receiving node. However, the concepts of the second and third embodiments are applicable to switching networks with no transit nodes. In this case, the number of alternate nodes can be omitted from the intra-network facility use information.

What is claimed is:

1. A method for charging during data communication in a data switching network, comprising the steps of:
   measuring a data communication delay time at an originating node when said originating node receives transmission completion report information from a receiving node, said data communication delay time having elapsed to transmit data from said originating node to said receiving node; and
   setting a different charging index in accordance with said data communication delay time to perform a charging operation at said originating node.

2. A device for charging during data communication in a data switching network, said data switching network comprising an originating node and a receiving node,
   said receiving node comprising a destination transmission confirmation and control means for transmitting transmission completion report information to said originating node in response to a signal from said originating node;
   said originating node comprising originating transmission confirmation and control means, said originating transmission confirmation and control means including:
      originating transmission confirmation control means having transmission completion report information receiving means for receiving said transmission completion report information from said destination transmission confirmation and control means in said receiving node, delay time measurement requesting means for delivering a delay time measuring request when data is transferred from said originating node to said receiving node based on a result received by said transmission completion report information receiving means, and charging index setting request means for delivering a charging index setting request when data is transferred from said originating node to said receiving node based on a result received by said transmission completion report information receiving means;
      delay time measuring means for measuring said delay time when data is transferred from said originating node to said receiving node, in response to a request from said delay time measurement requesting means in said originating transmission confirmation and control means; and
      charging function means having charging index setting means for setting a different charging index based on a request from said charging index setting request means in said originating transmission confirmation and control means and a delay time measured by said delay time measuring means, and charging means for performing a charging operation in accordance with said charging index set by said charging index setting means.

3. A device for charging during data communication in a data switching network according to claim 2, wherein said delay time measuring means comprises:
   originating time memory means for storing a time at which a signal is transferred from said originating node to said receiving node; transmission completion report information receiving time memory means for storing a time at which said receiving node receives said transmission completion report information from said receiving node; and time difference operating means for operating a time difference between a time stored in said originating time memory means and a time stored in said transmission completion report information receiving time memory means, and for operating a delay time delayed to transfer data from said originating node to said receiving node.

4. A device for charging during data communication in a data switching network according to claim 2, wherein said delay time measuring means comprises:
   a counter which is triggered when a signal is transferred from said originating node to said receiving node, and which halts its operation when said originating node receives said transmission completion report information from said receiving node, and which measures a delay time when data is transferred from said originating node to said receiving node.

5. A device for charging during data communication in a data switching network according to claim 2, wherein said originating transmission confirmation and control means comprises information memory means which stores signal information regarding a signal sent from said originating node to said receiving node, a signal collation being performed based on said signal information stored in said signal information memory means when said transmission completion report information is received from said destination transmission confirmation and control means in said receiving node.

6. A device for charging during data communication in a data switching network according to claim 2, said charging index setting means in said charging function means comprises memory means which stores a charging index corresponding to said delay time.

7. A method for charging during data communication in a data switching network, comprising the steps of:
   surveying an intra-network facility use amount that communication data transferred from an originating node to a receiving node uses in the data switching network; and
   setting a different index at said originating node in accordance with information regarding said intra-network facility use amount when said originating node receives said information regarding the intra-network facility use amount together with transmission completion report information from said receiving node, a charging operation being performed.

8. A device for charging during data communication in a data switching network, said data switching network comprising an originating node including first resource use surveying means and a receiving node including second resource use surveying means, said receiving node comprising a destination transmission confirmation and control means for transmitting information regarding intra-network facility use between said originating node and said receiving node, said facility use obtained based on information examined by said second resource use surveying means, together with transmission completion report information to said originating node, in response to a signal from said originating node;

said originating node comprising originating transmission confirmation and control means, said originating transmission confirmation and control means including:

transmission completion report information receiving means for receiving said transmission completion report information from said destination transmission confirmation and control means in said receiving node, and charging index setting request means for outputting a charging index setting request based on a result received by said transmission completion report information receiving means; and charging function means having charging index setting means for setting a different charging index based on a request from said charging index setting request means in said originating transmission confirmation and control means and information regarding said intra-network facility use obtained by said originating transmission confirmation and control means, and charging means for performing a charging operation in accordance with said charging index set by said charging index setting means.

9. A device for charging during data communication in a data switching network according to claim 8, wherein said originating transmission confirmation and control means comprises signal information memory means which stores signal information regarding a signal sent from said originating node to said receiving node, a signal collation being performed based on said information stored in said signal information memory means when said transmission completion report information is received from said destination transmission confirmation and control means in said receiving node.

10. A device for charging during data communication in a data switching network according to claim 8, said charging index setting means in said charging function means comprises memory means which stores a charging index corresponding to information regarding said intra-network facility use.

11. A method for charging during data communication in a data switching network, comprising the steps of:

surveying an intra-network facility use amount that communication data transferred from an originating node to a receiving node uses in the data switching network;

measuring a data communication delay time in said originating node, said data communication delay time having elapsed to transfer from said originating node to said receiving node, when an originating node receives information regarding said intra-network facility use amount together with transmission completion report information; and setting a different charging index at said originating node in accordance with both said data communication delay time and information regarding said intra-network facility use amount, a charging operation being performed.

12. A device for charging during data communication in a data switching network, said data switching network comprising an originating node including first resource use surveying means and a receiving node including second resource use surveying means, said receiving node comprising a destination transmission confirmation and control means for transmitting intra-network facility use between said originating node and said receiving node, said intra-network facility use obtained based on a use of resources examined by said second resource use surveying means, together with transmission completion report information to said originating node, in response to a signal from said originating node;

originating node comprising originating transmission confirmation and control means, said originating transmission control means including:

transmission completion report information receiving means for receiving said transmission completion report information and information regarding said intra-network facility use from said destination transmission confirmation and control means in said receiving node, delay time measurement requesting means for delivering a delay time measuring request based on a result received by said transmission completion report information receiving means when data is transferred from said originating node to said receiving node, and charging index setting request means for delivering a charging index setting request based on a result received by said transmission completion report information receiving means when data is transferred from said originating node to said receiving node;

delay time measuring means for measuring a delay time delayed to transfer data from said originating node to said receiving node in response to a request from said delay time measurement requesting means in said originating transmission confirmation and control means; and charging function means having charging index setting means for setting a different charging index based on a request from said charging index setting request means in said originating transmission confirmation and control means, a delay time measured by said delay time measuring means, and information regarding said intra-network facility use obtained by said originating transmission confirmation and control means, and charging means for performing a charging operation in accordance with said charging index set by said charging index setting means.

13. A device for charging during data communication in a data switching network according to claim 12, wherein said delay time measuring means comprises:

originating time memory means for storing a time at which a signal is transferred from said originating node to said receiving node; transmission confirmation and completion report information receiving time memory means for storing a time at which said receiving node receives said transmission completion report information from said receiving node; and time difference operating means for operating a time difference between a time stored in said originating time memory means and a time stored in said transmission completion report information receiving time memory means, and for operating a delay time delayed to transfer data from said originating node to said receiving node.

14. A device for charging during data communication in a data switching network according to claim 12, wherein said delay time measuring means comprises:
a counter which is triggered when a signal is transferred from said originating node to said receiving node, and which halts its operation when said originating node receives said transmission completion report information from said receiving node, and which measures a delay time when data is transferred from said originating node to said receiving node.

15. A device for charging during data communication in a data switching network according to claim 12, wherein said originating transmission confirmation and control means comprises signal information memory means which stores signal information regarding a signal sent from said originating node to said receiving node, a signal collation being performed based on said information stored in said signal information memory means when said transmission completion report information is received from said destination transmission confirmation memory means in said receiving node.

16. A device for charging during data communication in a data switching network according to claim 12, said charging index setting means in said charging function means comprises memory means which stores said delay time and said charging index corresponding to information regarding said intra-network facility use.

17. A device for charging during data communication in a data switching network according to claim 12, further comprising an intermediate node arranged between said originating node and said receiving node, said intermediate node including resource use surveying means, whereby when said destination transmission confirmation and control means in said receiving node receives a signal from said originating node, information regarding an intra-network facility use which is obtained based on resource use examined by said resource use surveying means is transmitted from said originating node to said receiving node by way of said intermediate node, together with transmission completion report information.

18. A device for charging during data communication in a data switching network according to claim 12, said information regarding intra-network facility use is the amount of buffers used.

19. A device for charging during data communication in a data switching network according to claim 17, said information regarding intra-network facility use comprises the amount of buffers used.

20. A device for charging during data communication in a data switching network according to claim 17, said information regarding intra-network facility use comprises the amount of buffers used and the number of alternate nodes.

21. An originating node having a charging function during data communication, said originating node arranged in a data switching network, comprising:
transmission completion report information receiving means for receiving transmission completion report information from a receiving node arranged in said data switching network;
originating transmission confirmation and control means including delay time measurement requesting means that produces a delay time measurement request based on a result received by said transmission completion report information receiving means when data is transferred from said originating node to said receiving node, and charge index setting request means that produces a charge index setting request based on a result received by said transmission completion report information receiving means when data is transferred from said originating node to said receiving node;
delay time measurement means for measuring a delay time when data is transferred from said originating node to said receiving node in response to a request from said delay time measurement requesting means in said originating transmission confirmation and control means;
charging index setting means for setting a different charge index based on a request from said charge index setting request means in said originating transmission confirmation control means and a delay time measured by said delay time measurement means; and
charging function means including charging means that charges based on a charge index set by said charging index setting means.

22. An originating node having a charging function during data communication according to claim 21, wherein said delay time measurement means includes:
originating time memory means for storing a time at which a signal is transferred from said originating node to said receiving node;
transmission completion report information receiving time memory means for storing a time at which said receiving node receives said transmission completion report information from said receiving node; and
time difference operating means for determining a time difference between a time stored in said originating time memory means and a time stored in said transmission completion report information receiving time memory means, and for determining a delay time delayed to transfer data from said originating node to said receiving node.

23. An originating node having a charging function during data communication according to claim 21, wherein said delay time measurement means includes:
a counter which is triggered when a signal is transferred from said originating node to said receiving node, and which halts its operation when said originating node receives said transmission completion report information from said receiving node, and which measures a delay time when data is transferred from said originating node to said receiving node.

24. An originating node having a charging function during data communication according to claim 21, wherein said originating transmission confirmation and control means includes signal information memory means which stores information regarding a signal sent from said originating node to said receiving node, a signal collation being performed based on said information stored in said signal information memory means when said transmission completion report information is received from destination transmission confirmation control means in said receiving node.

25. An originating node having a charging function during data communication according to claim 21, said charging index setting means in said charging function means includes memory means which stores a charging index corresponding to said delay time.

26. An originating node having a charging function during data communication, said originating node arranged in a data switching network, comprising:

originating transmission confirmation and control means including transmission completion report information receiving means for receiving transmission completion report information and intra-network facility use amount information from a receiving node arranged in said data switching network, and charge index setting request means that produce a charge index setting request based on a result received by said transmission completion report information receiving means; and charging function means including charging index setting means for setting a different charge index based on a request from said charge index setting request means in said originating transmission confirmation and control means and intra-network facility use amount information obtained by said originating transmission confirmation and control means, and charging function means for including charging means that charges based on a charge index set by said charge index setting means.

27. The originating node having a charging function during data communication according to claim 26, wherein said originating transmission confirmation and control means includes signal information memory means which stores information regarding a signal sent from said originating node to said receiving node, a signal collation being performed based on said information stored in said signal information memory means when said transmission completion report information is received from said receiving node.

28. An originating node having a charging function during data communication according to claim 26, said charging index setting means in said charging function means including memory means which store a charging index corresponding to information regarding said intra-network facility use.

29. An originating node having a charging function during data communication, said originating node arranged in a data switching network, comprising:

originating transmission confirmation and control means including transmission completion report information receiving means for receiving transmission completion report information and information regarding intra-network facility use amount from a receiving node arranged in said data switching network, delay time measurement requesting means that produces a delay time measurement request based on a result received by said transmission completion report information receiving means when data is transferred from said originating node to said receiving node, and charge index setting request means that produces a charge index setting request based on a result received by said transmission completion report information receiving means when data is transferred from said originating node to said receiving node;

delay time measurement means for measuring a delay time when data is transferred to said receiving node in response to a request from said delay time measurement requesting means in said originating transmission confirmation and control means; and charging function means including charging index setting means for setting a different charge index based on a request from said charge index setting request means in said originating transmission confirmation and control means, a delay time measured by said delay time measuring means, and information regarding intra-network facility use amount obtained by said originating transmission confirmation and control means, and charging means that charges based on a charge index set by said charge index setting means.

30. An originating node having a charging function during data communication according to claim 29, wherein said delay time measurement means comprises:

originating time memory means for storing a time at which a signal is transferred from said originating node to said receiving node;

transmission completion report information receiving time memory means for storing a time at which said receiving node receives said transmission completion report information from said receiving node; and time difference operating means for determining a time difference between a time stored in said originating time memory means and a time stored in said transmission completion report information receiving time memory means, and for determining a delay time delayed to transfer data from said originating node to said receiving node.

31. An originating node having a charging function during data communication according to claim 29, wherein said delay time measurement means includes:

a counter which is triggered when a signal is transferred from said originating node to said receiving node, and which halts its operation when said originating node receives said transmission completion report information from said receiving node, and which measures a delay time when data is transferred from said originating node to said receiving node.

32. An originating node having a charging function during data communication according to claim 29, wherein said originating transmission confirmation and control means comprises signal information memory means which stores information regarding a signal sent from said originating node to said receiving node, a signal collation being performed based on said information stored in said signal information memory means when said transmission completion report information is received from destination transmission confirmation and control means in said receiving node.

33. An originating node having a charging function during data communication according to claim 29, said charging index setting means in said charging function means including memory means which store said charging index corresponding to information regarding said intra-network facility use.

34. An originating node having a charging function during data communication according to claim 29, said information regarding intra-network facility use is the amount of buffers used.

35. A device for charging during data communication in a data switching network, comprising:

a charging unit arranged in a switching network in which data communications are performed between an originating terminal unit and a receiving terminal unit; said charging unit including counting means for counting a transmission time of data transferred from said originating terminal unit to said receiving terminal unit, and means for charging the data communication according to a predetermined and different charge index based on a count value from said counting means.

36. A device for charging during data communication in a data switching network, comprising:

a charging unit arranged in a switching network in which data communications are performed between an originating terminal unit and a receiving terminal unit;

said charging unit including information collecting means for collecting information regarding an intra-exchange network facility use amount that data transferred from said originating terminal unit to said receiving terminal unit uses in the data switching network, and means for charging the data communication according to a predetermined and different charge index, based on said intra-network facility use amount of said information collecting means.

37. A device for charging during data communication in a data switching network, comprising:

a charging unit arranged in a switching network in which data communications are performed between an originating terminal unit and a receiving terminal unit;

said charging unit including means for counting a transmission time of data transferred from said originating terminal unit to said receiving terminal unit, information collecting means for collecting information regarding an intra-exchange network facility use amount that data transferred from said originating terminal unit to said receiving terminal unit uses in the data switching network, and means for charging the data communication according to a predetermined and different charge index based on a count value of said counting means and said intra-network facility use amount of said information collecting means.

* * * * *